(12) United States Patent
Taniguchi et al.

(10) Patent No.: US 6,445,406 B1
(45) Date of Patent: *Sep. 3, 2002

(54) STEREOSCOPIC IMAGE DISPLAY APPARATUS WHOSE OBSERVATION AREA IS WIDENED

(75) Inventors: Naosato Taniguchi, Urawa; Hiroyasu Nose, Tokyo; Toshiyuki Sudo, Kawasaki; Hideki Morishima, Kawasaki; Kazutaka Inoguchi, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,703

(22) Filed: Jan. 30, 1997

(30) Foreign Application Priority Data

| Jan. 31, 1996 | (JP) | 8-037431 |
| Feb. 2, 1996 | (JP) | 9-040469 |
| May 20, 1996 | (JP) | 8-148611 |

(51) Int. Cl.[7] ............................... H04N 13/04
(52) U.S. Cl. .......................... 348/51; 359/462
(58) Field of Search ................ 359/462, 463, 359/464, 41, 39, 630, 290, 465, 475; 348/51, 52, 53, 56, 59, 88; 358/3; 178/6.5; 345/102; H04N 13/04

(56) References Cited

U.S. PATENT DOCUMENTS

| 3,858,001 A | * | 12/1974 | Bonne | 178/6.5 |
| 4,717,949 A | * | 1/1988 | Eichenlaub | 358/3 |
| 4,829,365 A | * | 5/1989 | Eichenlaub | 358/3 |
| 5,036,385 A | * | 7/1991 | Eichenlaud | 358/3 |
| 5,083,199 A | * | 1/1992 | Borner | 348/88 |
| 5,315,377 A | * | 5/1994 | Isono et al. | 348/51 |
| 5,410,354 A | * | 4/1995 | Eichenlaub | 348/59 |
| 5,428,366 A | * | 6/1995 | Eichenlaub | 345/102 |

(List continued on next page.)

FOREIGN PATENT DOCUMENTS

| EP | 0 316 465 | 11/1987 |
| EP | 0 625 861 A2 | 5/1994 |
| JP | 6-3187979 | 7/1988 |
| WO | WO 94/06249 | 9/1993 |
| WO | WO 95/34173 | 6/1995 |
| WO | WO 97/22033 | 6/1997 |

*Primary Examiner*—Chris Kelley
*Assistant Examiner*—Tung Vo
(74) *Attorney, Agent, or Firm*—Morgan & Finnegan, LLP

(57) ABSTRACT

A stereoscopic image display apparatus comprising a light source for emitting light from plural apertures, an optical element array composed of an array of optical elements having different optical functions in the horizontal and vertical directions, for giving directivity to the light emerging from the apertures, and a transmissive display device for displaying a stripe image, obtained by dividing each of a parallax image for the right eye and a parallax image for the left eye in the vertical direction to obtain right stripe pixels and left stripe pixels and arranging the right and left stripe pixels alternately in a predetermined order, wherein the plural apertures are provided corresponding to each of the optical elements constituting the optical element array, for each stripe pixel, and are adapted to cause the light, passing through the right or left stripe pixel, to reach a predetermined area.

21 Claims, 37 Drawing Sheets

U.S. PATENT DOCUMENTS

| | | | | |
|---|---|---|---|---|
| 5,465,175 A | * | 11/1995 | Woodgate et al. | 359/463 |
| 5,504,598 A | * | 4/1996 | Sprague et al. | 359/41 |
| 5,572,341 A | * | 11/1996 | Fergason | 359/39 |
| 5,585,960 A | * | 12/1996 | Sato et al. | 359/290 |
| 5,663,831 A | * | 9/1997 | Mashitani et al. | 359/463 |
| 5,696,552 A | * | 12/1997 | Aritake et al. | 348/51 |
| 5,712,732 A | * | 1/1998 | Street | 359/630 |
| 5,875,055 A | * | 2/1999 | Morishima et al. | 359/465 |
| 5,930,037 A | * | 7/1999 | Imai | 359/463 |
| 5,936,774 A | * | 8/1999 | Street | |
| 5,943,166 A | * | 8/1999 | Hoshi et al. | 359/475 |
| 5,956,001 A | * | 9/1999 | Sumida et al. | 345/55 |
| 5,991,074 A | * | 11/1999 | Hose et al. | 359/465 |

* cited by examiner

- 601 LIGHT DIRECTIVITY CHANGING-OVER APP.
- 602 MATRIX TYPED SURFACE ILLUMINANT
- 603 LENTICULAR SHEET
- 604 TRANSMISSION-TYPED DISPLAY APP.

L: LEFT SOURCE FOR LEFT EYE
R: RIGHT SOURCE FOR RIGHT EYE

EVEN FRAME    ODD FRAME

PI

PII

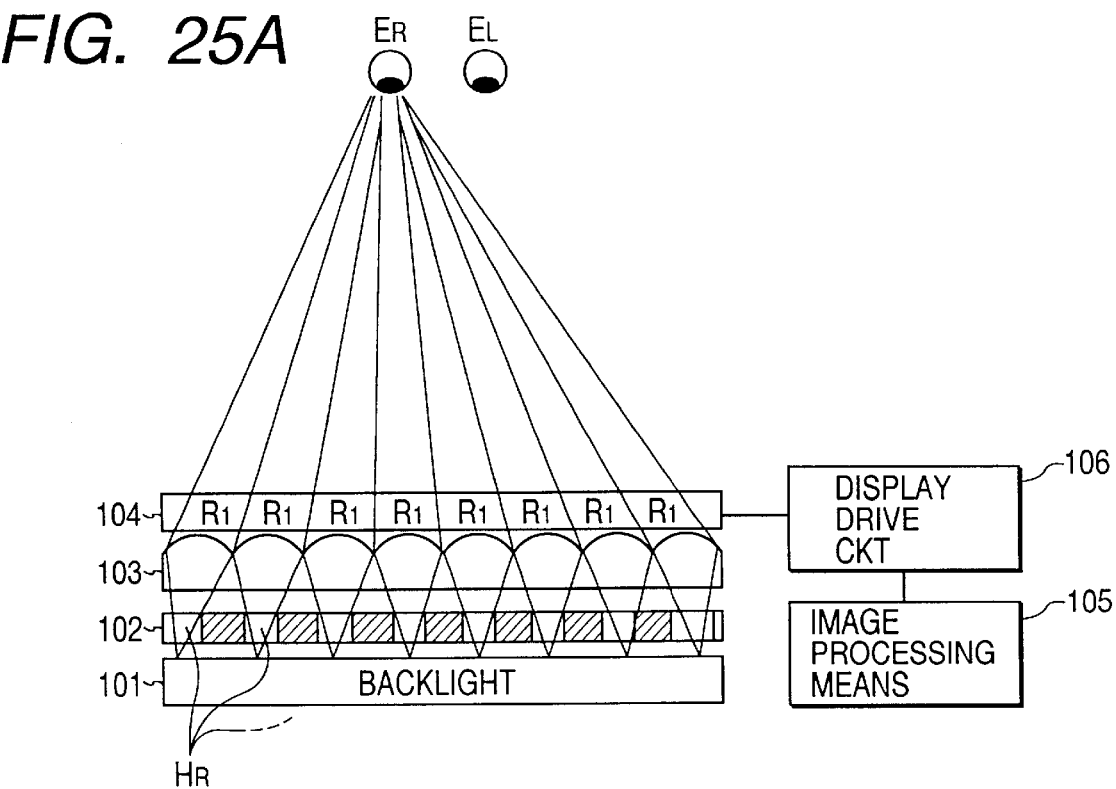
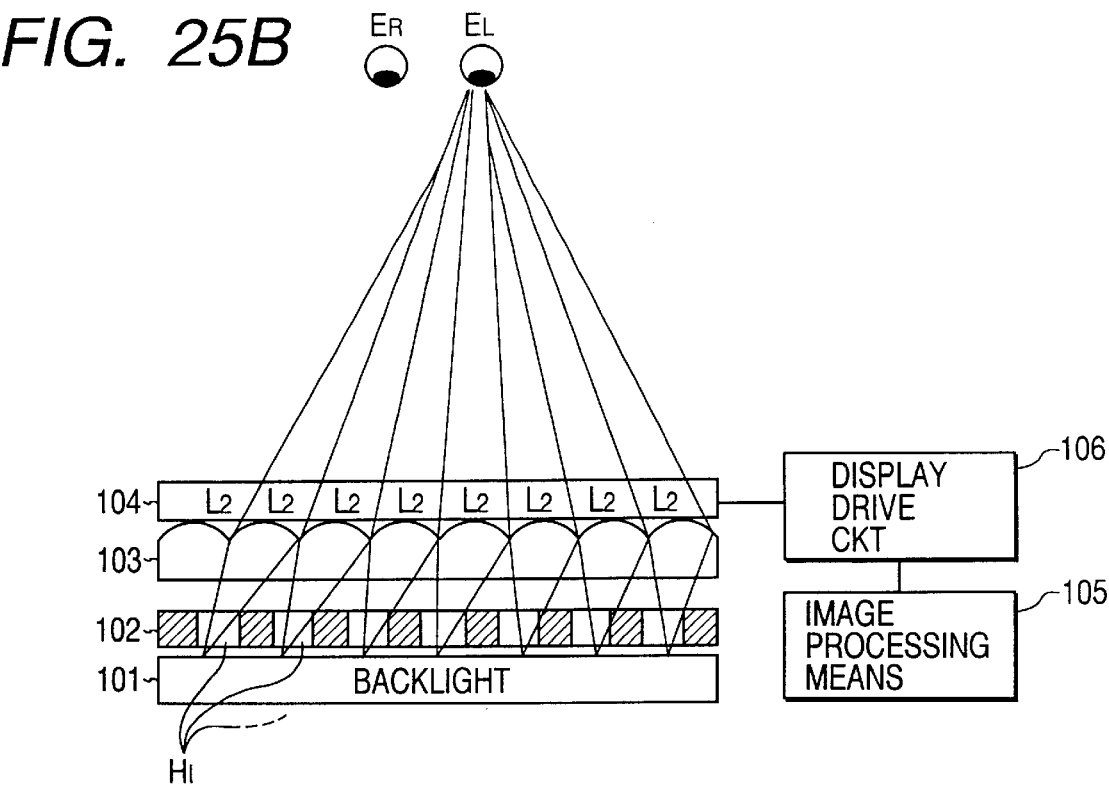

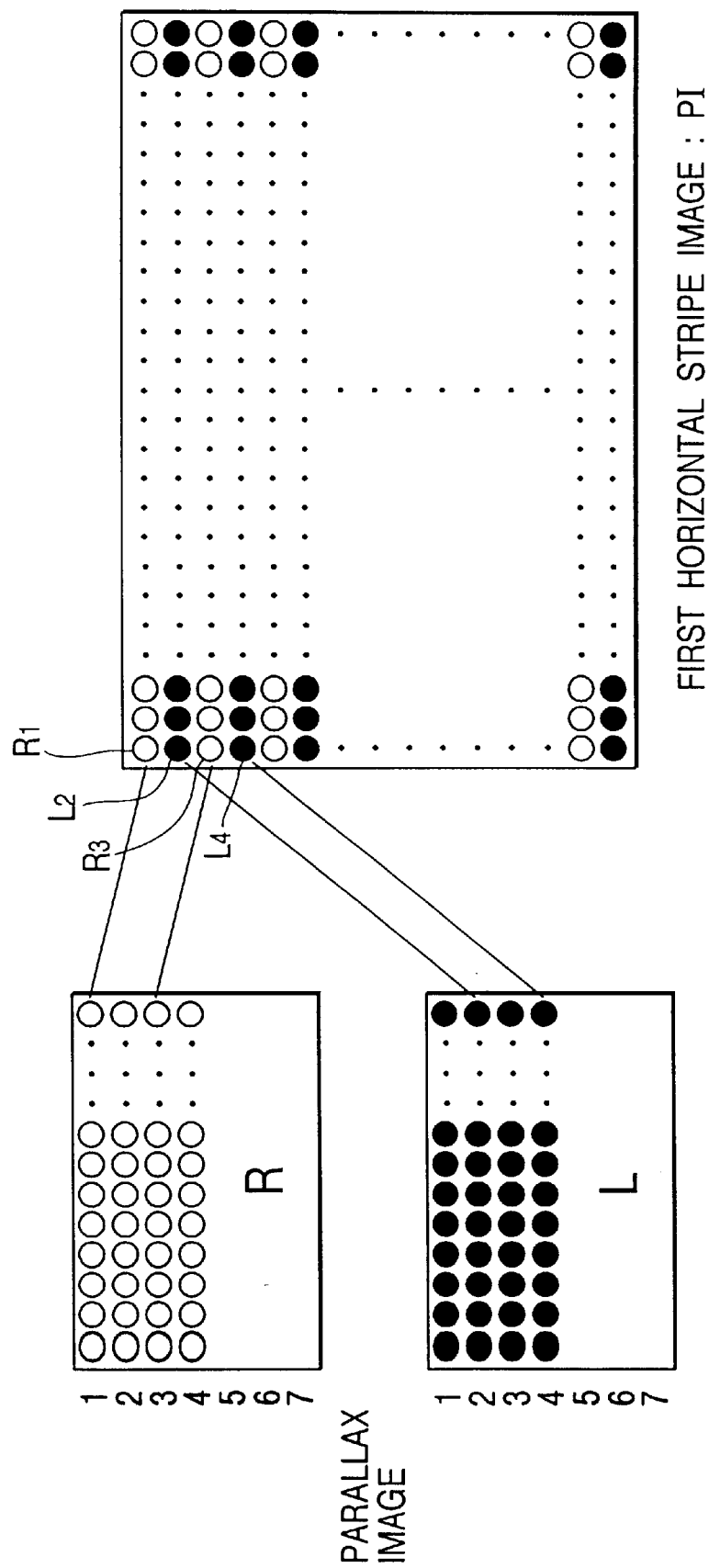

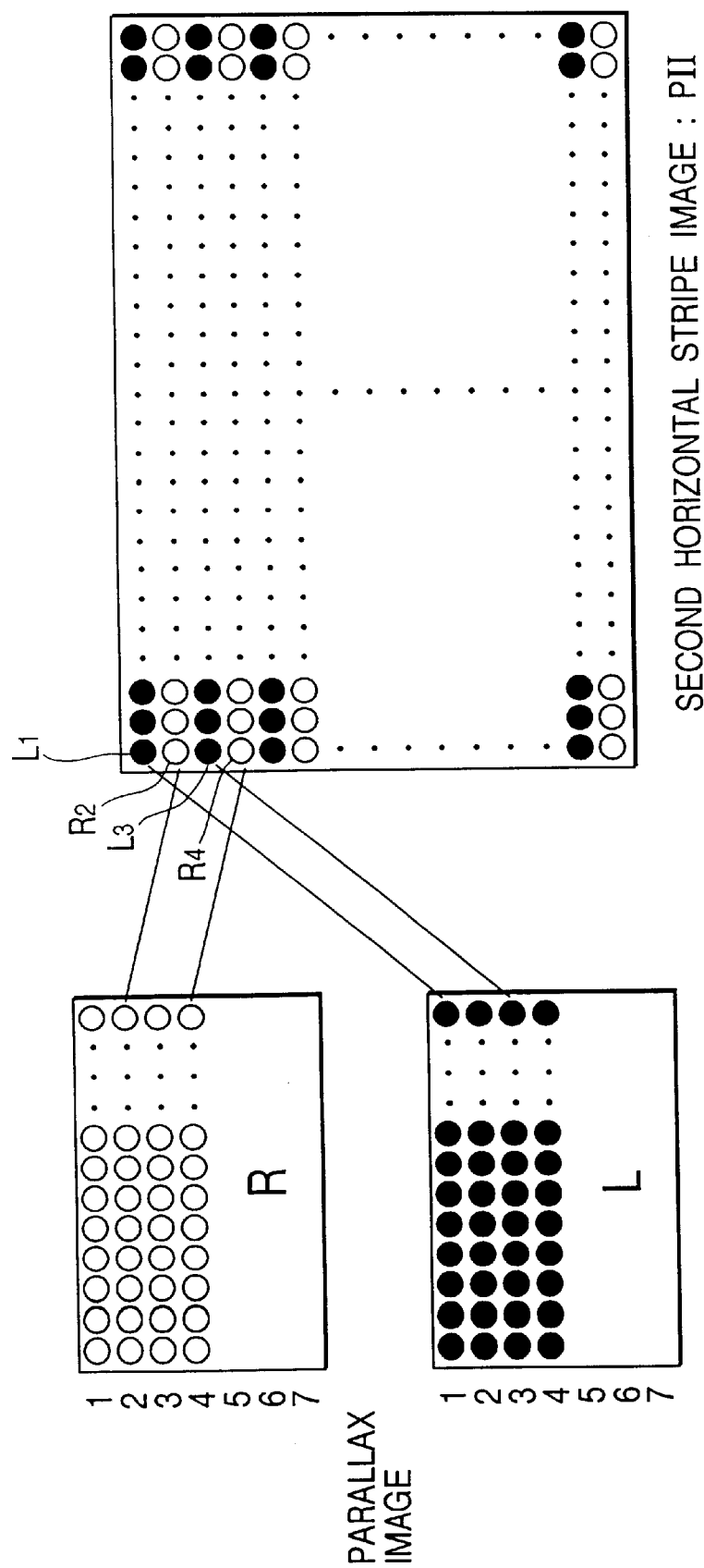

FIRST HORIZONTAL
STRIPE IMAGE : PI

SECOND HORIZONTAL
STRIPE IMAGE : PII

FIG. 32
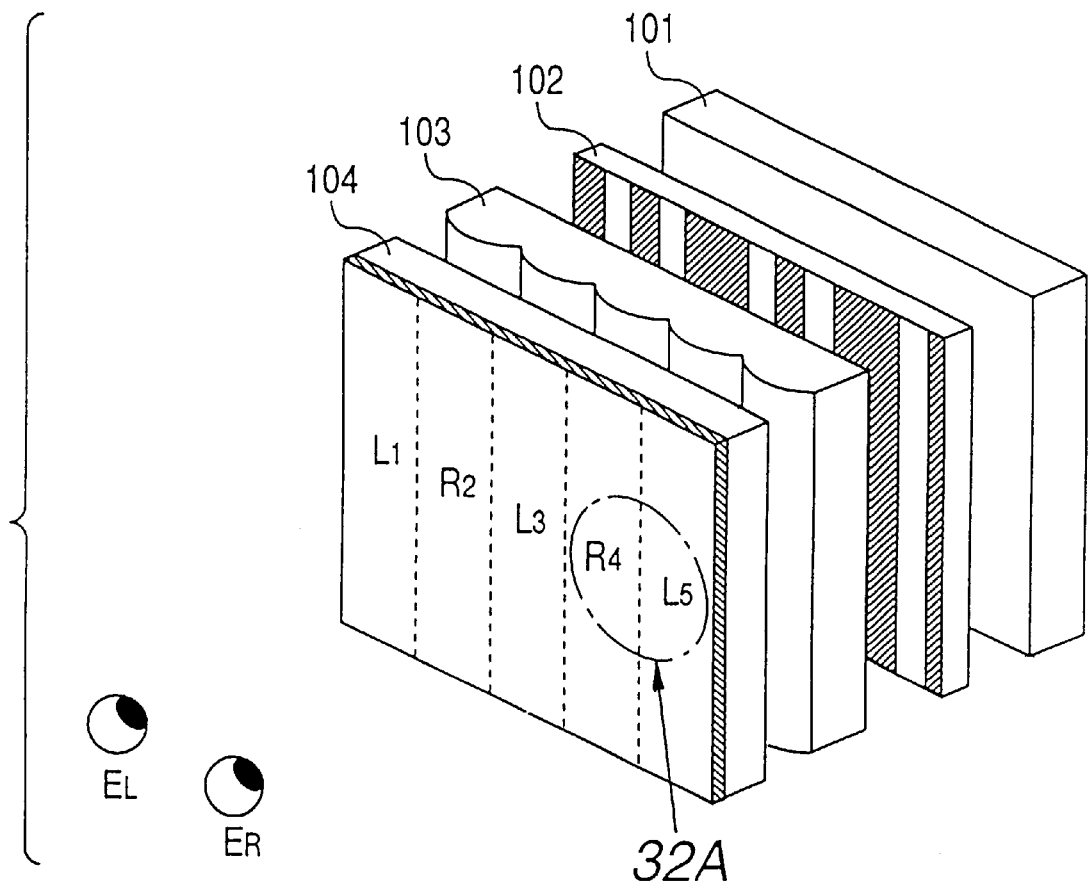
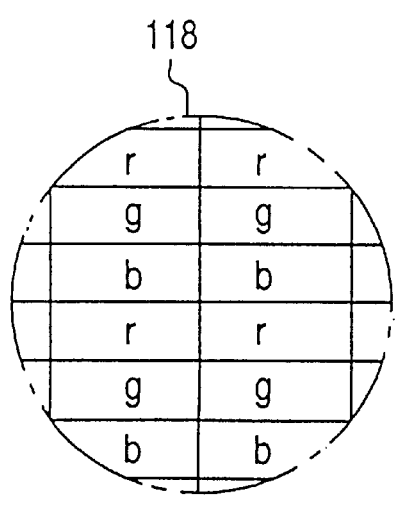
Ri - PIXEL    Li - PIXEL
FIG. 32A

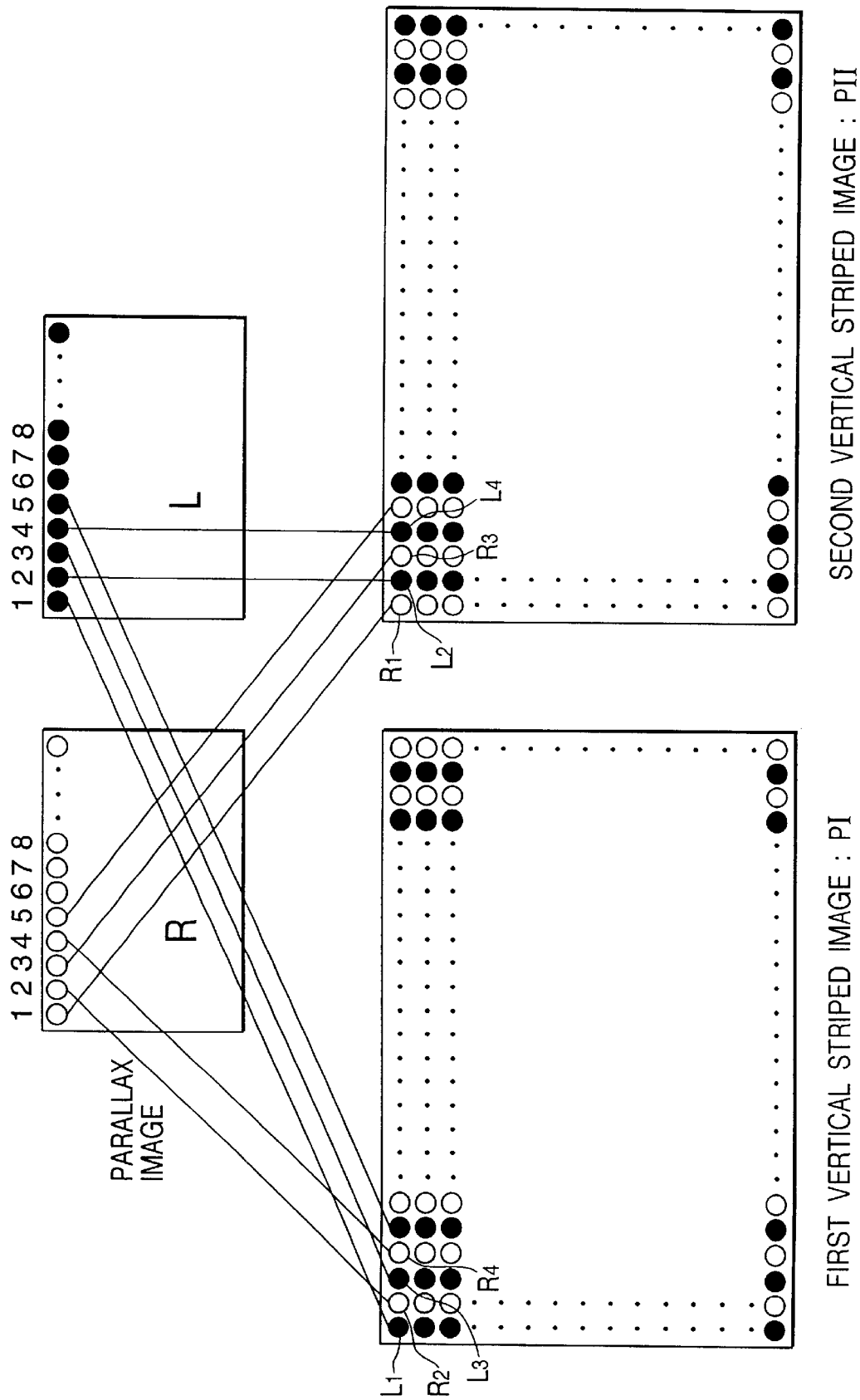

STEREOSCOPIC IMAGE DISPLAY APPARATUS WHOSE OBSERVATION AREA IS WIDENED

BACKGROUND OF THE INVENTION

1. Field of the Invention

The present invention relates to a stereoscopic image display apparatus, and more particularly to such apparatus adapted for stereoscopic image display in a television, a video display, a computer monitor, a game machine or the like.

2. Related Background Art

As the conventional stereoscopic image display apparatus, there is known an apparatus of a system of polarizing glasses. In this system, the image display device is provided with a liquid crystal shutter for obtaining different polarized states for a right-eye parallax image R and a left-eye parallax image L. The polarized state is switched in synchronization with the field signal of the displayed image and the observer wearing polarizing glasses observes such switched display, whereby the stereoscopic observation is realized by splitting the left and right images to the respective eyes in time-sequential manner. However such system is cumbersome for the user, being required to always wear the polarizing glasses.

On the other hand, among the stereoscopic image display apparatus not using such polarizing glasses, there is known a system providing a lenticular lens in front of the display device, thereby spatially separating the images for the left and right eyes. FIGS. 1A and 1B are schematic views showing such conventional system with the lenticular lens, and are respectively a cross-sectional view seen from above the observer and a front view of display pixels of the liquid crystal display.

In these drawings, 501 indicates a display pixel portion of a liquid crystal display device, of which glass substrate, color filter, electrodes, polarizing filters, rear light source etc. are omitted from the illustration. The display pixel portion 501 is composed of apertures 502 having color filters and constituting pixels, and a black matrix 503 separating such pixels. The liquid crystal display is provided thereon, at the side of the observer, with a lenticular lens 504 consisting of cylindrical lenses having a semicircular cross section as illustrated and extending perpendicularly to the plane of drawing, and the display pixel portion 501 of the liquid crystal display is positioned at the focal plane of such lenticular lens.

In the display pixel portion 501, stripe-shaped pixels Ri for the right eye and stripe-shaped pixels Li for the left eye are alternately displayed in such a manner that each pair of such pixels corresponds to a pitch of the lenticular lens, whereby such paired pixels are optically separated and respectively focused on the right eye $E_R$ and the left eye $E_L$ of the observer by means of the lenticular lens $504_o$ thereby enabling stereoscopic observation.

In FIGS. 1A and 1B there are shown spatial areas where the stripe pixels for the right and left eyes can be respectively viewed by the cylindrical lens 504 at the central portion of the display. Also for other cylindrical lenses of the lenticular lens, similarly separated spatial areas overlap at the right and left eyes of the observer. Thus the stripe pixels for the right eye and those for the left eye can be uniformly separated and observed over the entire image, and parallax images R and L, each consisting of a group of stripe pixels, can be respectively observed by the right eye and the left eye.

In this system, the two parallax images R, L are respectively divided into vertical stripe-shaped pixels, which are alternately arranged from the left or right end of the image area as a single striped image for display on the display pixel portion 501, so that the resolution of the image display device is inevitably reduced to ½.

On the other hand, the Japanese Patent Laid-open Application Nos. 5-107663 and 7-234459 disclose stereoscopic image display apparatus of the lenticular system without such reduction in the resolution.

FIGS. 2A, 2B and 2C are views showing the basic configuration of the stereoscopic image display apparatus disclosed in the Japanese Patent Laid-open Application No. 5-107663. This stereoscopic image display apparatus is composed of a light direction switching device 601 consisting of a planar matrix light source 602 and a lenticular sheet 603, and a transmissive display device 604. The planar matrix light source 602 is provided, within the width of a lenticular lens constituting the lenticular sheet 603, with a stripe-shaped light source for the right eye (a column marked with "R" of 602R in FIG. 2B) and a stripe-shaped light source for the left eye (a column marked with "L" of 602L in FIG. 2B) as a pair.

This display apparatus functions in the following manner. When the stripe-shaped light source for the right eye (602R in FIG. 2B) is turned on to emit the illuminating light from the entire area of the lenticular sheet to the area for the right eye, a parallax image for the right eye (604R in FIG. 2C) is displayed in an odd-numbered frame in synchronization, and, when the stripe-shaped light source for the left eye (602L in FIG. 2B) is turned on to emit the illuminating light from the entire area of the lenticular sheet to the area for the left eye, a parallax image for the left eye (604L in FIG. 2C) is displayed in an even-numbered frame in synchronization. Thus the parallax image R and L need not be divided into stripe pixels but can be displayed entirely in the even and odd frames, so that the stereoscopic image display device can be realized without the loss of the resolution.

The conventional stereoscopic image display apparatus of the lenticular lens system shown in FIGS. 1A and 1B, having the lenticular lens on the liquid crystal display at the observer side thereof, is associated with drawbacks that the image quality is deteriorated by the surface reflection of the lenticular lens and that Moire fringes are formed by the black matrix of the liquid crystal display.

The conventional stereoscopic image display apparatus shown in FIGS. 2A, 2B and 2C realizes the stereoscopic view by time-divided display of the right-eye parallax image R and the left-eye parallax image L, but the image switching has to be made at a high speed in order to avoid flickering phenomenon.

Isono et al. ("Condition for time-divided stereoscopic view", J. of Television Association, Vol.41, No.6(1987), pp549–555) reported that the stereoscopic view could not be achieved in the time-divided display of a field frequency of 30 Hz, in the 2:1 interlaced scanning display system of the current television. It was also reported that, in case of opening and closing both eyes alternately, the limit frequency not sensing the flickering (CFF: critical flicker frequency) was about 55 Hz and that the field frequency needed to be at least 110 Hz in consideration of the flickering.

Thus, such conventional apparatus is associated with a drawback of requiring a display device capable of high-speed display, for the transmissive display device 604.

SUMMARY OF THE INVENTION

The object of the present invention is to provide a stereoscopic image display apparatus allowing to observe a satisfactory stereoscopic image, even with a display device with a low display speed (low frame frequency), by separating the left and right parallax images uniformly over the entire image area at the observing position of a predetermined height, and with the observation area widened in the vertical direction.

The above-mentioned object can be attained, according to an aspect of the present invention, by a stereoscopic image display apparatus comprising:

light source means for emitting light from plural apertures;

an optical element array consisting of an array of optical elements having different optical functions in the horizontal and vertical directions for giving directionality to the light from the apertures; and a transmissive display device for displaying a stripe image formed by alternately arranging, in a predetermined order, right stripe pixels and left stripe pixels obtained by dividing each of a parallax image for the right eye and a parallax image for the left eye in the vertical direction;

wherein the plural apertures are provided, for each stripe pixel, respectively corresponding to the optical elements constituting the optical element array and are adapted to direct all the light, transmitted by the left or right stripe pixel, to the predetermined respective area.

The plural apertures are preferably formed in a checkered pattern (in other words, rectangular patterns showing two colors alternately).

The pitch in the vertical direction of the apertures corresponding to the vertically adjacent stripe pixels is larger than the vertical pitch of the stripe pixels, and the width in the vertical direction of the apertures is smaller than the vertical width of the stripe pixel.

The optical element is preferably formed as a cylindrical lens having an optical power in the horizontal direction, and the optical element array is preferably composed of a horizontal array of such cylindrical lenses.

The pitch in the horizontal direction of the cylindrical lens is smaller than the pitch of the laterally adjacent ones of the apertures in the above-mentioned checkered pattern.

There is further provided means for controlling the apertures with a predetermined signal.

The control means is adapted to form the plural apertures in a predetermined area in the light source means and to cause light emission in all other areas.

The light source means is a light-emitting display device, and the control means is adapted to control the light-emitting display device.

Otherwise the light source means includes a surface illuminant and a transmissive spatial light-modulating device, and the control means is adapted to control the spatial light-modulating device.

A first stripe image, combined by alternately arranging odd one among the right stripe pixels obtained by dividing the parallax image for the right eye and even one among the left stripe pixels obtained by dividing the parallax image for the left eye, and a second stripe image, combined by alternately arranging odd ones among the left stripe pixels and even ones among the right stripe pixels, are alternately displayed over the entire area of the display device or in a predetermined area thereof.

The display is made, in switching the two stripe images to be displayed on the display device and the plural apertures formed on the light-emitting face of the light source means in raster scanning, by switching for each scanning line or for each pixel on the corresponding scanning line.

Between the light source means and the display device, there is provided a second mask having plural lateral stripe-shaped apertures respectively corresponding to the stripe pixels constituting the stripe image.

The pitch in the vertical direction of the apertures of the second mask, corresponding to the vertically adjacent stripe pixels, is larger than the vertical pitch of the stripe pixels, but is smaller than the vertical pitch of the apertures of the light source means, and the width in the vertical direction of the apertures of the second mask is smaller than the vertical width of the stripe pixels.

The stripe pixels constituting the stripe image are displayed in a scanning line of the display device.

The stripe images are displayed in 2:1 interlaced display on the display device, and a stripe image consisting solely of the right stripe pixels and another stripe image consisting solely of the left stripe pixels are displayed in respective fields.

The optical element array is adapted to convert the light beams from the apertures of the light source means into substantially parallel light beams in the horizontal cross section and into converged light beams which is substantially converged on the display device in the vertical cross section.

The optical element array is provided with a vertical cylindrical lens array, consisting of an array in the horizontal direction of a plurality of vertically elongated cylindrical lenses, and a horizontal cylindrical lens array, consisting of an array in the vertical direction of a plurality of horizontally elongated cylindrical lenses.

The pitch VL in the vertical direction of the horizontal cylindrical lens array, the pitch Vd in the vertical direction of the stripe pixels displayed on the display device, the pitch Vm of the apertures in the vertical direction, the distance L1 between the display device and the horizontal cylindrical lens array, the distance L2 between the horizontal cylindrical lens array and the light source means, and the focal length fv in the vertical cross section of the horizontal cylindrical lenses constituting the horizontal cylindrical lens array satisfy the following relations:

$$Vd:Vm=L1:L2$$

$$Vd:VL=(L1+L2)/2:L2$$

$$1/fv=1/L1+1/L2.$$

A predetermined distance from the display device to the observer stands in the following relation with the above-mentioned parameters:

$$Vd:Vm=L:(L+L1+L2).$$

The optical element array includes a toric lens array consisting of a two-dimensional array of toric lenses having different focal lengths in the vertical and horizontal directions.

The optical element array is provided with a vertical cylindrical lens array, consisting of an array in the horizontal direction of a plurality of vertically elongated cylindrical lenses, and a horizontal cylindrical lens array, consisting of an array in the vertical direction of a plurality of horizontally elongated cylindrical lenses.

The pitch VL in the vertical direction of the toric lens array, the pitch Vd in the vertical direction of the stripe pixels displayed on the display device, the pitch Vm of the apertures in the vertical direction, the distance L1 between the display device and the horizontal cylindrical lens array, the distance L2 between the toric lens array and the light source means, and the focal length fv in the vertical cross section of the toric lenses constituting the toric lens array satisfy the following relations:

$$Vd:Vm=L1:L2$$

$$Vd:VL=(L1+L2)/2:L2$$

$$1/fv=1/L1+1/L2.$$

A predetermined distance from the display device to the observer stands in the following relation with the above-mentioned parameters:

$$Vd:Vm=L:(L+L1+L2).$$

The pitch $P_{3X}$ of the optical element array in the horizontal direction, the pitch $P_{0X}$ of the apertures of the light source means, the distance L0 between the optical element array and the predetermined observer position, and the distance d1 between the optical element array and the light source means satisfy the following relation:

$$L0:(L0+d1)=P_{3X}:P_{9X}$$

The above-mentioned object can be attained, according to another aspect of the present invention, by a stereoscopic image display apparatus comprising:

light source means for emitting light from plural apertures;

an optical element array consisting of an array of optical elements having different optical functions in the horizontal and vertical directions for giving directivity to the light from the apertures; and a transmissive display device for displaying a stripe image formed by alternately arranging, in a predetermined order, right stripe pixels and left stripe pixels obtained by dividing each of a parallax image for the right eye and a parallax image for the left eye in the lateral direction;

wherein the plural apertures are provided, for each stripe pixel, respectively corresponding to the optical elements constituting the optical element array and are adapted to direct all the light, transmitted by the left or right stripe pixel, to the predetermined respective area.

The optical element is preferably formed as a cylindrical lens having an optical power in the horizontal direction, and the optical element array is preferably composed of a horizontal array of such cylindrical lenses.

The centers of the apertures corresponding to the right and left stripe pixels are shifted in mutually opposite directions, with respect to the optical axis of the cylindrical lenses respectively corresponding to the stripe pixels.

The width I of the right or left stripe pixel, the distance C from the display device to the light-condensed area, the distance E between the centers of the light-condensed areas, and the distance t from the principal plane of the cylindrical lens at the side of the display device to the display surface of the display device satisfy the following relation:

$$t=IC/(E/2-I)$$

There is further provided means for controlling the apertures with a predetermined signal.

The control means is adapted to form the plural apertures in a predetermined area in the light source means and to cause light emission in all other areas.

The light source means is a light-emitting display device, and the control means is adapted to control the light-emitting display device.

Otherwise the light source means includes a surface illuminant and a transmissive spatial light-modulating device, and the control means is adapted to control the spatial light-modulating device.

A first stripe image, combined by alternately arranging odd one among the right stripe pixels obtained by dividing the parallax image for the right eye and even one among the left stripe pixels obtained by dividing the parallax image for the left eye, and a second stripe image, combined by alternately arranging odd ones among the left stripe pixels and even ones among the right stripe pixels, are alternately displayed over the entire area of the display device or in a predetermined area thereof.

The display is made, in switching the two stripe images to be displayed on the display device and the plural apertures formed on the light-emitting face of the light source means in raster scanning, by switching for each scanning line or for each pixel on the corresponding scanning line.

The present invention will become fully apparent from the following detailed description of embodiments.

BRIEF DESCRIPTION OF THE DRAWINGS

FIGS. 25A and 25B are schematic views of the principal parts of an embodiment 10 of the stereoscopic image display apparatus of the present invention;

FIGS. 27A and 27B are schematic views showing the combining method of horizontal stripe images in the embodiment 10;

FIG. 32 is a perspective view of the embodiment 12;

FIG. 37 is schematic view showing the combining method of stripe images in the embodiment 13;

DETAILED DESCRIPTION OF THE PREFERRED EMBODIMENTS

Figure 3:
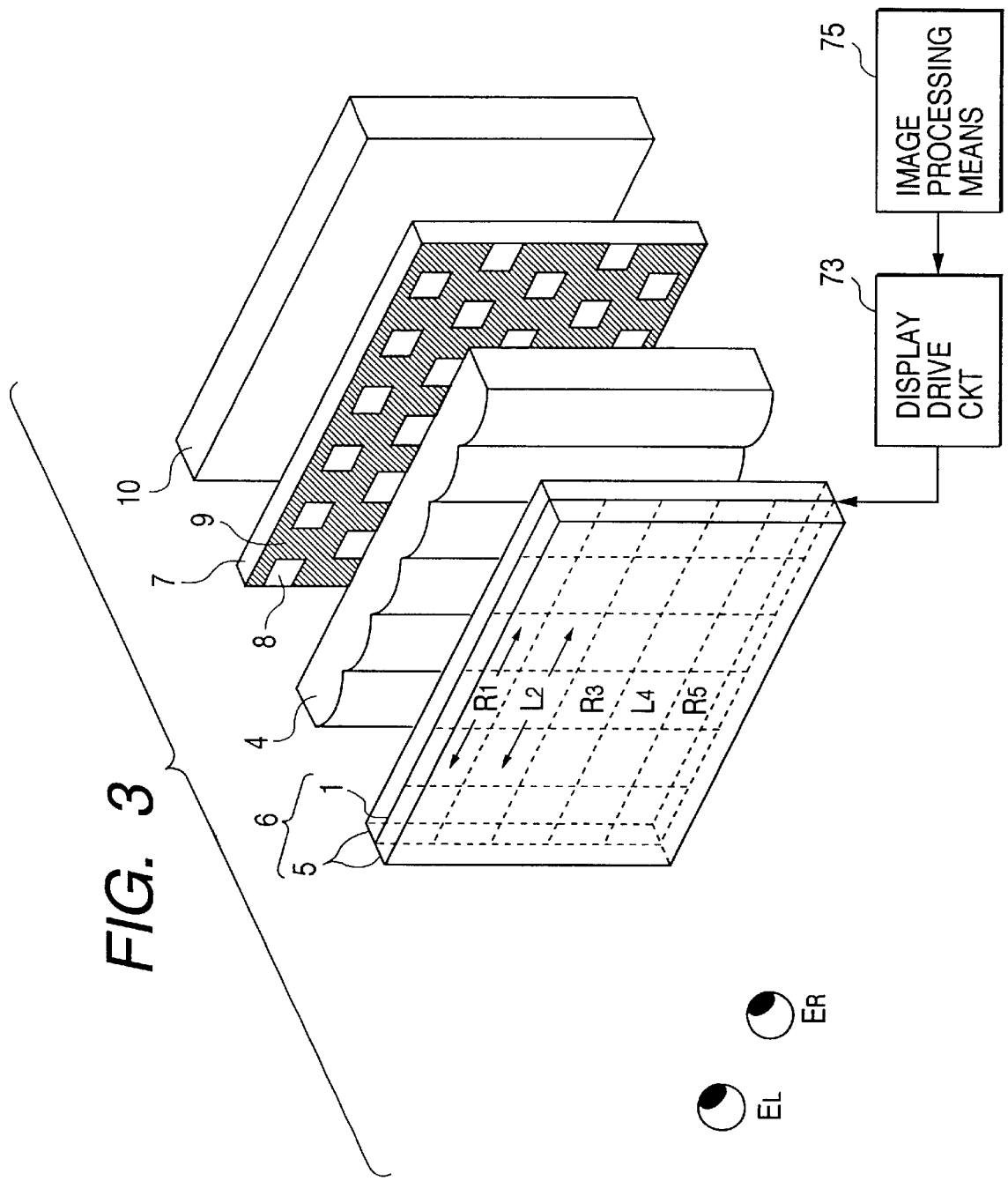
FIG. 3 is a schematic view showing the principal parts of an embodiment 1 of the present invention.

FIG. 3 is a schematic view of the principal parts of an embodiment 1 of the present invention, wherein a transmissive liquid crystal display (display device) 6 for displaying an image is composed of an image display plane (display pixel portion) 1, consisting for example of a liquid crystal layer, sandwiched between two glass substrates 5. In FIG. 3, certain components such as polarizing plates, color filters, electrodes, a black matrix and an antireflection film are omitted from the illustration. A rear light source (surface illuminant) 10 constitutes an illuminating light source. A mask substrate (mask) 7 composed of glass or resinous material is positioned opposite to the light-emitting plane of the rear light source 10, and is provided on the surface thereof with a mask pattern 9 having light-transmitting apertures (apertures A) 8 in a checkered pattern. The mask pattern 9 is composed of an evaporated metal film such as of chromium or a light absorbing material, and is prepared by patterning on the mask substrate 7. The rear light source 10, the mask substrate 7 etc. constitute components of the light source means, and the aperture bearing face of the mask substrate 7 can be regarded as a light emitting plane because the light is emitted therefrom. The mask substrate 7 functions as a mask bearing apertures 8 in the checkered pattern.

A lenticular lens 4 is formed with transparent resin or glass and is composed of an array, in the horizontal direction, of a plurality of vertically elongated cylindrical lenses each consisting of a flat surface and a cylindrical convex surface. The lenticular lens 4 is positioned between the mask substrate 7 and the liquid crystal display 6, and the curvature of the cylindrical lenses constituting the lenticular lens 4 is so selected that the mask pattern 9 is positioned substantially at the focal position of the cylindrical lenses. Also the apertures 8 in a horizontal row of the mask pattern 9 are provided respectively corresponding to the cylindrical lenses constituting the lenticular lens 4.

Image processing means 75 fetches a parallax image for the right eye (right parallax image) R and a parallax image for the left eye (left parallax image) L from an unrepresented parallax image source or generates such parallax images therein, then divides the two parallax images respectively in the vertical direction to generate right stripe pixels $R_1$, $R_2$, $R_3$, $R_4$, . . . and left stripe pixels $L_1$, $L_2$, $L_3$, $L_4$, . . . of horizontal stripe shape and arranges these stripe pixels alternately $R_1L_2R_3L_4R_5L_6$ . . . for example from the upper end of the image area to combine a horizontal stripe image, and sends the corresponding image signal to a display drive circuit 75, which in response drives the liquid crystal display 6 to display a horizontal stripe image on the image display plane 1 as shown in FIG. 3. $E_R$ and $E_L$ respectively indicate the right and left eyes of the observer.

Figure 4:
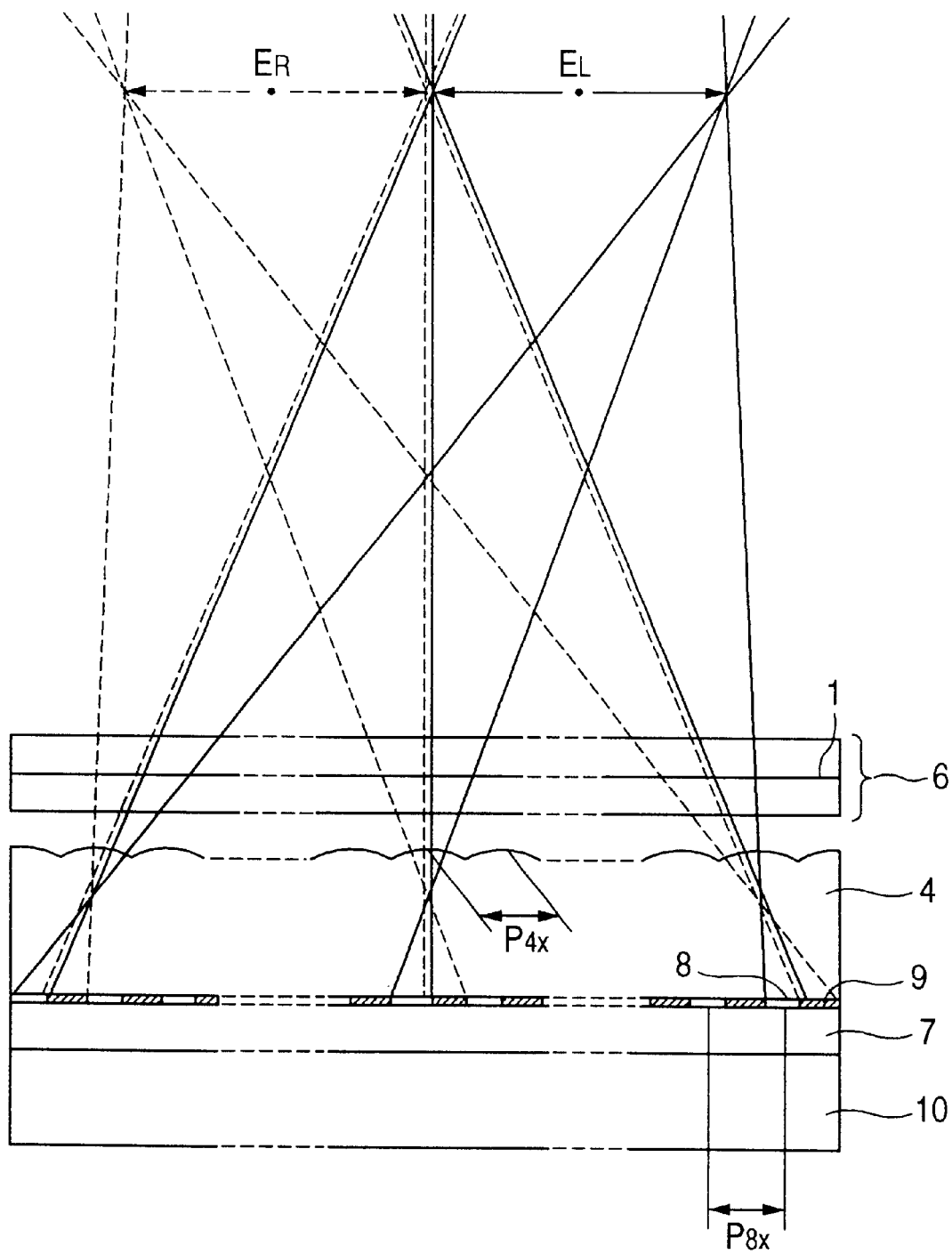
FIG. 4 is a plan view showing the principle of stereoscopic image display of the embodiment 1.

FIG. 4 is a schematic view showing the principle of observation of the parallax images in horizontally separated manner respectively by the left and right eyes of the observer, and shows a cross section of the present embodiment seen from above, by which the function of the present embodiment will be explained. The mask substrate 7 is illuminated by the rear light source 10 and the light emerges from the apertures 8. The illustrated apertures 8 correspond to the left stripe pixels Li among the horizontal stripe image displayed on the liquid crystal display 6. The light emerging from the apertures 8 is given directivity through the lenticular lens 4, then modulated by the left stripe pixels Li of the liquid crystal display 6 and emerges therefrom as indicated by solid lines. Thus the left stripe pixels Li displayed on the liquid crystal display 6 can be observed only in an area indicated by an arrow containing the left eye $E_L$.

With respect to the right eye $E_R$, the positions of the apertures 8 and the opaque portions of the mask pattern 9 are inverted from those shown in FIG. 4, so that the apertures 8 correspond to the right stripe pixels Ri displayed on the liquid crystal display 6. The light emerging from the apertures 8 is given directivity through the lenticular lens 4, then modulated by the right stripe pixels Ri of the liquid crystal display 6 and emerges therefrom as indicated by broken lines. Thus the right stripe pixels Ri displayed on the liquid crystal display 6 can be observed only in an area indicated by an arrow containing the left eye $E_R$.

In order that the light from the apertures 8 over the entire image area can be uniformly received by the left eye $E_L$ or the right eye $E_R$, the pitch $P_{4X}$ of the lenticular lens 4 is selected slightly smaller than the horizontal pitch $P_{8X}$ of the apertures 8 of the mask pattern 9.

Through the above-explained function, the light transmitted by the left and right stripe pixels Li, Ri is all delivered in horizontally separate manner to the two areas, and the observer, by placing the left and right eyes respectively in these two areas, can observe left and right parallax images L, R, each consisting of a group of stripe pixels, thereby observing a stereoscopic image.

Figure 1A:
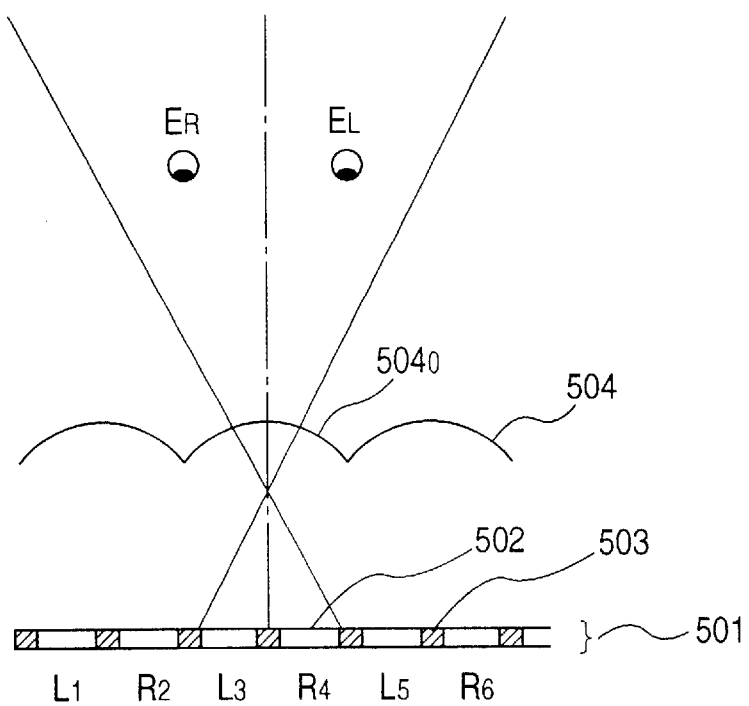
FIGS. 1A and 1B are schematic views of a conventional example.
Figure 1B:
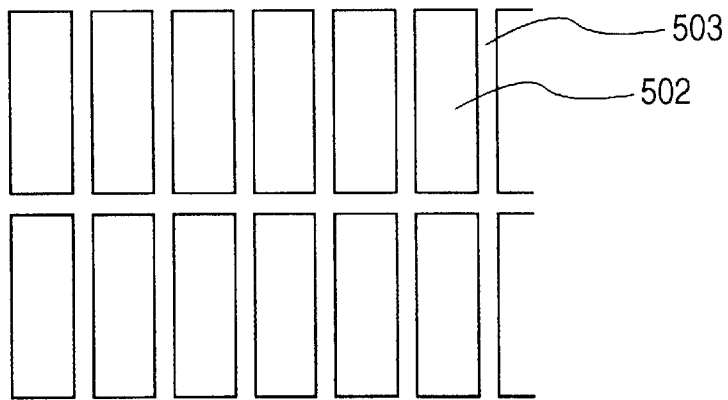
Figure 2A:
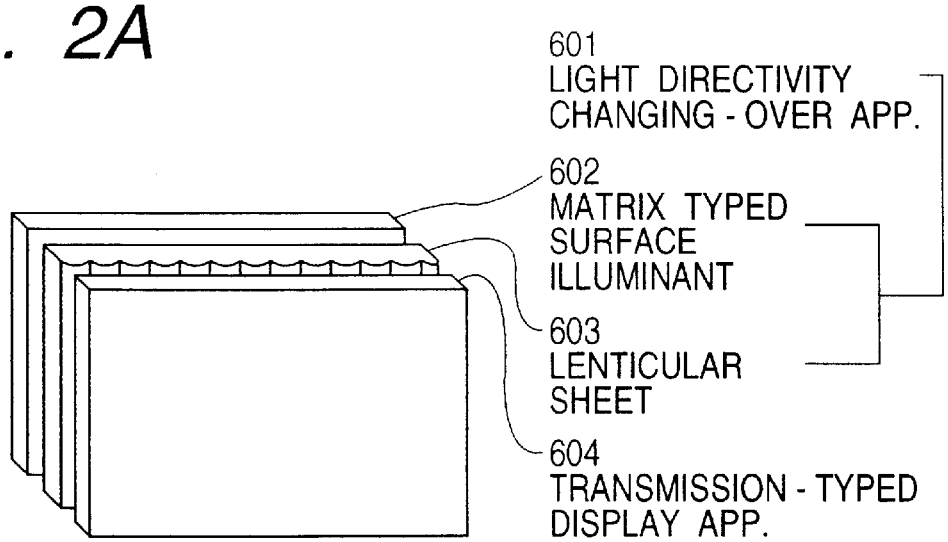
FIGS. 2A, 2B and 2C are schematic views showing the configuration of another conventional example.
Figure 2B:
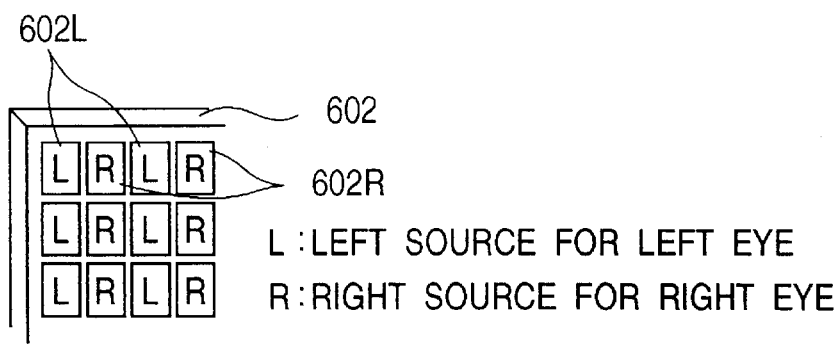
Figure 2C:
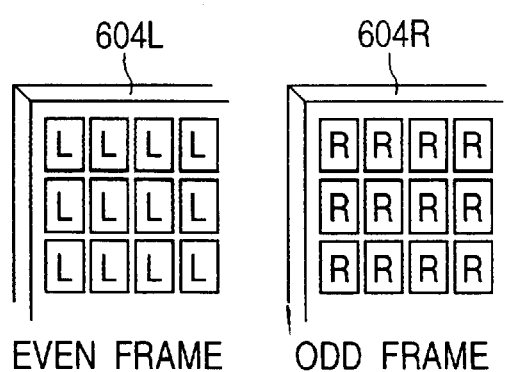
Figure 5A:
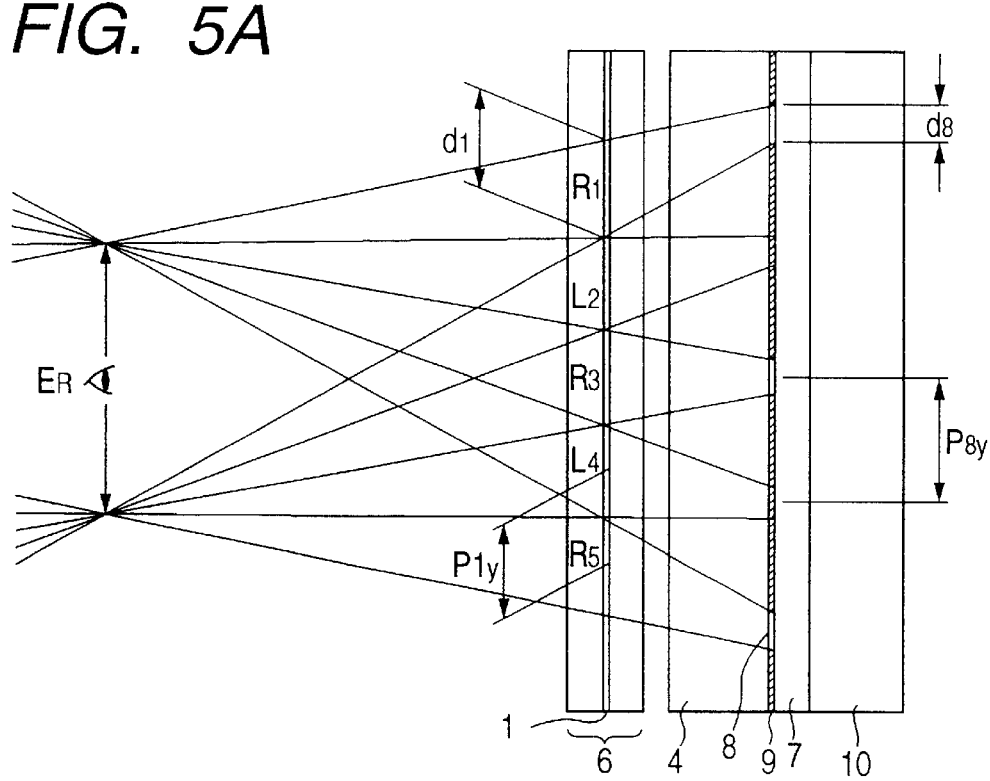
FIGS. 5A and 5B are side views showing the principle of stereoscopic image display of the embodiment 1.
Figure 5B:
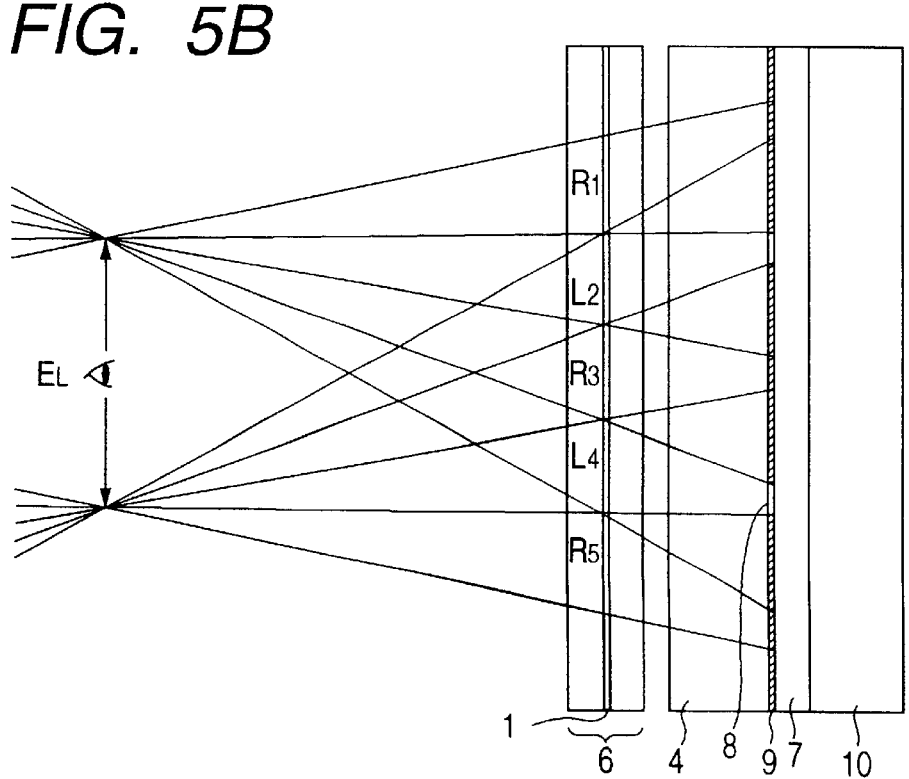
Figure 6:
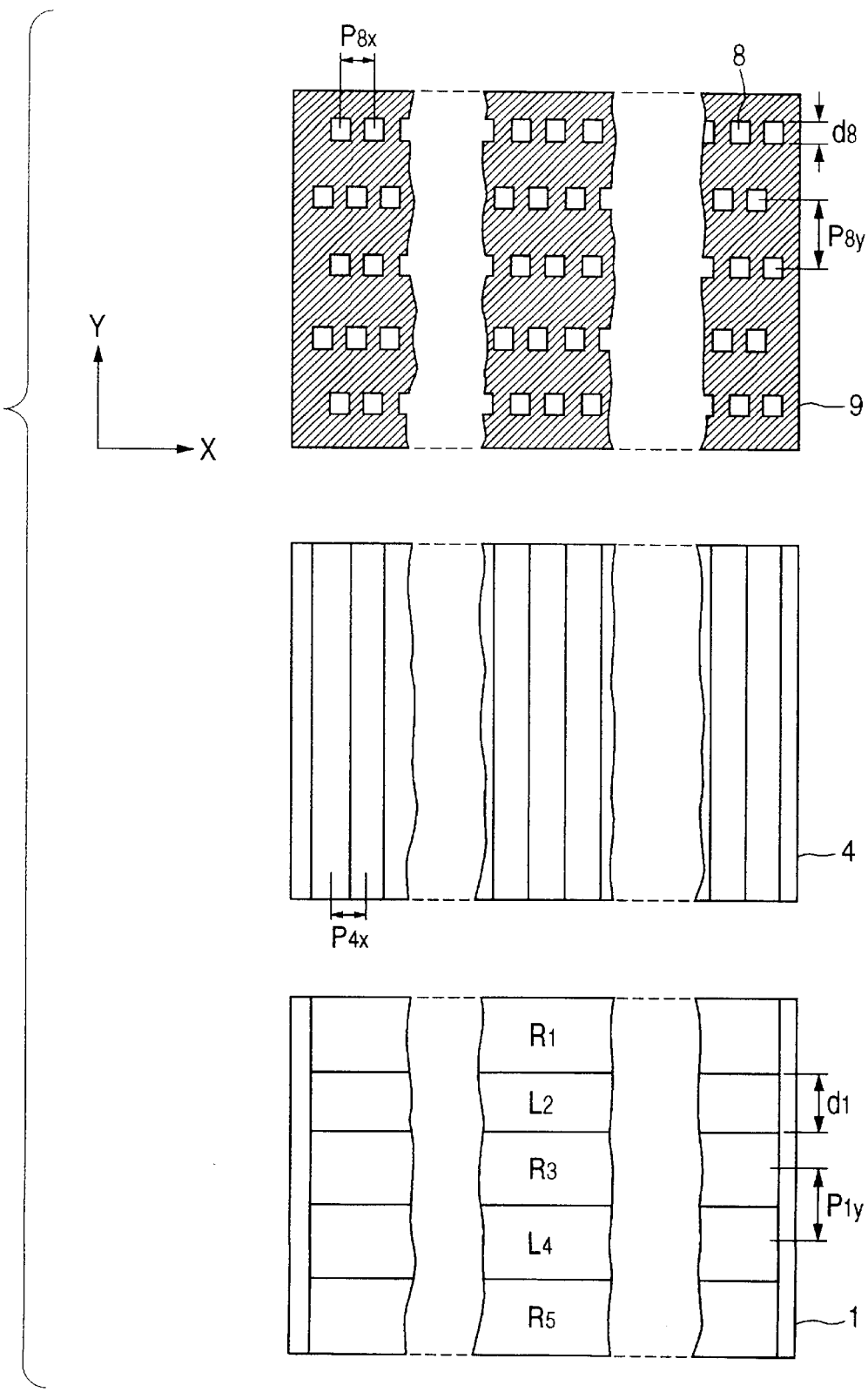
FIG. 6 is an elevational view of a mask pattern 9, a lenticular lens 4 and an image display plane 1 in the embodiment 1.

FIGS. 5A and 5B are cross-sectional views in the vertical direction of the present embodiment, respectively showing the observation optical path of the right stripe pixels Ri observed by the right eye $E_R$ and that of the left stripe pixels Li observed by the left eye $E_L$, and FIG. 6 is an elevational view of the mask pattern 9, the lenticular lens 4 and the image display plane 1. The observation area in the vertical direction will be explained with reference to these drawings. The apertures 8 of the mask pattern 9 are arranged in a checkered pattern as shown in FIG. 1, and correspond respectively, in the vertical direction, to the stripe pixels displayed on the liquid crystal display 6, and, in the horizontal direction, to the cylindrical lenses for each kind of the stripe pixels. As the pitch $P_{8Y}$ of the apertures 8 in the vertical direction is selected slightly larger than the pitch $P_{1Y}$ of the stripe pixels displayed on the liquid crystal display 6, the observer in a predetermined observing distance from the liquid crystal display 6 can observe the apertures 8 through the stripe pixels displayed on the liquid crystal display 6. Thus there can be obtained an observation area in which the eyes of the observer at a certain height can observe the left and right stripe pixels in uniformly separated manner, over the entire vertical width of the image area.

Also the vertical width $d_8$ of the apertures 8 is selected smaller than the width $d_1$ of the stripe pixel so that, even when the eyes of the observer move in the vertical direction to cause a certain displacement between the relative position of the stripe pixels and the corresponding apertures 8 seen from the observer, such stripe pixels can still be observed as the vertical adjacent stripe pixels do not come into the apertures 8. Consequently the observation area in the vertical direction can be widened to a range indicated by an arrow in FIGS. 5A and 5B.

Figure 7:
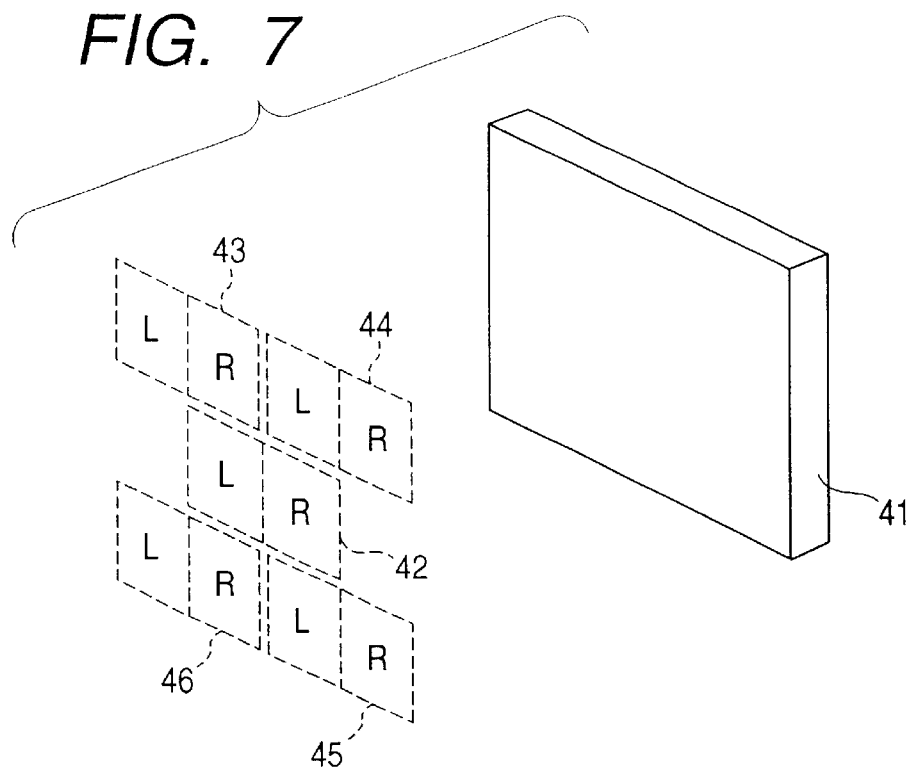
FIG. 7 is a schematic view showing the stereoscopic viewing area of the embodiment 1.

Combining the situations shown in FIGS. 4, 5A and 5B, the stereoscopic view can be obtained in areas shown in FIG. 7, wherein numeral 41 indicates the stereoscopic image display apparatus of the embodiment 1. Numeral 42 indicates a central area where the stereoscopic observation is possible, spatially composed of a pair of an area where the right parallax image R only can be observed and an area where the left parallax image L only can be observed. If the observer moves in the vertical direction from the central stereoscopic observation area 42, the areas capable observing the left and right parallax images become inverted. Therefore the stereoscopic observation is possible in areas 43–46. Such stereoscopic observation areas are formed periodically in the vertical and horizontal directions, and there are still other such areas, though they are not illustrated.

As explained in the foregoing, the present embodiment, because of appropriate selection of the horizontal pitch and the vertical width of the apertures 8, allows uniform concentration of the left and right stripe pixels constituting the stereoscopic observation area, and also allows to secure a wide stereoscopic observation area in the vertical direction.

Also the present embodiment, having the lenticular lens 4 and the mask pattern 9 behind the liquid crystal display 6 when seen from the side of the observer to obtain directional illuminating light, allows to obtain a clear display of the stereoscopic image without the surfacial reflection by the lenticular lens or the Moire fringes of a high contrast generated by the black matrix of the liquid crystal display 6.

The stripe pixels constituting the horizontal stripe image to be displayed on the liquid crystal display may be obtained by alternate arrangement by the width of a single scanning line or by the width of plural scanning lines.

In case of alternately displaying the right and left stripe pixels by every scanning line, it is also possible to employ the 2:1 interlaced scanning known in the television technology and to display the right stripe pixels in a field and the left stripe pixels in a next field. Such method is particularly suitable for stereoscopic display of a natural image obtained for example with television cameras.

It is also possible to employ, instead of the rear light source 10 and the mask substrate 7, a light-emitting display device such as a CRT or a fluorescent display tube as the light source means, to form apertures of a checkered pattern similar to the mask pattern 9 on the light-emitting face of such display device and to give the directionality to the light emerging from such apertures.

The present embodiment employs the lenticular lens composed of cylindrical lenses each consisting of a flat surface and a convex cylindrical surface, but there may also be employed a cylindrical lens array composed of cylindrical lenses of which two faces are composed of curved faces.

Figure 8:
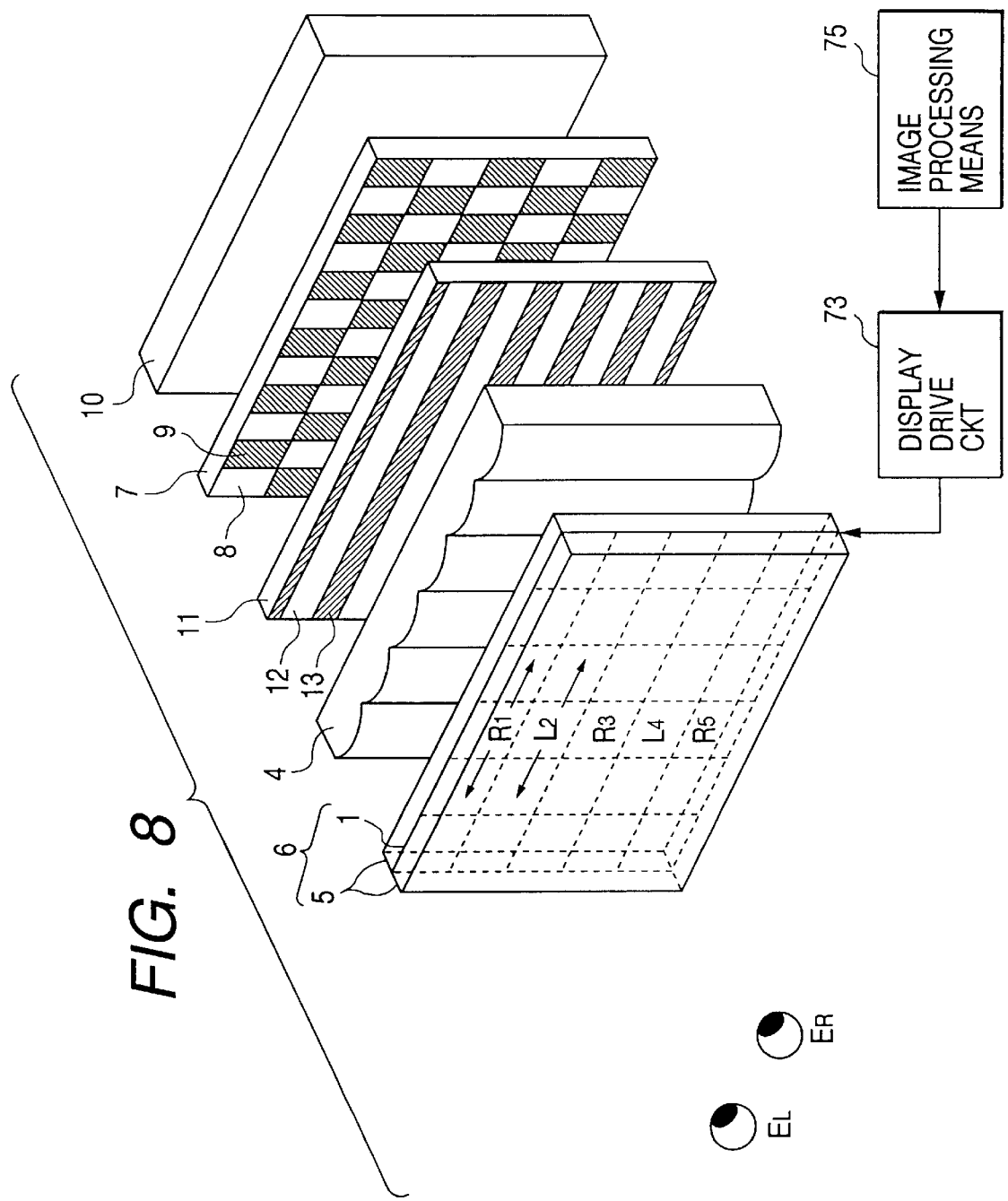
FIG. 8 is a schematic view of the principal parts of an embodiment 2 of the present invention.

FIG. 8 is a schematic view of the principal parts of an embodiment 2 of the present invention, wherein another second mask substrate (second mask) 11 is provided between the mask substrate 7 and the lenticular lens 4 of the embodiment 1.

The second mask substrate 11 is provided thereon with a mask pattern 13 having plural horizontal stripe-shaped apertures 12 (apertures B) with a pitch $P_{12Y}$, corresponding to the stripe pixels on the liquid crystal display 6.

The principle of horizontal separation of the parallax images R, L respectively to the right and left eyes of the observer is same as that in the embodiment 1. More specifically, the mask pattern 9 of the mask substrate 7 is positioned substantially at the focal positions of the cylindrical lenses constituting the lenticular lens 4. The light emerging from the apertures 8 of the mask pattern 9 is partly transmitted by apertures 12 of the second mask substrate 11, then given directivity by the lenticular lens 4, further modulated by the left and right stripe pixels displayed on the liquid crystal display 6 and reaches the left or right eye of the observer, whereby the left and right parallax images L, R are separated in the horizontal direction and are observed by the observer.

Figure 9A:
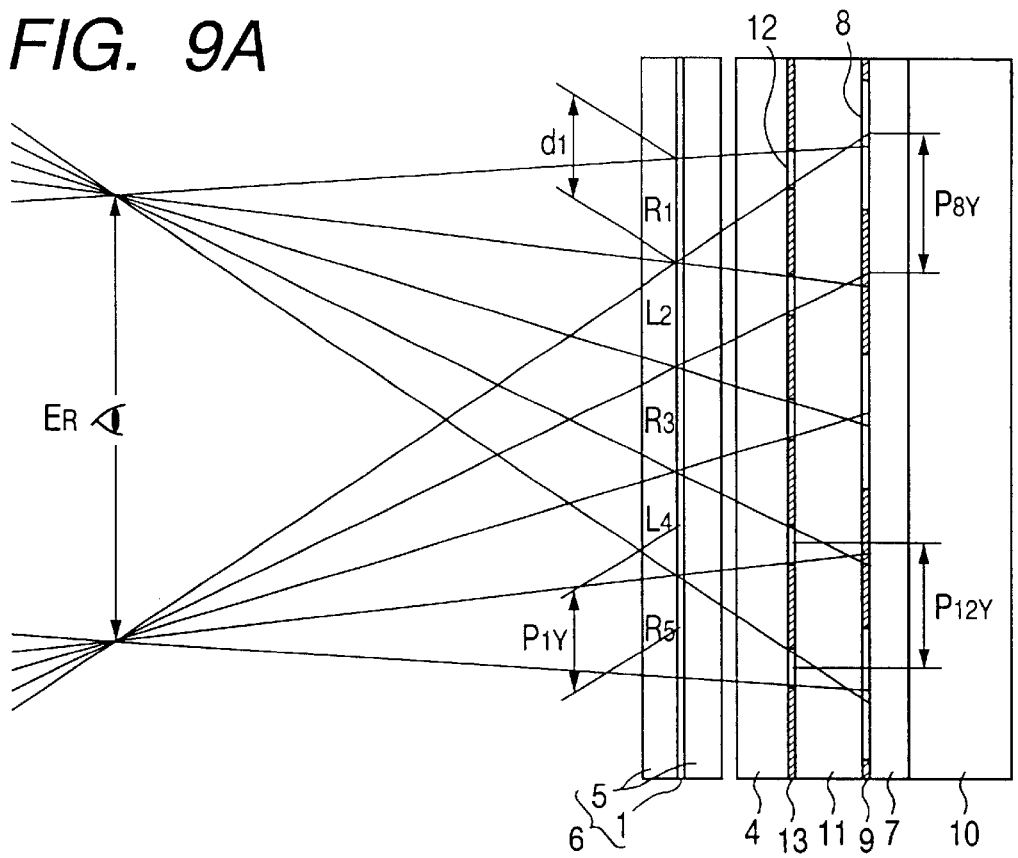
FIGS. 9A and 9B are schematic side views showing the stereoscopic image display method of the embodiment 2.
Figure 9B:
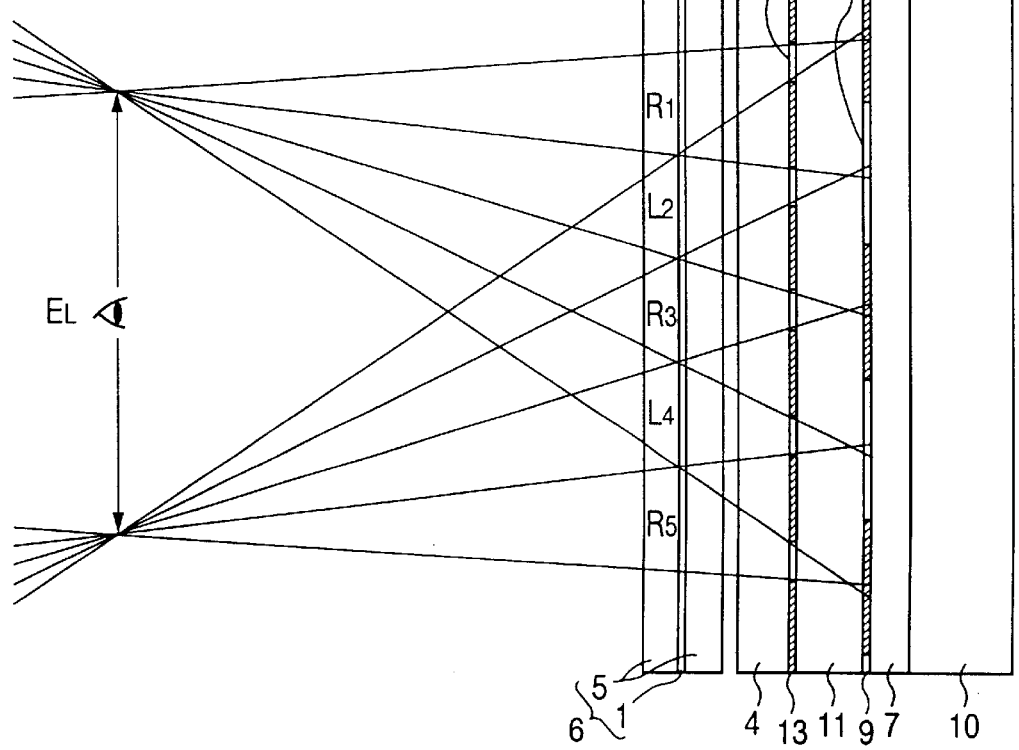
Figure 10:
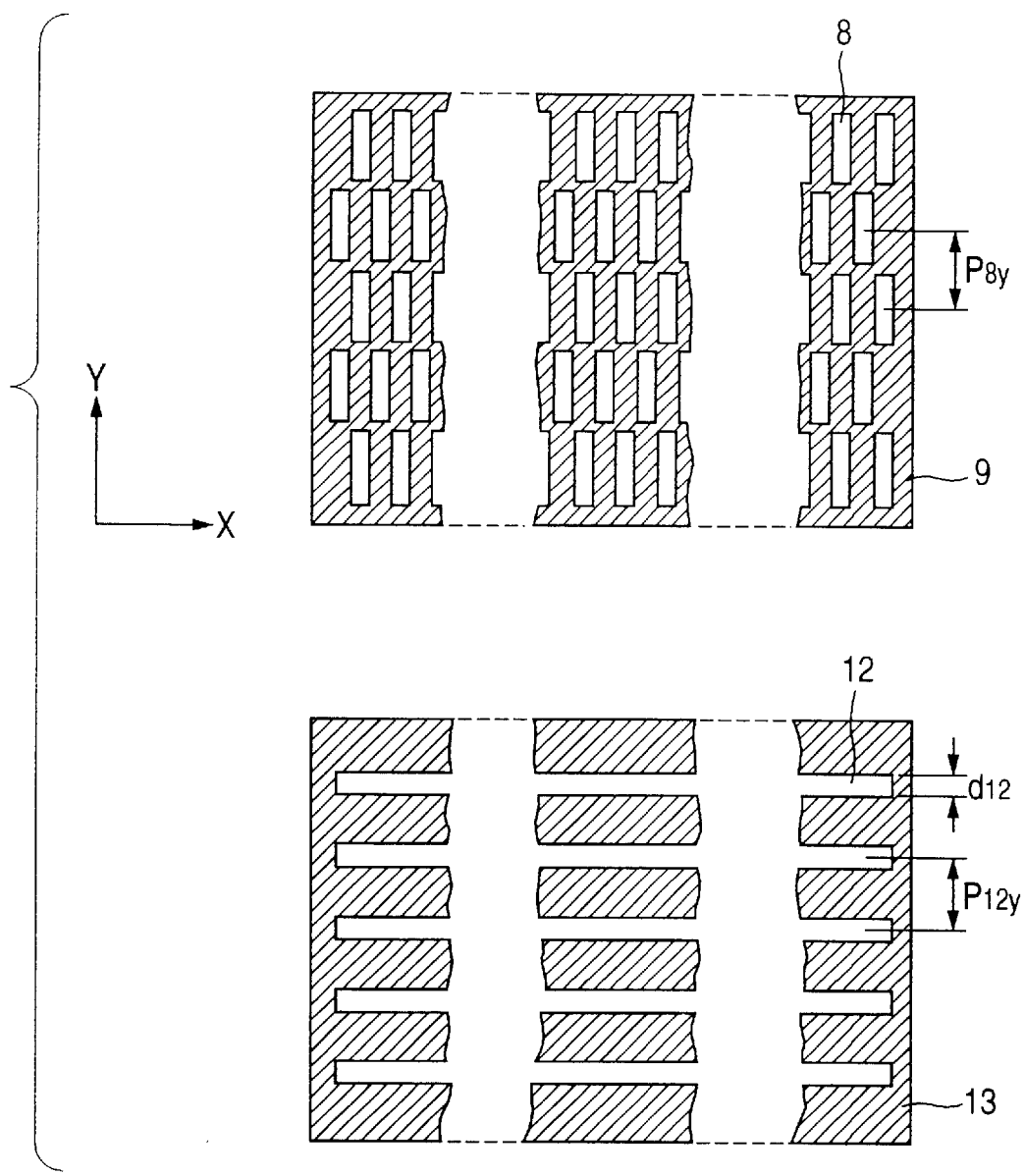
FIG. 10 is an elevation view of mask patterns 9 and 13 of the embodiment 2.

The second mask substrate 11 is provided to expand the stereoscopic observation range in the vertical direction. FIGS. 9A and 9B are cross-sectional views of the present embodiment in the vertical direction, showing the stereoscopic image display method of the present embodiment. FIG. 9A shows the observation optical paths of the right stripe pixels Ri observed by the right eye $E_R$, and FIG. 9B shows the observation optical paths of the left stripe pixels Li observed by the left eye $E_L$. Also FIG. 10 is an elevation view of the mask patterns 9 and 13 of the present embodiment. The function thereof will now be explained with reference to these drawings.

The apertures 12 of the mask pattern 13 of the mask substrate 11 respectively correspond to the stripe pixels displayed on the liquid crystal display 6, and the vertical pitch $P_{12Y}$ of the apertures 12 is selected slightly larger than the pitch $P_{1Y}$ of the stripe pixels displayed on the liquid crystal display 6. Thus the observer observes the apertures 8 through the stripe pixels displayed on the liquid crystal display 6 and also through the horizontal stripe-shaped apertures 12, so that, at a predetermined eye height, the observer can observe the left and right stripe pixels in horizontally separate manner, uniformly over the entire vertical width of the image area.

The light incident on the eyes of the observer through the apertures 12 of the mask pattern 13 has been transmitted by the corresponding checkered-patterned apertures 8 of the mask pattern 9, then is given directivity toward the left and right eyes of the observer by the lenticular lens 4 and is then transmitted by the corresponding stripe pixels only.

In such arrangement, the vertical pitch $P_{8Y}$ of the checkered-patterned apertures 8 of the mask pattern 9 is selected slightly larger than the vertical pitch $P_{12Y}$ of the apertures 12 of the mask pattern 13, whereby, at a predetermined eye height, the observer can uniformly observe the stereoscopic image without aberration in the correspondence between the apertures and the left and right stripe pixels in the vertical direction, over the entire vertical width of the image area.

Also the vertical width $d_{12}$ of the apertures 12 of the mask pattern 13 is selected smaller than the width $d_1$ of the stripe pixels, whereby, even when the eye height of the observer is displaced in the vertical direction to cause a displacement in the relative position between a given stripe pixel and a corresponding aperture 12, the observer can still observe such stripe pixel without the vertically adjacent stripe pixel coming into the area of the corresponding aperture 12, so that the observation area in the vertical direction can be widened to a range indicated by an arrow in FIG. 7.

In this situation, the distance between the mask patterns 13 and 9 has to be optimized in order that the light transmitted by the apertures 12 of the mask pattern 13 is not mixed with the light of different directivities coming from an aperture of the mask pattern 9 vertically adjacent to the corresponding aperture 8.

When the height of the eyes of the observer is displaced from the stereoscopic observation area shown in FIGS. 9A and 9B to a vertically adjacent stereoscopic observation area, the light passing through the apertures 12 of the mask pattern 13 now corresponds to an aperture of the mask pattern 9 of the mask substrate 7, vertically adjacent to the originally corresponding aperture 8, whereby the directionality in the horizontal direction is inverted, and, at the same time the correspondence is made to the stripe pixels adjacent to those that have been observed, so that the areas of the left and right parallax images are not inverted.

Figure 11:
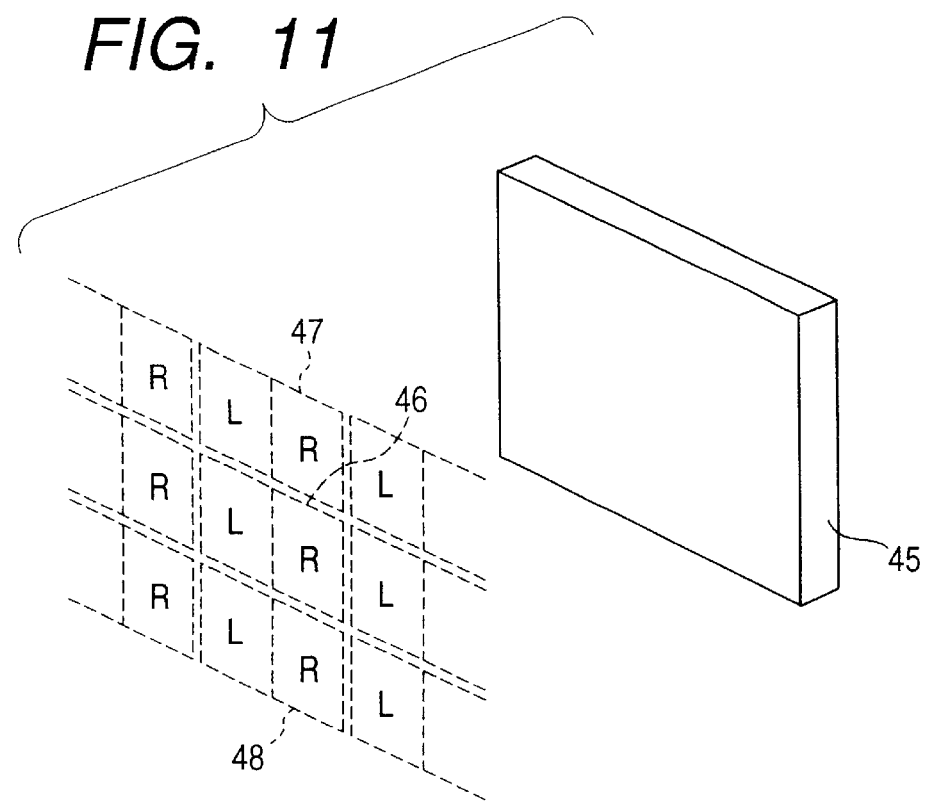
FIG. 11 is a schematic view showing the stereoscopic viewing area of the embodiment 2.

Combining the situations shown in FIGS. 4, 9A and 9B, the stereoscopic view can be obtained in areas shown in FIG. 11, wherein numeral 45 indicates the stereoscopic image display apparatus of the embodiment 2. Numeral 46 indicates a central stereoscopic observation area, spatially composed of a pair of an area where the right parallax image R only can be observed and an area where the left parallax image L only can be observed.

In the present embodiment, different from the embodiment 1, the areas capable of respectively observing the left parallax image L and the right parallax image R are not inverted even when the observer moves vertically from the central stereoscopic observation area 46, so that stereoscopic observation areas 47, 48 are obtained. Such stereoscopic observation areas are formed periodically in the vertical and horizontal directions, and there are still other such areas, though they are not illustrated.

The present embodiment is different from the embodiment 1 in that the apertures 8 of the mask pattern 9 are positioned at the focal positions of the lenticular lens 4 and that the mask pattern 13 having the apertures 12 for controlling the stereoscopic observation area in the vertical direction is provided independently to expand the stereoscopic observation area in the vertical direction.

Also the present embodiment, having the lenticular lens 4 and the two mask patterns behind the liquid crystal display 6 when seen from the side of the observer to obtain directional illuminating light, allows to obtain a clear display of the stereoscopic image without the surfacial reflection by the lenticular lens or the Moire fringes of a high contrast generated by the black matrix of the liquid crystal display 6.

In the present embodiment, the second mask pattern 13 having the horizontal stripe-shaped apertures is positioned between the lenticular lens 4 and the mask pattern 9 with the checkered-patterned apertures, but a similar effect can also be obtained by arranging the mask pattern 13 between the liquid crystal display 6 and the lenticular lens 4.

Figure 12:
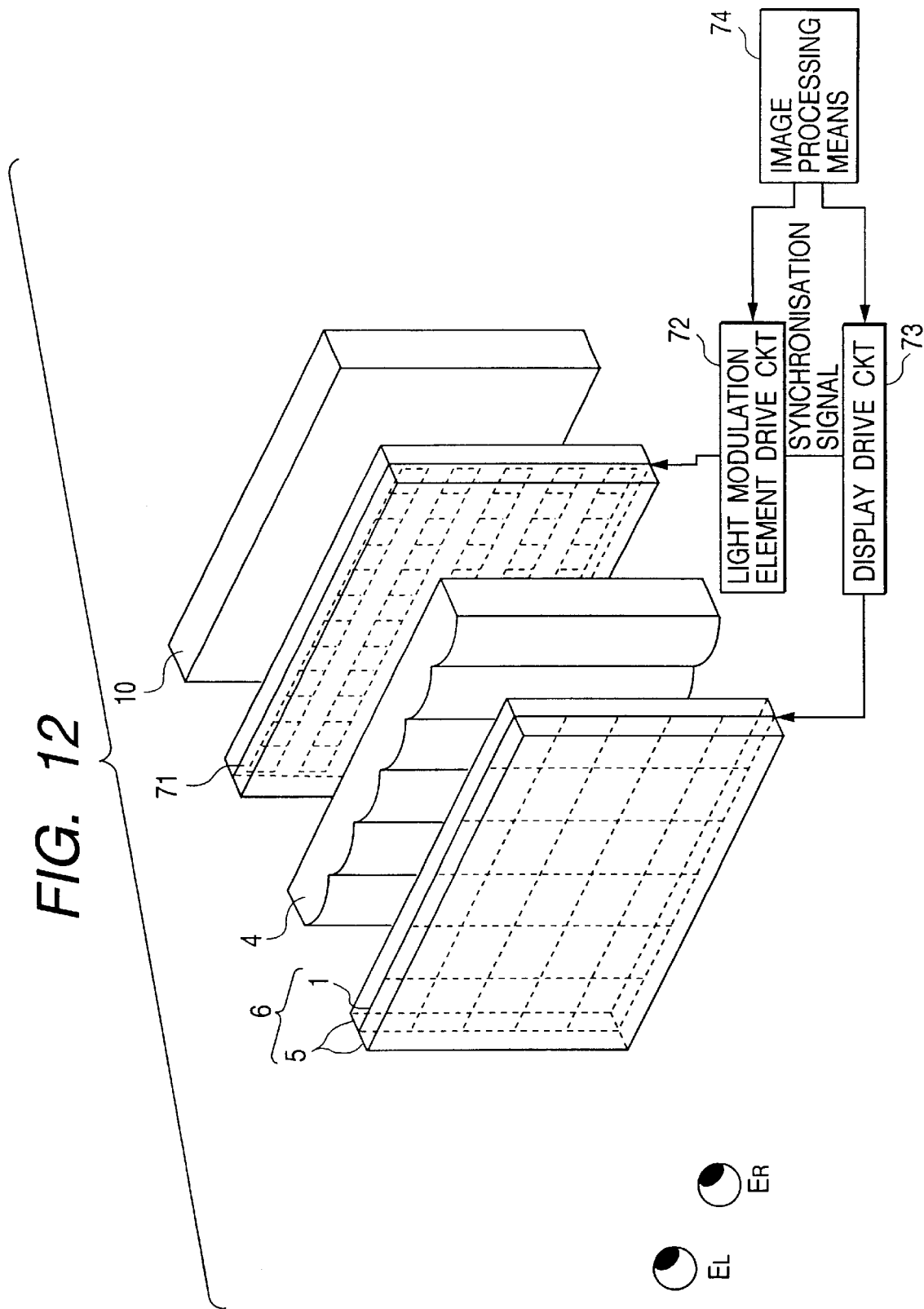
FIG. 12 is a schematic view of the principal parts of an embodiment 3 of the present invention.

FIG. 12 is a schematic view of the principal parts of an embodiment 3 of the present invention, wherein the mask substrate 7 of the embodiment 1 having the fixed checkered mask pattern is replaced by a transmissive spacial light modulating element 71 such as a transmissive liquid crystal display device for forming thereon a mask pattern having checkered-patterned light-transmitting portions (apertures), which is changed in synchronization with the stripe image displayed on the liquid crystal display 6.

Image processing means 74 fetches a parallax image for the right eye (right parallax image) R and a parallax image for the left eye (left parallax image) L from an unrepresented parallax image source or generates such parallax images therein, then divides the two parallax images respectively in the vertical direction to generate right stripe pixels $R_1$, $R_2$, $R_3$, $R_4$, ... and left stripe pixels $L_1$, $L_2$, $L_3$, $L_4$, ... of horizontal stripe shape and arranges these stripe pixels alternately $R_1 L_2 R_3 L_4 R_5 L_6$ ... for example from the upper end of the image area to combine a horizontal stripe image, and sends the corresponding image signal to a display drive circuit 73, which in response drives the liquid crystal display 6 to display a horizontal stripe image on the image display plane 1 as shown in FIG. 12. At the same time the image processing means 74 generates a mask pattern with apertures corresponding to the horizontal stripe image, and sends the corresponding image signal to a light modulation element driving circuit 72, which drives a spatial light modulation element 71 to display the mask pattern thereon. $E_R$ and $E_L$ respectively indicate the right and left eyes of the observer.

The rear light source 10, the spatial light modulation element 71 etc. constitute components of the light source means, and the display plane of the spatial light modulation element 71 can be regarded as a light emitting plane because the light is emitted therefrom.

Figure 13A:
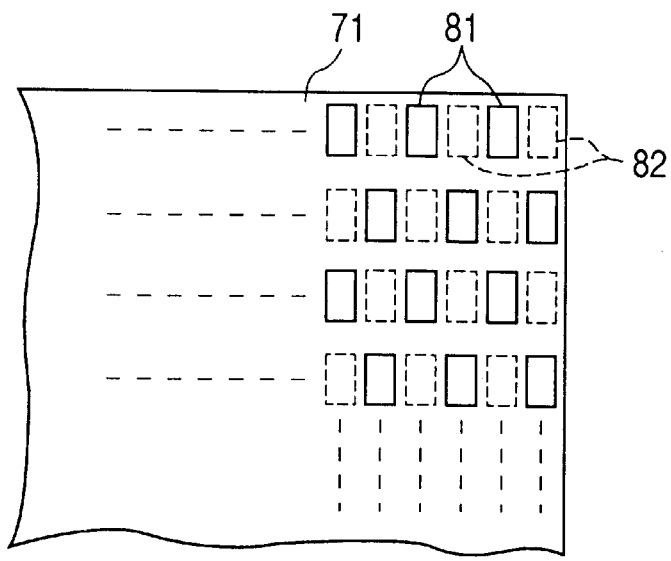
FIGS. 13A, 13B and 13C are schematic lateral views showing the stereoscopic image display method of the embodiment 3.
Figure 13B:
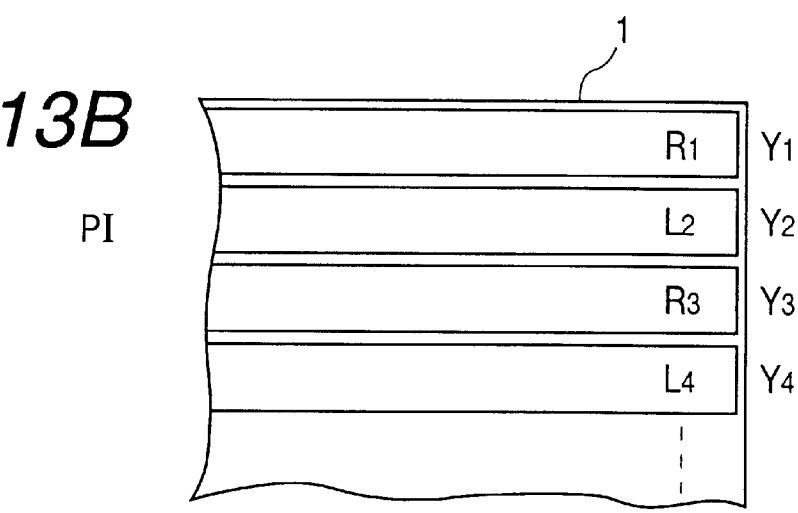
Figure 13C:
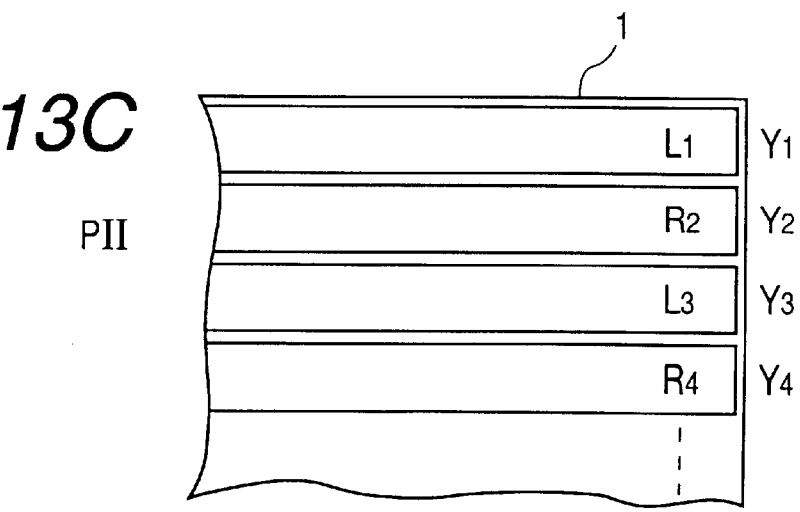

FIGS. 13A, 13B and 13C are schematic views showing the stereoscopic image display method of the present embodiment. FIG. 13A shows the pattern of the light transmitting portions (apertures) and the light intercepting portions of the spatial light modulation element 71, while FIGS. 13B and 13C show the image display plane 1 of the liquid crystal display 6, on which displayed is a stripe image obtained by respectively dividing the left and right parallax images L, R into horizontal stripe pixels and arranging such stripe pixels alternately from the upper end of the image area.

When the spatial light modulation element 71 forms a pattern of the light transmitting portions 81 indicated by solid lines in FIG. 13A, the image display plane 1 displays, as shown in FIG. 13B, a first horizontal stripe image PI combined from a right stripe pixel R1 in a first scanning line Y1, a left stripe pixel L2 in a second scanning line Y2, a right stripe pixel R3 in a third scanning line Y3 etc. Thus the left and right stripe pixels Li, Ri are respectively observed by the left and right eyes through the horizontally separated light beams, and the stereoscopic image is observed from the left and right parallax images each formed by a group of stripe pixels.

Then, when the spatial light modulation element 71 is switched to form a pattern of the light transmitting portions 82 indicated by broken lines in FIG. 13A, the image display plane 1 displays, as shown in FIG. 13C, a second horizontal stripe image PII combined from a left stripe pixel L1 in a first scanning line Y1, a right stripe pixel R2 in a second scanning line Y2, a left stripe pixel L3 in a third scanning line Y3 etc. Thus the left and right stripe pixels Li, Ri are respectively observed by the left and right eyes through the horizontally separated light beams, and the stereoscopic image is observed from the left and right parallax images each formed by a group of stripe pixels.

By alternately displaying the above-mentioned two states on time-divided basis, the left and right parallax images L, R can be displayed without the loss of resolution, in contrast to the foregoing embodiments in which the resolution is reduced to a half by the combination of the horizontal stripe image.

In the conventional stereoscopic display system in which the left and right parallax images are displayed field by field on time-divided basis, the frame frequency has to be raised to about 120 Hz for preventing the flickering phenomenon, but the stereoscopic image display apparatus of the present embodiment allows the observation with a high resolution without the flickering phenomenon even with a frame frequency of 60 Hz, since the left and right parallax images are displayed by combination into a horizontal stripe image.

In case the re-writing speed of the image display plane 1 of the liquid crystal display 6 and that of the spatial light modulation element 71 are mutually different, the re-writing operation of the display drive circuit 73 and that of the light modulation element drive circuit 72 are preferably combined as shown in FIG. 12, in order to combine the re-writing of the stripe image and that of the mask pattern of the apertures so that the observer does not notice the difference.

Such re-writing operation may be made for each pixel on the corresponding scanning line on the image display plane of the liquid crystal display 6 and the spatial light modulation element 71, or the each corresponding scanning line thereof.

The present embodiment is realized by replacing the mask substrate 7 of the embodiment 1 with the spatial light modulation element 71, but it is also possible to improve the resolution of the embodiment 2 by replacing the mask substrate 7 thereof with the spatial light modulation element 71 and effecting the operation in a similar manner as in the present embodiment.

Figure 14A:
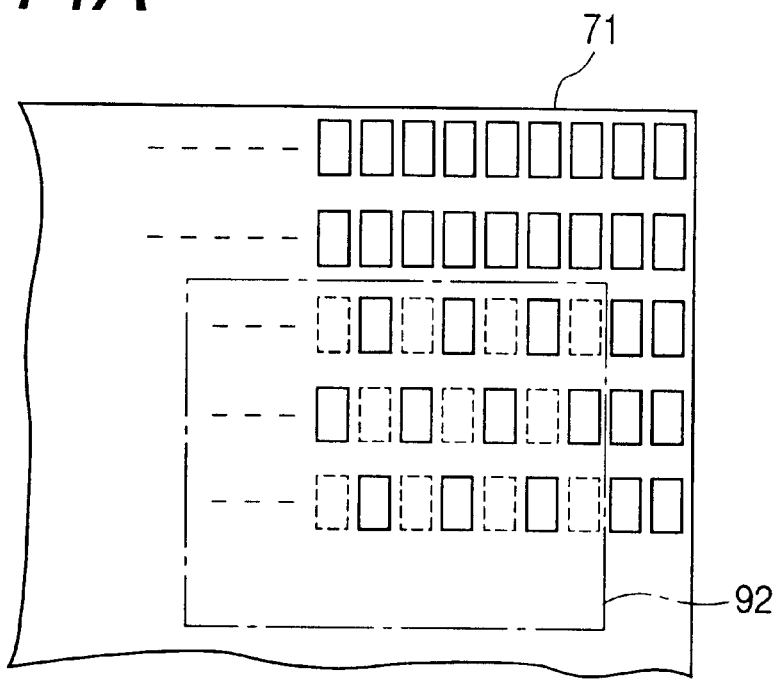
FIGS. 14A and 14B are schematic views of an embodiment 4 of the present invention.
Figure 14B:
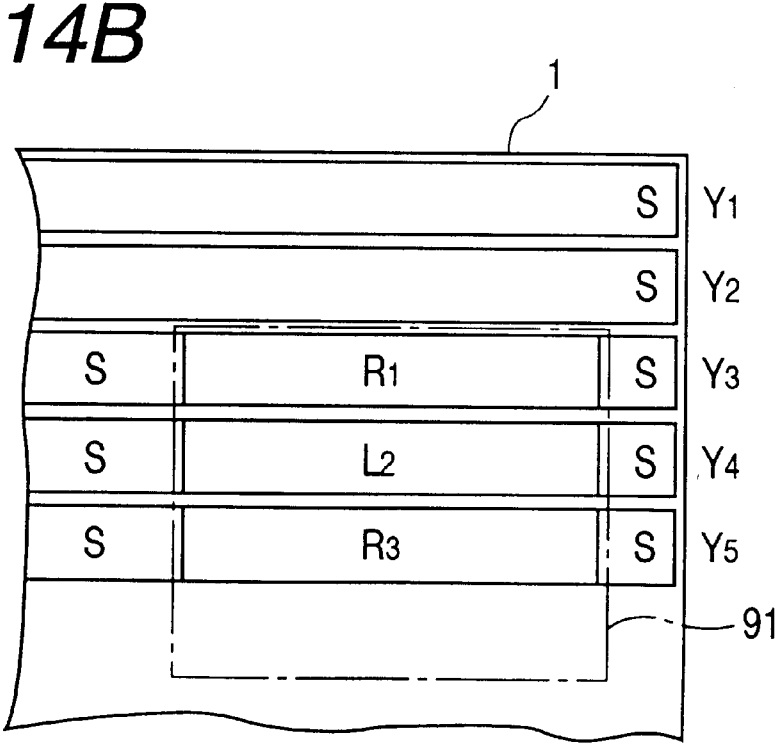

FIGS. 14A and 14B are schematic views of an embodiment 4 of the present invention, which is almost same in configuration as the embodiment 3 but is different in the image display method. Different from the foregoing embodiments, the present embodiment displays a stereoscopic image only in a predetermined area in the image display plane 1 of the liquid crystal display 6 and displays an ordinary two-dimensional image in the remaining area.

FIG. 14A shows the pattern of the light transmitting portions (apertures) and the light intercepting portions of the spatial light modulation element 71, and FIG. 14B shows an image pattern displayed on the image display plane 1 of the liquid crystal display 6.

In a stereoscopic display area 91 in the image display plane 1, there is displayed, as explained in the embodiment 3, a first horizontal stripe image PI or a second horizontal stripe image PII combined by alternate arrangement of the left and right stripe pixels, and an ordinary two-dimensional image S is displayed in other areas.

On the spatial light modulation element 71, a mask pattern with the checkered-patterned apertures is formed in an area 92 corresponding to the area 91, and the light transmitted by these apertures is so given directivity that the light beams from the left and right stripe pixels Li, Ri are respectively directed to the left and right eyes in mutually separate manner. The spatial light modulation element 71 is rendered light transmitting except the area 92, whereby the two-dimensional image S reaches both the left and right eyes. Such light transmitting state of the spatial light modulation element 71 except the area 92 corresponds to the light emission in all the areas, except the area 92, in the light emitting plane of the light source means.

The stereoscopic image display only in the area 91 by alternately displaying the first horizontal stripe image PI and the second horizontal stripe image PII and switching the aperture pattern of the area 92 in synchronization as in the third embodiment enables observation of the stereoscopic image with a high resolution in the two-dimensional image.

It is also possible to display the stereoscopic image only in a part of the image area as in the embodiment 4, by replacing the spatial light modulation element 71 with the mask substrate 7 of the embodiment 1 having the fixed pattern and forming checkered-patterned apertures in the area for displaying the stereoscopic image.

The foregoing embodiments enable observation of the satisfactory stereoscopic image even with a display device of a low display speed (frame frequency) because the left and right parallax images L, R composed of stripe pixels constantly enter the respective eyes, in contrast to the conventional time-divided display method of the left and right parallax images in which the frame frequency of the display device has to be elevated in order to fuse the left and right parallax images by the remaining image effect of the eyes. Consequently the stereoscopic image display apparatus can be constructed more easily.

Also the vertical pitch of the apertures 8 of the mask pattern 9 is selected larger than the vertical pitch of the stripe pixels displayed on the display device, the observer at the observing position at a predetermined height can observe the stereoscopic image by uniformly separating the left and right parallax images L, R over the entire image area.

Also the vertical width $d_8$ of the apertures 8 of the mask pattern 9 is selected smaller than the width of the stripe pixels to expand the observation area in the vertical direction.

Figure 15:
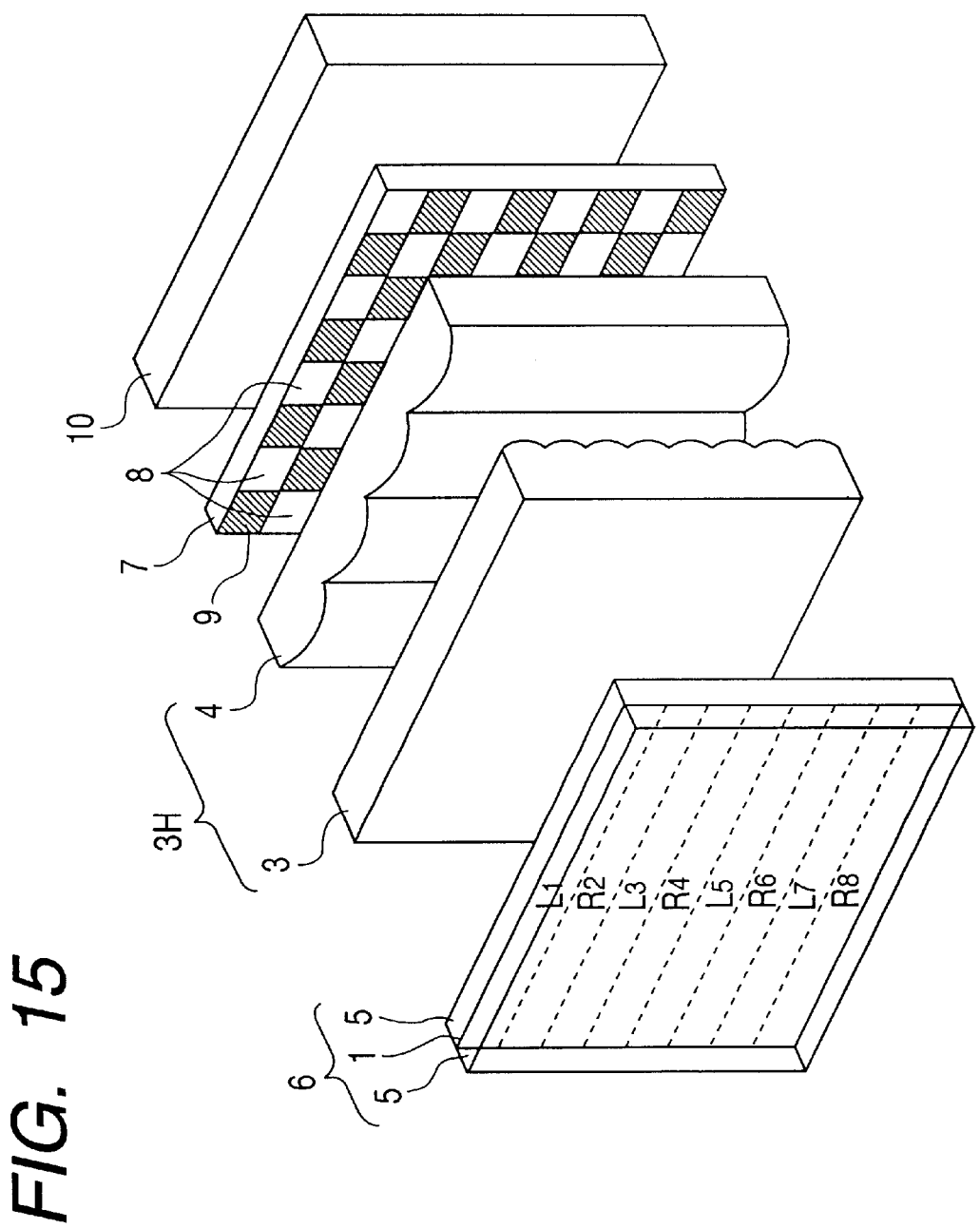
FIG. 15 is a schematic exploded perspective view of the principal parts of an embodiment 5 of the stereoscopic image display apparatus of the present invention.

FIG. 15 is a perspective view of the principal parts of an embodiment 5 of the present invention, wherein a display device 6 for displaying an image is composed for example of a liquid crystal display. A display pixel portion 1, consisting for example of a liquid crystal layer, is sandwiched between two glass substrates 5 and serves to display a three-dimensional image as will be explained later. In FIG. 15, certain components such as polarizing plates, color filters, electrodes, a black matrix and an antireflection film are omitted from the illustration.

A rear light source (surface illuminant) 10 constitutes an illuminating light source. A mask substrate (mask) 7, provided with a mask pattern 9 having checkered-patterned apertures 8 is positioned between the display device 6 and the rear light source 10. The mask pattern 9 is prepared by patterning an evaporated metal film such as of chromium or a light absorbing material on the mask substrate 7 of glass or resin. The rear light source 10, the mask substrate 7 etc. constitute components of the light source means.

Between the mask substrate 7 and the display device 6, there are provided a first lenticular lens 4 and a second lenticular lens 3, composed of transparent resin or glass. The first lenticular lens 4 is a vertical cylindrical lens array consisting of an array in the horizontal direction of vertically elongated cylindrical lens, while the second lenticular lens 3 is a horizontal cylindrical lens array consisting of an array in the vertical direction of horizontally elongated cylindrical lens. The first and second lenticular lenses 4, 3 constitute component of a micro optical element 3H.

The display device 6 displays, as shown in FIG. 15, a horizontal stripe image obtained by dividing the left and right parallax images R, L in the vertical direction respectively into plural horizontal stripe-shaped pixels Ri, Li and arranging these pixels alternately such as $L_1R_2L_3R_4L_5R_6$ . . . for example from the top of the image area.

The light from the rear light source 10 is transmitted by the apertures 8 of the mask substrate 7 and by the micro optical element 3H and illuminates the display device 6, whereby the left and right stripe pixels Ri, Li are separated and respectively observed by the eyes of the observer.

Figure 16:
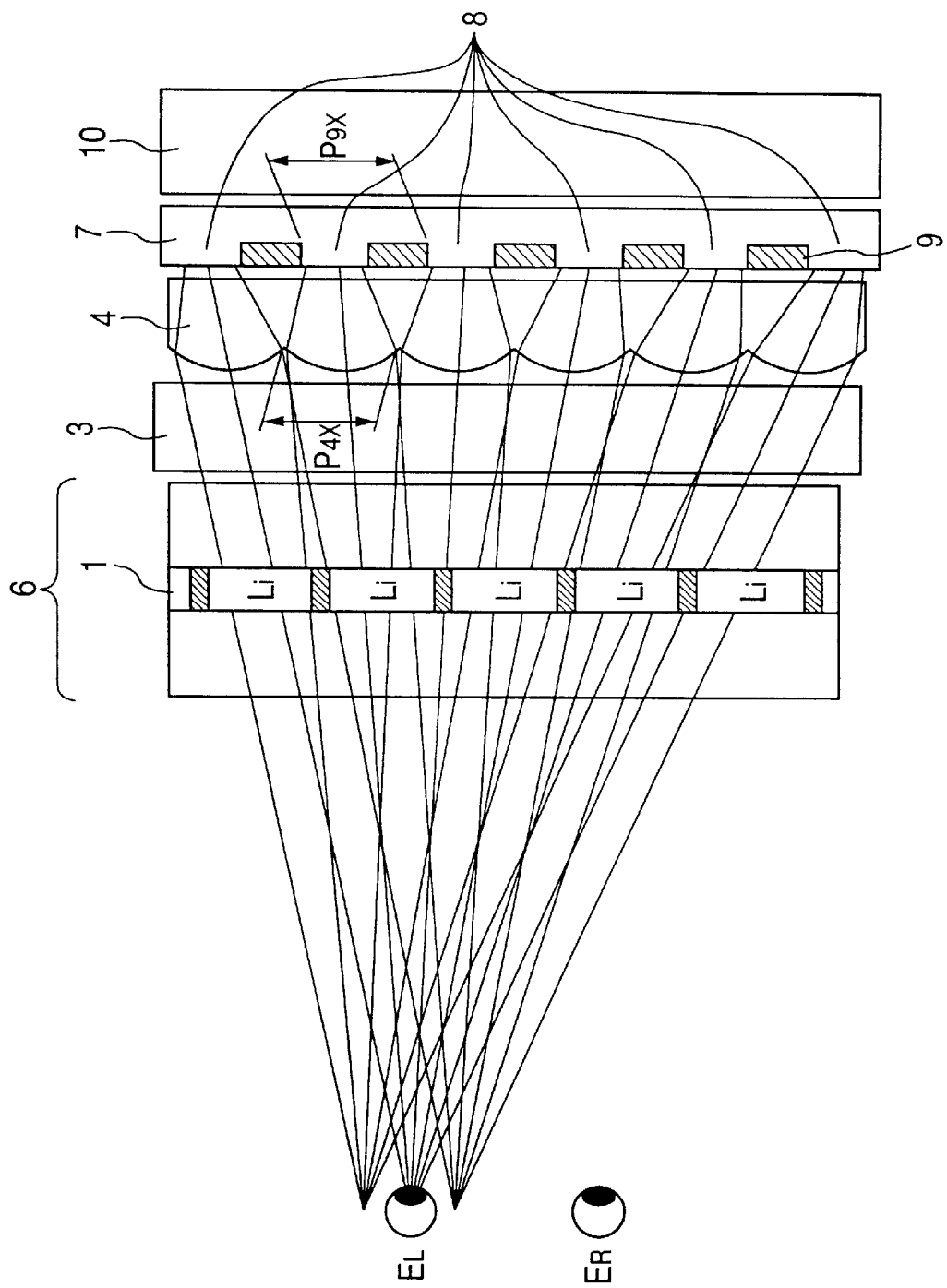
FIG. 16 is a horizontal cross-sectional view of the embodiment 5.

FIG. 16 is a horizontal cross-sectional view of the embodiment 5, showing the principle of horizontal separation of the light from the left and right stripe pixels respectively to the eyes of the observer. The mask substrate 7 is illuminated by the rear light source 10 and the light emerges from the apertures 8. In front of the mask substrate 7, at the side of the observer, there is provided the first lenticular lens 4, in which the curvature of the lenses thereof is so selected that the mask pattern 9 is positioned substantially at the focal positions of the cylindrical lenses. In this cross section, the second lenticular lens 3 does not exert any optical function, so that the light emerging from a point in the aperture 8 is converted, in this cross section, into a substantially parallel beam upon passing the micro optical element 3H. The parallel light beam in this cross section need not be exactly parallel and the object of the present invention can be attained as long as the stereoscopic observation is hindered by crosstalk caused by mixing of the left and right image areas at the position of the observer.

A pair of the aperture portion and the opaque portion in the mask pattern 9 substantially corresponds to a pitch of the first lenticular lens 4. The illustrated pattern of the aperture portion and the opaque portion corresponds to the left stripe pixels Li among the horizontal left and right stripe pixels displayed on the display device 6, so that the light emerging from the apertures 8 is transmitted by the first lenticular lens 4 and illuminates the left stripe pixels Li on the display device 6 with directionality in a range indicated by solid lines.

$E_L$ indicates the left eye of the observer. The pitch $P_{4X}$ of the first lenticular lens 4 is selected slightly smaller than the pitch $P_{9X}$ of the aperture portions and the opaque portions of the mask pattern 9 in order that the light from the apertures 8 is concentrated to the left eye $E_L$ uniformly from the entire width of the image area. More specifically, the pitch $P_{4X}$ is so determined as to satisfy a relation:

$$L0:(L0+d1)=P_{4X}:P_{9X} \quad (5)$$

wherein L0 is the optical distance from the predetermined observer position to the first lenticular lens 4 and d1 is the optical distance from the first lenticular lens 4 to the mask pattern 9. Thus the left stripe pixels Li displayed on the display device 6 can be observed only in an area close to the left eye $E_L$.

With respect to the right stripe pixels Ri, the arrangement of the apertures and the opaque portions of the mask pattern 9 becomes inverted, and corresponds to the right stripe pixels Ri among the horizontal left and right stripe pixels displayed on the display device 6, so that the right stripe pixels Ri are illuminated through the first lenticular lens 4 with directionality toward a range close to the right eye $E_R$. Thus the right stripe pixels Ri displayed on the display device 6 can be observed only in an area close to the right eye $E_R$. In the present embodiment, the left and right stripe pixels on the display device 6 are thus separated in the horizontal direction into and observed in the areas of the left and right eyes.

Figure 17:
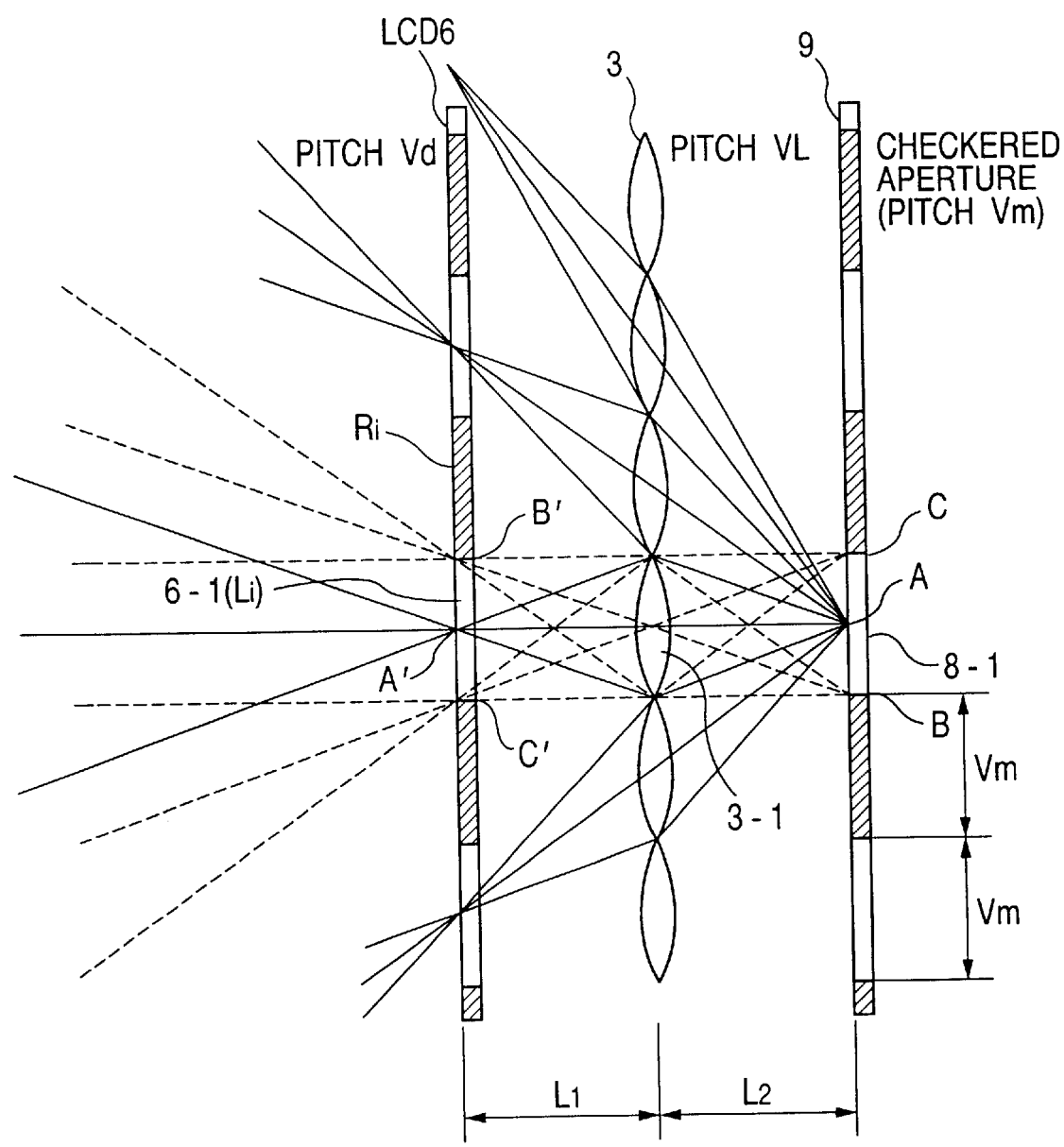
FIG. 17 is a schematic view of the embodiment 5 in a vertical cross section.

FIG. 17 is a schematic vertical cross-sectional view of the embodiment 5, and the observation area in the vertical direction will be explained with reference to this drawing. In FIG. 17, there are omitted the first lenticular lens 4 having no optical function in this cross section and the glass substrate not directly related to the optical action, and the second lenticular lens 3 is also illustrated conceptually. The apertures 8 of the mask pattern are arranged in a checkered pattern as shown in FIG. 15, so that, in the vertical direction, they respectively correspond to the left and right horizontal stripe pixels displayed in an alternate arrangement on the display device 6.

The checkered pattern of the apertures 8 is used to illuminate the left or right stripe pixels. In FIG. 17, the illustrated apertures are assumed to illuminate for example the left stripe pixels Li, and the black portions of the mask pattern 9 indicate opaque portions not transmitting the light. On the display device 6, white portions and black portions respectively indicate the left stripe pixels Li corresponding to the left eye and the right stripe pixels Ri corresponding to the right eye.

In the illustrated arrangement, the vertical width (pitch) Vm of the aperture of the mask pattern that is equal to the width of the opaque portion, in a certain vertical cross section, the vertical pitch VL of the second lenticular lens 3, the pixel pitch Vd of the display device 6 in the vertical direction (being equal to the vertical pitch of the stripe pixels displayed on the display device 6), the focal length fv of each of the cylindrical lenses constituting the second lenticular lens 3 in the plane of FIG. 17, the distance L1 from the display plane of the display device 6 to the principal plane of the second lenticular lens 3 at the side of the observer and the distance L2 from the principal plane of the second lenticular lens 3 at the mask side to the mask pattern 9 are so selected as to satisfy the following conditions:

$$Vd:Vm=L1:L2 \quad (1)$$

$$Vd:VL=(L1+L2)/2:L2 \quad (2)$$

$$1/fv=1/L1+1/L2 \quad (3)$$

In this arrangement, the apertures 8 of the mask pattern 9 concentrate the light on the respectively corresponding stripe pixels, in lines perpendicular to the plane of the drawing. By taking one of the checkered-patterned apertures 8 as an example, the light emerging from a central point A of the central apertures 8-1 and entering the corresponding cylindrical lens 3-1 of the second lenticular lens 3 is converged as horizontal line on a central point A' of the corresponding pixel row 6-1 of the display device 6. Also the light emerging from the central point A of the central apertures 8-1 and entering any cylindrical lens, other than that 3-1, of the second lenticular lens 3 is linearly condensed at the center of another left stripe pixel Li of the display device 6.

Also the light emerging from an end point B or C of the central apertures 8-1 and entering the cylindrical lens 3-1 is converged as horizontal line on an end point B' or C' of the stripe pixel row 6-1. Similarly the light emerging from another point of the apertures 8-1 and entering the cylindrical lens 3-1 is converged as a horizontal line on the stripe pixel 6-1 of the display device 6. Also the light beams emerging from the apertures 8-1 and entering the cylindrical lenses other than 3-1 are all concentrated on other left stripe pixels of the display device 6.

Also the light beams emerging from the points in other apertures than 8-1 are all condensed on the left stripe pixels of the display device 6, thus illuminating and being transmitted by such pixels, and diverge only in the vertical direction according to the numerical aperture at the condensing, thereby providing an observation area where the observer, at a predetermined eye height, can observe the left and right stripe pixels in uniform separation over the entire vertical width of the image area.

As explained in the foregoing, the light emerging from a point in the aperture of the mask pattern 9 is converted, in the vertical cross section, by the micro optical element 3H into a converging light beam substantially concentrating on the display device 6.

Such converging light beam can satisfy the object of the present invention as long as the light beam emerging from the apertures 8-1 and transmitted by the cylindrical lens 3-1 is condensed within the stripe pixel 6-1 on the display device 6.

The foregoing explanation has been limited to the stripe pixels Li for the left eye of the observer, but the function is similar also to the stripe pixels Ri for the right eye.

Figure 18:
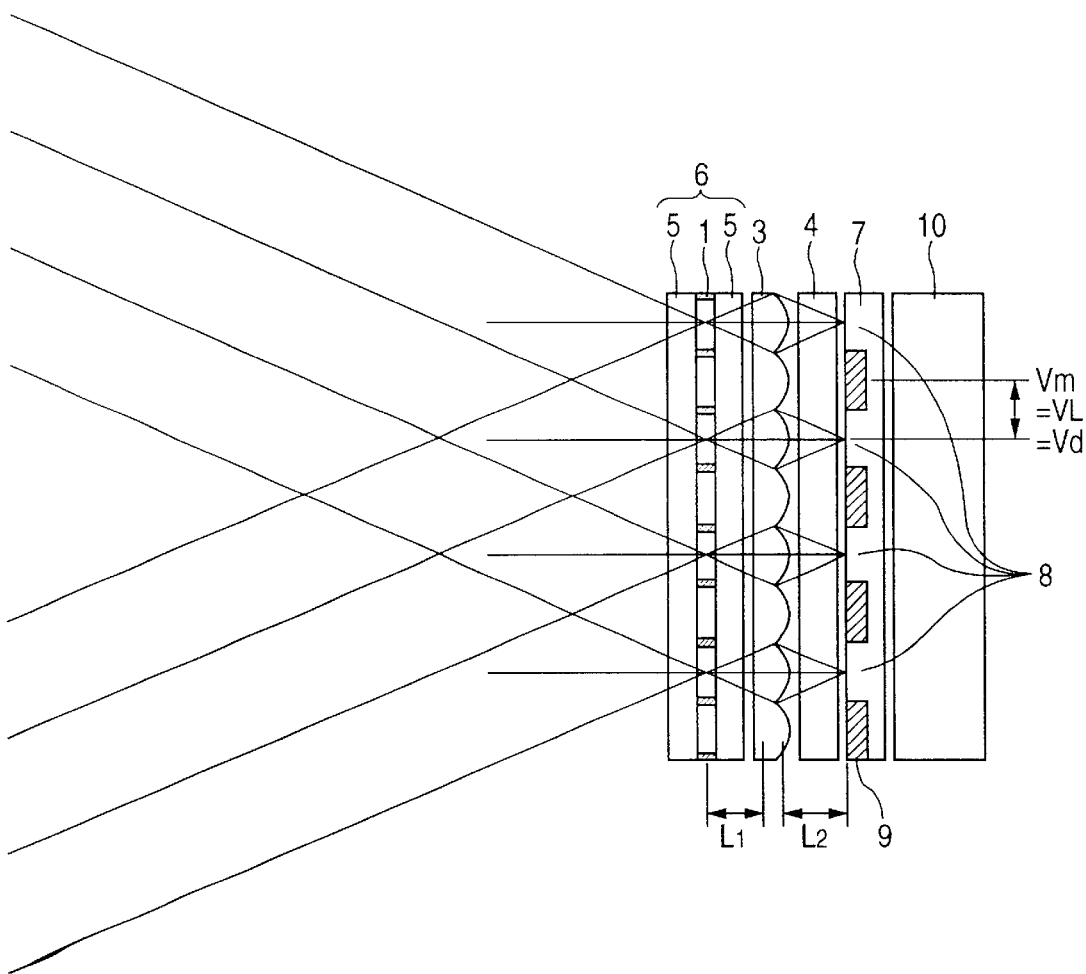
FIG. 18 is a vertical cross-sectional view of the embodiment 5.

FIG. 18 is a vertical cross-sectional view of the embodiment 5, including also the components omitted in FIG. 17.

In FIG. 18, the parameters Vm, VL, Vd, fv, L1 and L2 are same as those shown in FIG. 17. In the present embodiment, the foregoing conditions (1), (2) and (3) are satisfied by relations $Vd=Vm=VL$, $L1=L2$ and $fv=L1/2$, whereby provided, as explained in relation to FIG. 17, is an observation area in which the observer at a predetermined eye height can observe the left and right images in uniform separation, over the entire vertical width of the image area.

In the present invention, the object thereof can be attained if the relative difference between the right- and left-hand terms of the relations (1) and (2) does not exceed 5% and if that of the relation (3) does not exceed 15%.

In the present embodiment, the stereoscopic image display apparatus is formed by an arrangement in the order of the display device 6, the second lenticular lens 3, the first lenticular lens 4 and the mask pattern 9 seen from the side of the observer, but a stereoscopic image display apparatus of a similar effect as in the embodiment 5 can also be obtained even by interchanging the positions of the first and second lenticular lenses 4, 3 if the pitches and the focal lengths thereof and the vertical and horizontal pitches of the checkered-patterns apertures of the mask pattern 9 are so redesigned as to satisfy all the aforementioned conditions (1), (2), (3).

Also in case of color stereoscopic image display, the present embodiment can employ a liquid crystal display in which red, green and blue color filters are horizontally arranged in a pixel, as in the ordinary liquid crystal display for the two-dimensional image display.

Figure 19:
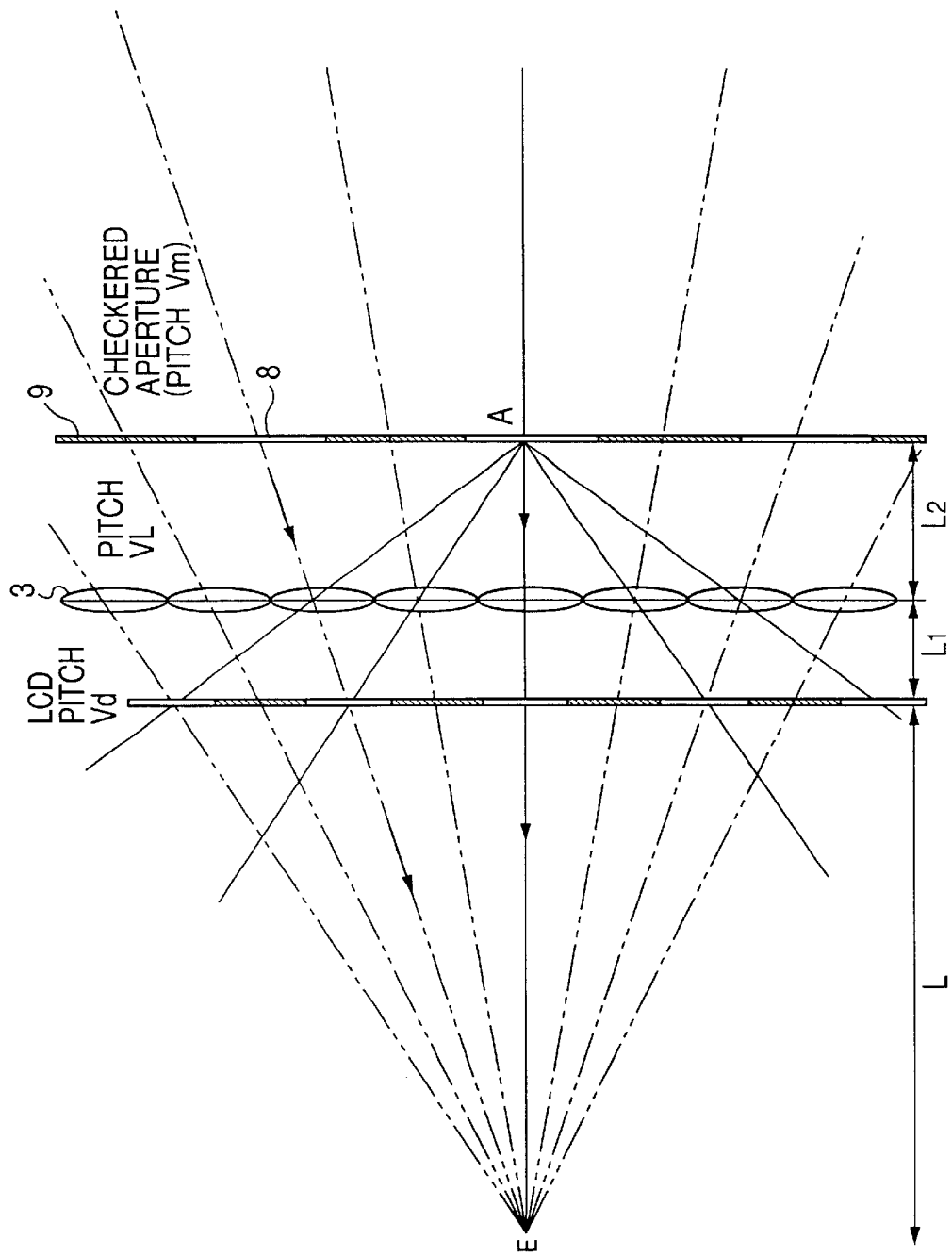
FIG. 19 is a schematic view in a vertical cross section of an embodiment 6 of the stereoscopic image display apparatus of the present invention.

FIG. 19 is a schematic vertical cross-sectional view of an embodiment 6 of the stereoscopic image display apparatus of the present invention. In comparison with the embodiment 5, the present embodiment is to concentrate a larger amount of illuminating light to the eye E of the observer positioned in the vicinity of the center of the display image area, and FIG. 19 shows the function of the present embodiment. The present embodiment is basically same, in the configuration, as the embodiment 5, but is different in the setting conditions of the second lenticular lens 3 and the mask pattern 9. In the following there will be principally explained the differences from the embodiment 5. In FIG. 19, there are omitted the first lenticular lens 4 having no optical function in this cross section and the glass substrate not directly related to the optical action, and the second lenticular lens 3 is also illustrated conceptually.

The embodiment 5 in the vertical cross section employs such a condition $Vd=Vm=VL$ that the main light beam among the light beam illuminating the pixels on the display device 6 enters the display device 6 substantially perpendicularly. The embodiment 6 is different in that the lenticular lens 4 and the mask pattern 9 are so set as to concentrate a larger amount of illuminating light to the eyes of the observer positioned in the vicinity of the center of the display image area, thereby improving the illuminating efficiency.

Now the observation range in the vertical direction will be explained with reference to FIG. 19. The eye position E of the observer is distant by L from the display device 6. The cylindrical lenses constituting the second lenticular lens 3, and the apertures 8 of the mask pattern 9 are so positioned that the centers thereof are on double-dotted chain lines connecting the eye position E and the centers of the stripe pixels on the display device 6. With such arrangement, there can be obtained a stereoscopic image display apparatus in which the light emerging from the center of each aperture is transmitted through the center of the second lenticular lens 3 and illuminates each stripe pixel on the display device 6, and is concentrated on the eye position E of the observer.

In the illustrated arrangement, the vertical pitch Vm of the apertures 8 of the mask pattern in a certain vertical cross section, the pitch VL of the second lenticular lens 3, the pixel pitch Vd of the display device 6 in the vertical direction (being equal to the pitch of the horizontal stripe pixels) on the display device 6, the focal length fv of each of the cylindrical lenses constituting the second lenticular lens 3 in the plane of FIG. 19, the distance L1 from the display plane of the display device 6 to the principal plane of the second lenticular lens 3 at the side of the observer, the distance L2 from the principal plane of the second lenticular lens 3 at the mask side to the mask pattern 9 and the distance L from the eye position E to the display device 6 are so selected as to satisfy the following condition:

$$Vd:Vm=L:(L+L1+L2) \qquad (4)$$

in addition to the foregoing conditions (1), (2) and (3).

Figure 20:
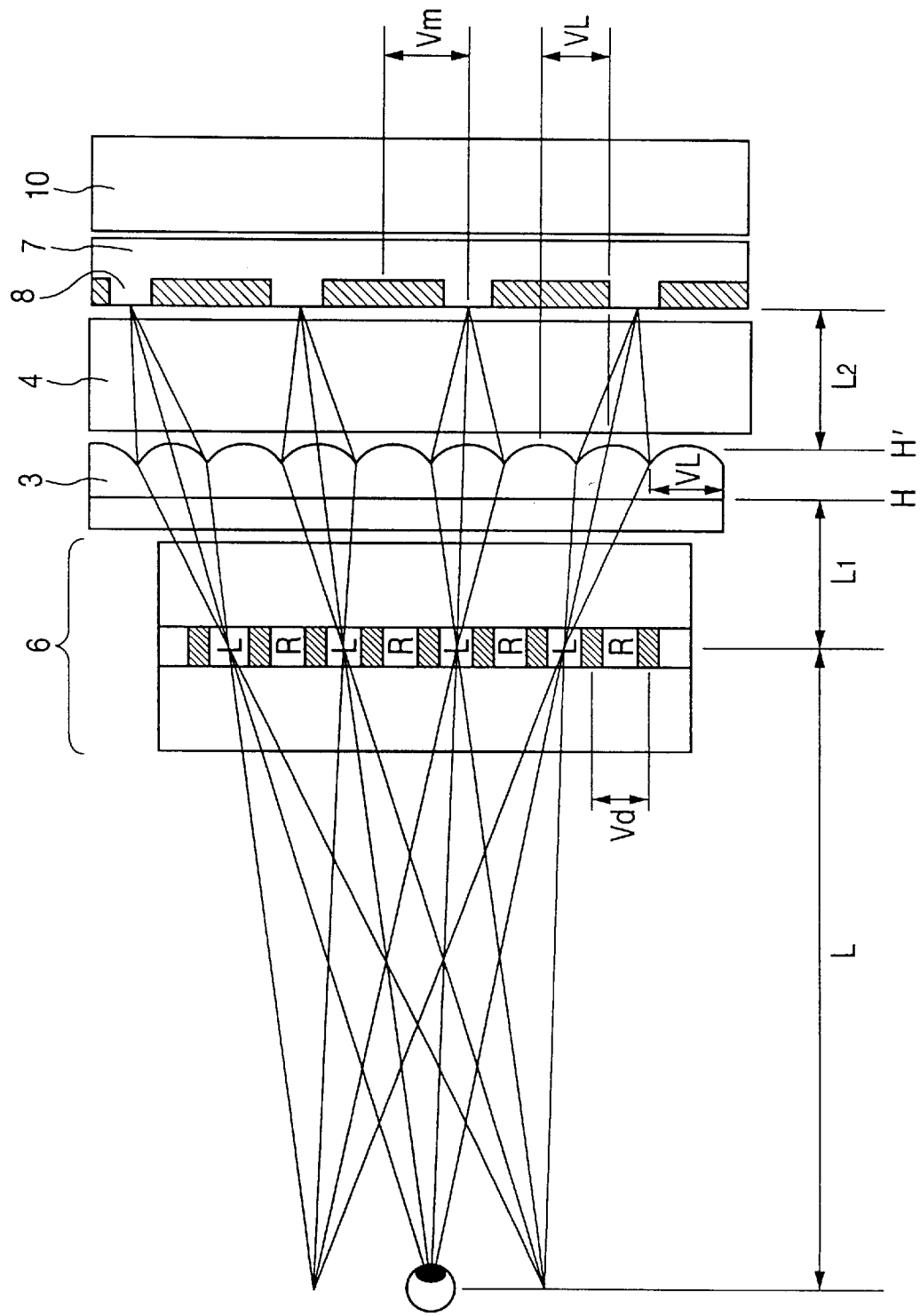
FIG. 20 is a vertical cross-sectional view of the embodiment 6.

FIG. 20 is a vertical cross-sectional view of the embodiment 6, including also the components omitted in FIG. 17. In FIG. 20, the parameters Vm, VL, Vd, fv, L1, L2 and L are same as those shown in FIG. 19. In the present embodiment, these parameters are so selected as to satisfy the foregoing conditions (1), (2), (3) and (4). The configuration in the horizontal cross section is same as that of the embodiment 5 shown in FIGS. 15 and 16.

Thus there is provided an observation area in which the observer at a predetermined eye height can observe the left and right images in uniform separation, over the entire vertical width of the image area.

In the present invention, the object thereof can be attained if the relative difference between the right- and left-hand terms of the relations (4) does not exceed 10%.

Also in the present embodiment, a stereoscopic image display apparatus of a similar effect as in the present embodiment can be obtained also by interchanging the positions of the first and second lenticular lenses 4, 3 as in the embodiment 5.

Figure 21:
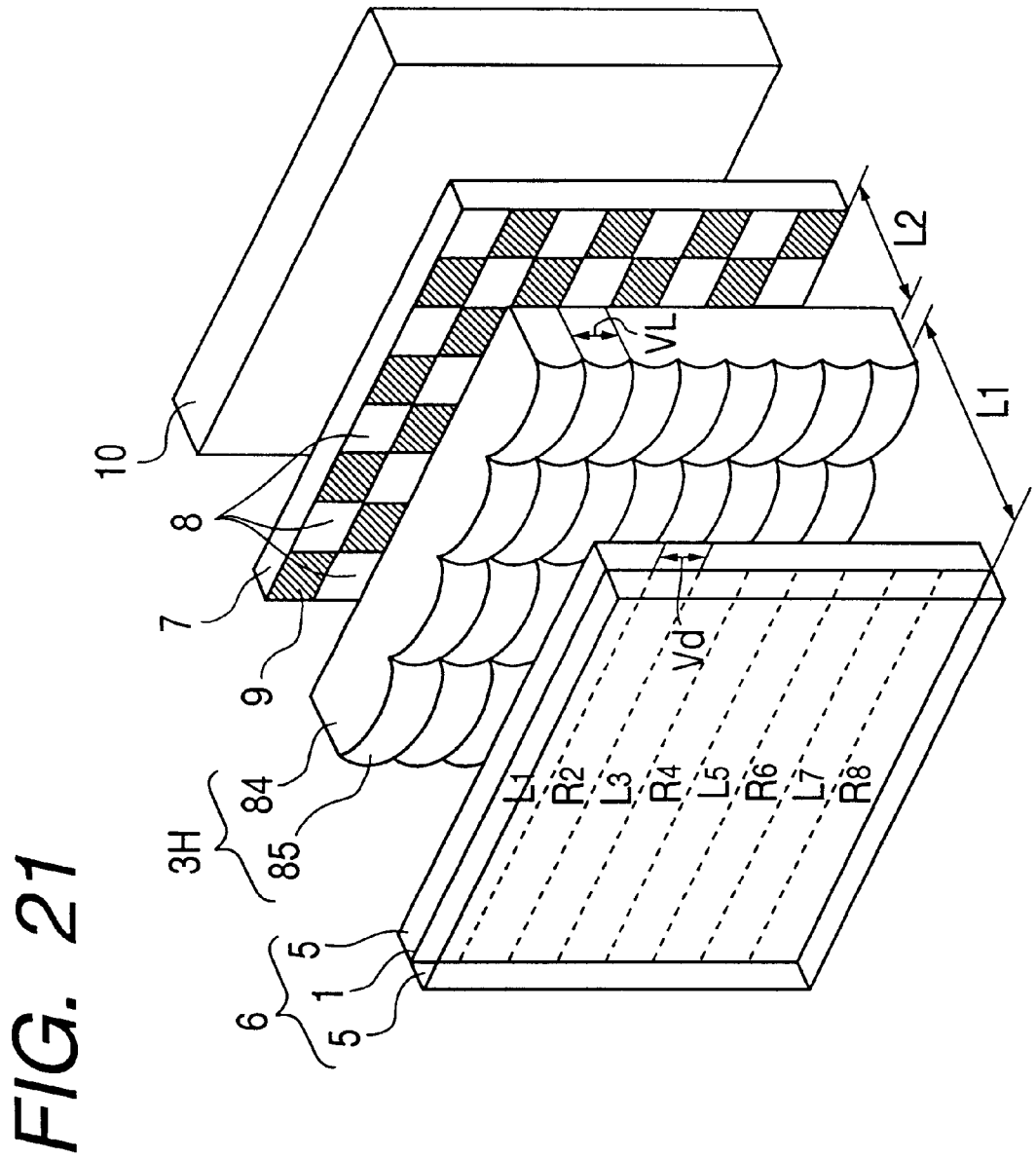
FIG. 21 is a schematic exploded perspective view of the principal parts of an embodiment 7 of the stereoscopic image display apparatus of the present invention.

FIG. 21 is a perspective view of the principal parts of an embodiment 7 of the stereoscopic image display apparatus of the present invention. The micro optical element 3H, composed of the mutually perpendicular two lenticular lenses 3, 4 in the embodiment 5, is composed in the present embodiment of a single toric lens array consisting of a two-dimensional array of a plurality of toric lenses having different curvatures in the vertical and horizontal directions. Other aspects of the configuration are same as those in the embodiment 5.

In FIG. 21, a toric lens array 84 (micro optical elements 3H) is composed of toric lenses 85. The focal length fv of the toric lenses in the vertical cross section, the distance L1 in the vertical cross section from the display device 6 to the principal plane of the toric lens array 84 at the observer side and the distance L2 from the principal plane of the toric lens array 84 at the mask side to the mask pattern 9 are so selected as to satisfy the aforementioned conditions (1), (2) and (3). Also the curvature of the toric lenses 85 in the horizontal cross section is so selected that the focal position in the horizontal cross section substantially coincides with the mask pattern 9.

In the present embodiment there is thus provided an observation area in which the observer at a predetermined eye height can observe the left and right images in uniform separation, over the entire vertical width of the image area.

Also in the present embodiment, by setting the toric lens array 84 and the checkered-patterned apertures 8 so as to satisfy the aforementioned condition (4), it is possible to concentrate a major portion of the illuminating light to the eye E of the observer positioned in the vicinity of the center of the display image area as in the embodiment 6, thereby improving the illuminating efficiency.

Figure 22:
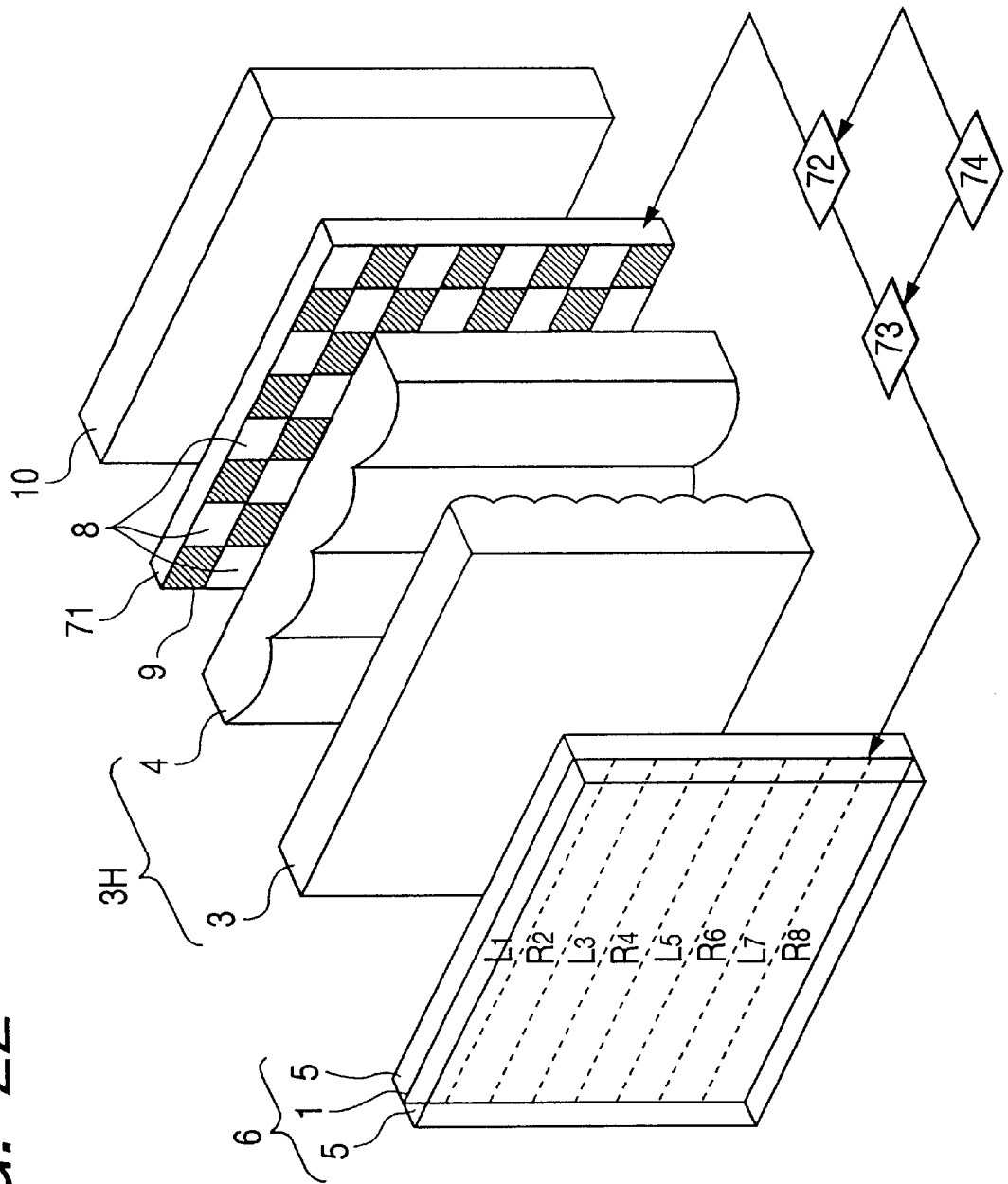
FIG. 22 is a schematic exploded perspective view of the principal parts of an embodiment 8 of the stereoscopic image display apparatus of the present invention.

FIG. 22 is a schematic view of the principal parts of an embodiment 8 of the stereoscopic image display apparatus of the present invention. In the present embodiment, the mask pattern 9 of the mask substrate 7, having fixed checkered-patterned apertures is replaced by a transmissive spatial light modulation element 71 such as a transmissive liquid crystal device. Other parts of the configuration are same as those in the embodiment 5. The rear light source 10, the spatial light modulation element 71 etc. constitute components of the light source means.

Image processing means 74 generates image data of a stripe image by extracting stripe pixels from unrepresented left and right fetches a parallax images R and L, then sends the stripe image data to a display drive circuit 73, which in response drives the liquid crystal display 6 to display a horizontal stripe image on the image display plane 1, and at the same time causes a driving circuit 72 to display a mask pattern, corresponding to the stripe image data, on a spatial light modulation element 71.

The function of forming the stereoscopic observation area by giving directionality to the light from the light source means and illuminating the stripe pixels is same as that of the embodiment 5.

Figure 23A:
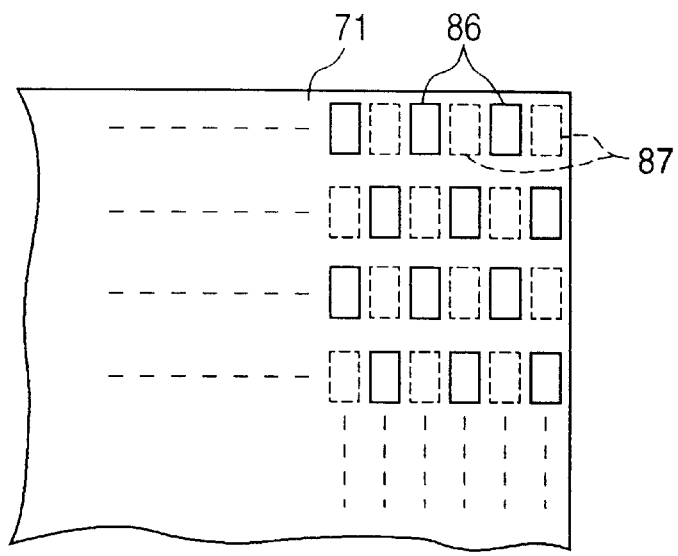
FIGS. 23A, 23B and 23C are schematic views showing the stereoscopic image display method of the embodiment 8.
Figure 23B:
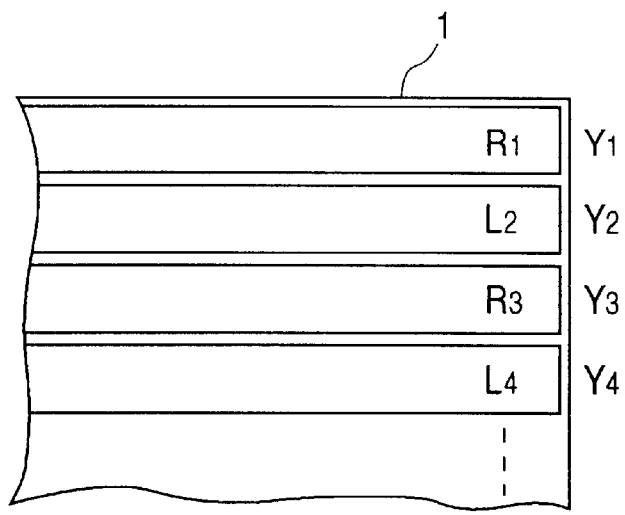
Figure 23C:
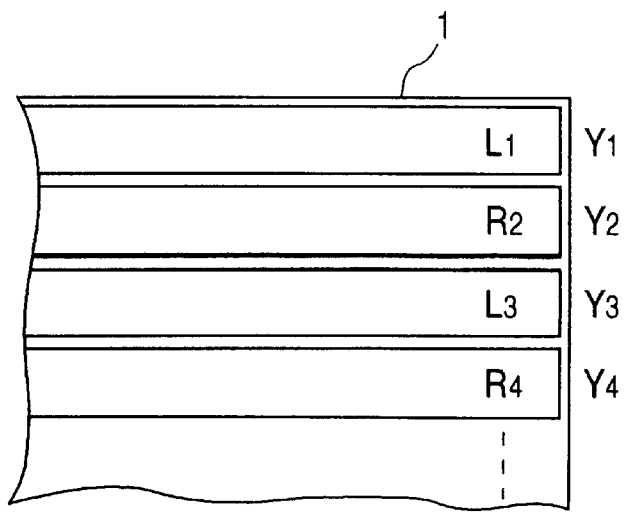

FIGS. 23A, 23B and 23C are schematic views showing the stereoscopic image display method of the present embodiment. FIG. 23A shows the patterns of apertures 86 (to be more exactly called light transmitting portions but called apertures for the purpose of simplicity) and opaque portions 82 of the spatial light modulation element 71, while FIGS. 23B and 23C show a stripe image composed of alternate arrangement of the left and right horizontal stripe pixels on the display pixel portion 1 of the display device 6.

When the apertures of the spatial light modulation element 71 are solid-lined portions 86 and the opaque portions are portions 87 as shown in FIG. 23A, there is displayed a first horizontal stripe image composed, as shown in FIG. 23B, of a right stripe pixel R1 in the first scanning line Y1, a left stripe pixel L2 in the second scanning line Y2, a right stripe pixel R3 in the third scanning line Y3 and so on. In this state the left and right stripe pixels are respectively observed, in separate manner, by the left and right eyes of the observer.

When the apertures of the spatial light modulation element 71 are broken-lined portions 87 and the opaque portions are portions 86 shown in FIG. 23A, there is displayed a second horizontal stripe image composed, as shown in FIG. 23C, of a left stripe pixel L1 in the first scanning line Y1, a right stripe pixel R2 in the second scanning line Y2, a left stripe pixel L3 in the third scanning line Y3 and so on. In this state the left and right stripe pixels are respectively observed, in separate manner, by the left and right eyes of the observer.

All the left and right parallax images R, L can be observed by alternate display of the above-mentioned states on time-divided basis, so that the stereoscopic image can be displayed without the loss in the resolution in contrast to the conventional stereoscopic image display in which the resolution is reduced to a half by the synthesis of the stripe image.

In case the re-writing speed of the image display plane 1 of the liquid crystal display 6 and that of the spatial light modulation element 71 are mutually different, the re-writing operation of the display drive circuit 73 and that of the light modulation element drive circuit 72 are preferably synchronized as shown in FIG. 12, in order to synchronize the re-writing of the stripe image and that of the mask pattern of the apertures so that the observer does not notice the difference. Such re-writing operation may be made for each pixel on the corresponding scanning lines on the image display plane of the liquid crystal display 6 and the spatial light modulation element 71, or for each corresponding scanning line thereof.

In the present embodiment, as in the embodiment 5, the pitch Vm of the apertures 8 of the mask pattern in a vertical cross section, the pitch VL of the second lenticular lens 3, the pitch Vd of the pixels (stripe pixels) of the display device 6 in the vertical direction, the focal length fv of each of the cylindrical lenses constituting the second lenticular lens 4 in the plane of FIG. 19, the distance L1 from the display plane of the display device 6 to the principal plane of the second lenticular lens 4 at the side of the observer, and the distance L2 from the principal plane of the second lenticular lens 3 at the mask side to the mask pattern 9 are so selected as to satisfy the following relations Vd=Vm=VL, L1=L2 and fv=L1/2.

Since Vd=Vm, the spatial light modulation element 71 can be composed of a liquid crystal device having a pixel pitch same as that of the display device 6 for the image display. The present embodiment has been explained as a variation of the embodiment 5, but the configuration of the present embodiment may also be applied to the embodiment 6 or 7 to similarly improve the resolution.

The embodiment 8 displays the stereoscopic image over the entire display pixel portion 1, but it is also possible to display the stereoscopic image only in a specified area of the display pixel portion 1 and to display an ordinary two-dimensional image in other areas.

An embodiment 9 employs the configuration of the embodiment 8 but varies the mask pattern 9 to display a stereoscopic image in a predetermined area of the display pixel portion 1 and a two-dimensional image in other areas, thereby providing mixed display of the stereoscopic image and the two-dimensional image.

Figure 24A:
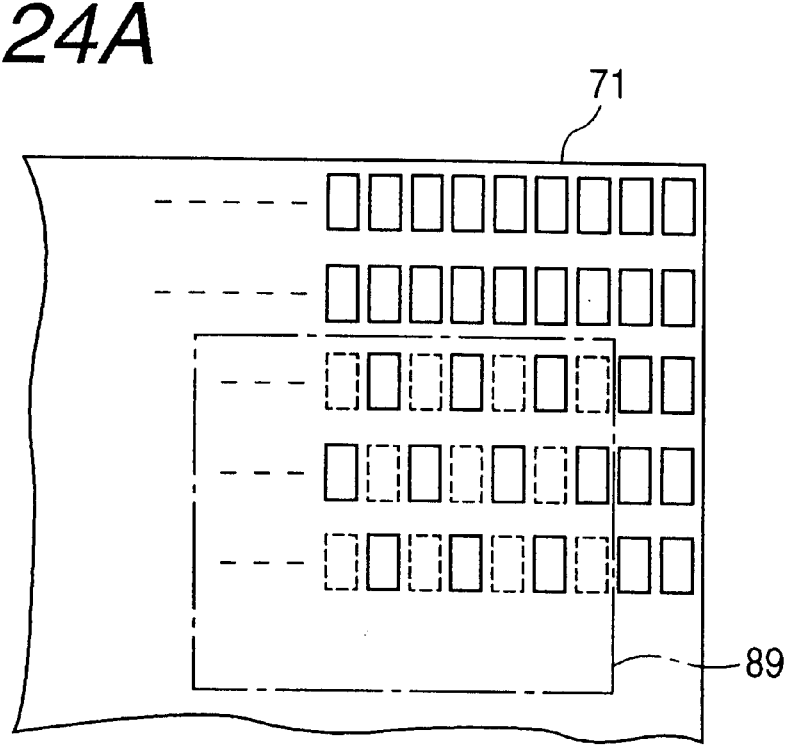
FIGS. 24A and 24B are schematic views showing the image display method in an embodiment 9 of the stereoscopic image display apparatus of the present invention.
Figure 24B:
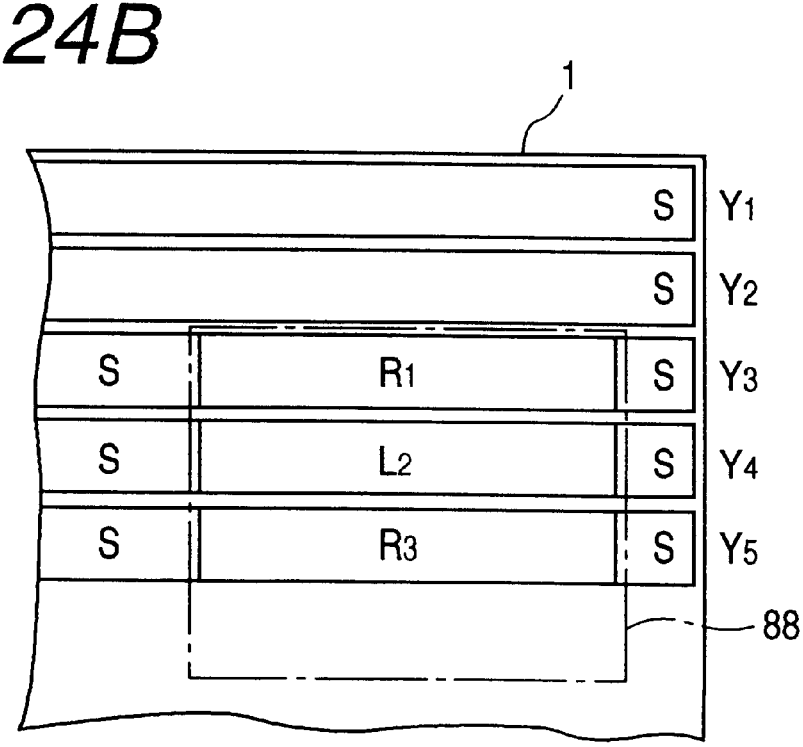

FIGS. 24A and 24B are schematic views showing the image display of an embodiment 9 of the stereoscopic image display apparatus of the present invention. The present embodiment is same as the embodiment 8 except for the configuration of the mask pattern and that of the image display on the display device 6. FIG. 24A shows the pattern of the apertures and the opaque portions of the spatial light modulation element 71 of the embodiment 9, while FIG. 24B shows the image pattern on the display pixel portion 1 of the display device 6. In the display pixel portion 1, an area 88 for displaying the stereoscopic image displays a horizontal stripe image obtained by dividing the left and right parallax images respectively into horizontal stripe pixels Li, Ri and alternately arranging these pixels for example in the order of $R_1L_2R_3$ ... and an ordinary two-dimensional image S is displayed in the other area. The corresponding mask pattern 9 of the spatial light modulation element 71 is formed as a checkered pattern in an area 89 corresponding to the stereoscopic image displaying area 88, in order to give directionality to the transmitted light whereby the light beams passing through the left and right stripe pixels are respectively separated to the left and right eyes, and as an entirely open (light transmitting) state in the remaining area whereby the light transmitted by the two-dimensional image S reaches the left and right eyes.

In this manner the stereoscopic image can be displayed in the area 88 only. It is also possible to improve the resolution of the stereoscopic image by alternately displaying the first and second horizontal stripe images and varying the mask pattern in synchronization, as in the foregoing embodiment.

Also in the embodiments 5 to 7, the stereoscopic image may be displayed in a part of the image area as in the present embodiment, by forming a checkered mask pattern in an area 89 corresponding to the stereoscopic image displaying area 88.

In the simultaneous mixed display of the stereoscopic image and the two-dimensional image, these images may show different luminances because an approximately half of the illuminating light is intercepted by the checkered-patterned apertures of the mask pattern 9 in the stereoscopic image display. In order to avoid such difference, the area of the mask pattern 9 corresponding to the two-dimensional image display may be maintained at an intermediate display state between white and black, instead of the fully transparent state, for the purpose of light amount adjustment.

In the foregoing embodiments, the width Vm of the apertures of the mask pattern in the vertical direction is selected slightly larger than the vertical pitch Vd of the horizontal stripe pixels displayed on the display device, whereby the observer at a predetermined height of observation can observe the stereoscopic image by uniformly separating the left and right stripe pixels over the entire image area.

Also the stereoscopic observation range is widened in the vertical direction, by suitable setting of the position and the optical power in the vertical cross section of the horizontal cylindrical or toric lens array constituting the micro optical elements.

Also since the micro optical element 3H is positioned behind the display device 6, when seen from the side of the observer, the stereoscopic image of high quality can be observed without the surface reflection by the lenticular lens or the Moire fringes formed by the black matrix of the display device 6.

Also in contrast to the conventional stereoscopic image display method of displaying the right and left parallax images on time-divided basis frame by frame, where the frame frequency has to be raised to about 120 Hz for preventing the flickering phenomenon, the system of the present invention enables stereoscopic observation with a high resolution, without flickering feeling even at a frame frequency of 60 Hz, because the left and right parallax images are combined into a horizontal stripe image.

In the foregoing embodiments, in the display of the horizontal stripe image on the display device 6, the width of the horizontal stripe pixel constituting the stripe image is selected as the width of a scanning line, but it may also be selected as the width of plural scanning lines.

In case the left and right stripe pixels are alternately displayed in every scanning lines, there may be employed the 2:1 interlaced scanning of the conventional television to display all the right stripe pixels Ri or all the left stripe pixels Li of a stripe image in each field. Such method is particularly suitable for the stereoscopic display of a natural image taken for example with television cameras.

It is also possible to employ a light-emitting display element such as a CRT or a fluorescent display tube instead of the rear light source 10 and the mask substrate 7 in the embodiments 5 to 8 or the rear light source 10 and the spatial light modulation element 71 in the embodiments 8 and 9, and to form, on the light-emitting plane of such display element, a checkered pattern of light-emitting portions and light-non-emitting portions similar to the mask pattern 9 thereby giving directionality to the light emerging from such light-emitting portions by means of the micro optical element 3H.

Figure 26:
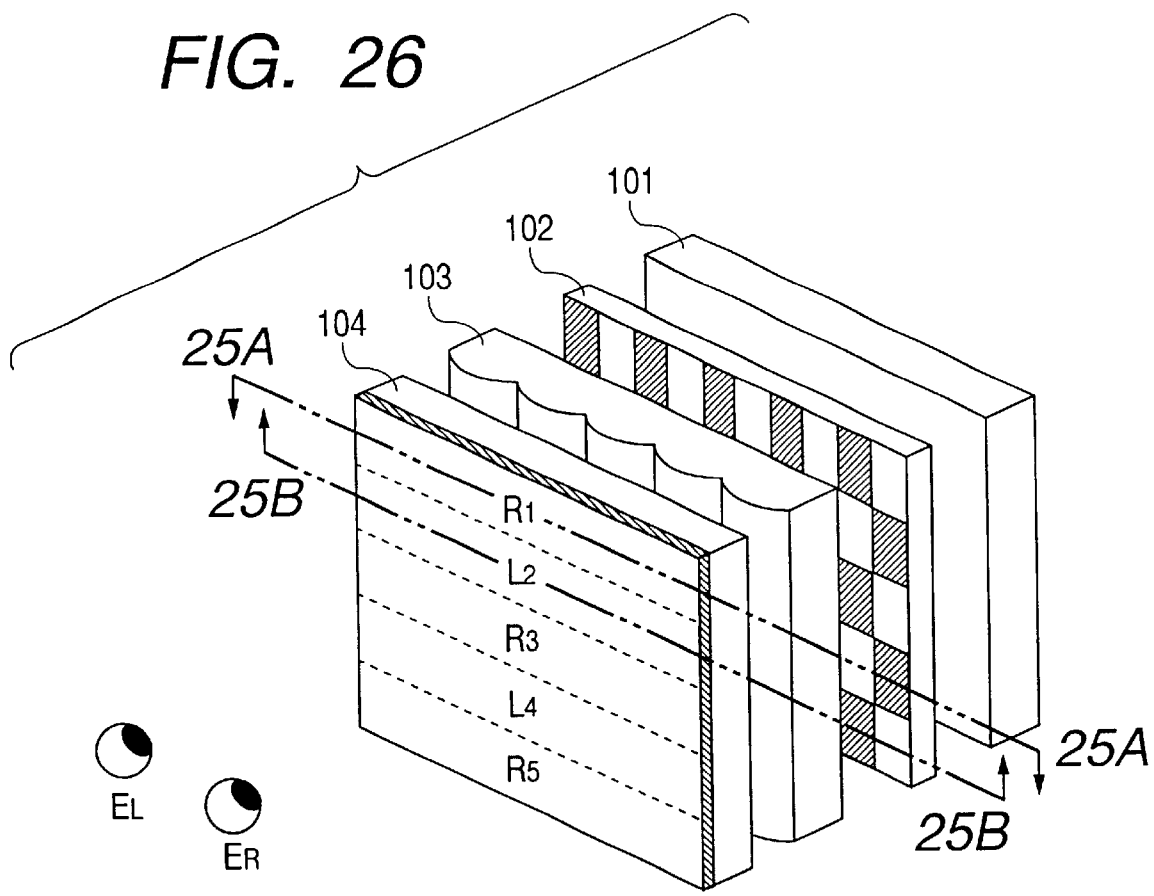
FIG. 26 is a perspective view of the embodiment 10.

FIGS. 25A and 25B are schematic views of the principal parts of an embodiment 10 of the stereoscopic image display apparatus of the present invention, and FIG. 26 is a perspective view thereof.

FIG. 25A is a horizontal cross-sectional view along a horizontal scanning line indicated by a line 25A—25A in FIG. 26, and FIG. 25B is a horizontal cross-sectional view along a line 25B—25B corresponding to a scanning line immediately under the scanning line of the line 25A—25A.

$E_R$ and $E_L$ respectively indicate the right and left eyes of the observer of the stereoscopic image display apparatus and correspond to the centers of two light-condensing areas to be explained later. A rear light source (surface illuminant) 101 emits the light toward the observer. A mask 102 is provided with a pattern of aperture portions and opaque portions in a predetermined checkered pattern, prepared by patterning chromium or a light absorbing material on a substrate such as of glass or plastics. A lenticular lens sheet (cylindrical lens array) 103 is composed of an array, in the horizontal direction of a plurality of vertically elongated cylindrical lenses each having a planar face on one side and having a convex cylindrical face on the other side.

A transmissive display device 104 such as a transmissive liquid crystal display (LCD) device displays an image on the image display plane thereof, as schematically shown in FIGS. 25A and 25B, which respectively show a state of displaying the right stripe pixel R1 and a state of displaying the left stripe pixel L2.

The rear light source 101 and the mask 102 constitute components of the light source means, and the aperture-bearing face of the mask 102 can be regarded as the light-emitting face of the light source means, since patterned light (indicating the light beams emerging from the regularly arranged apertures) emerge from such aperture-bearing face. The mask 102 functions as a mask with checkered-patterned apertures.

In the following there will be explained a case of displaying computer-prepared images, such as computer graphic images, as the parallax images, but there may also be employed natural images taken with a double-lens camera or a stereoscopic camera.

Image processing means 105 synthesizes a horizontal stripe image from a right parallax image R and a left parallax image L from an unrepresented parallax image source, and sends the corresponding image signal to a display drive circuit 106, which in response drives a display device 104 to display a horizontal stripe image on the image display plane thereof.

Referring to FIG. 25A, the light emitted from the rear light source 101 passes through the apertures $H_R$ of the mask 102, having centers at a predetermined relationship to the optical axes of the cylindrical lenses constituting the lenticular lens sheet 103, then deflected by the lenticular lens sheet 103 and is concentrated on a vertical line in an area corresponding to the position of the right eye $E_R$ of the observer, thus entering the right eye $E_R$. The light entering the right eye $E_R$ is modulated by the right stripe pixel R1 displayed on the display device 104 provided between the lenticular lens sheet 103 and the observer, whereby the right pixel R1 is observed by the right eye $E_R$. Stated differently, the light emitted from the light source in the aperture $H_R$ of the mask 102 is given directionality by the lenticular lens sheet 103, and illuminates the right stripe pixel R1 of the display device 104 and the such illuminating light is concentration on the position of the right eye $E_R$.

In the cross section corresponding to a scanning line immediately under that shown in FIG. 25A, the light transmitted by the apertures $H_R$ of the mask 102 is deflected, as shown in FIG. 25B, by the lenticular lens sheet 103, then modulated by the left right stripe pixel L2 displayed on the display device 104 and is concentrated on a vertical line in an area corresponding to the position of the left eye $E_L$ of the observer, thus entering the left eye $E_L$.

As shown in FIG. 26, the mask apertures $H_R$ in the cross section shown in FIG. 25A and those $H_L$ in the cross section shown in FIG. 25B are mutually complementary, so that the apertures on the mask 102 are formed in a checkered pattern.

The display device 104 displays a horizontal stripe image combined from the parallax images R and L. FIGS. 27A and 27B show the method of combining the horizontal stripe image to be displayed on the display device 104 of the embodiment 10. As shown in FIGS. 27A and 27B, at least two parallax images R, L are divided by the image processing means 105 in the vertical direction with a width corresponding to a scanning line to obtain right stripe pixels $R_1$, $R_2$, $R_3$, . . . and left stripe pixels $L_1$, $L_2$, $L_3$, . . . of horizontal stripe shape, and a first horizontal stripe image PI is prepared by combining these stripe pixels in the order of $R_1$, $L_2$, $R_3$, $L_4$, $R_5$, $L_6$, . . .

The image data of the horizontal stripe image PI thus prepared by the image processing means 105 are supplied to the display drive circuit 106 to display the horizontal stripe image PI on the display device 104. Thus the observer observes the stripe pixels Li and Ri alternately in the scanning lines respectively by the left and right eyes, thereby achieving stereoscopic observation by the parallax images L, R each composed of a group of the stripe pixels.

In the present embodiment, in case of switching the horizontal stripe image on the display device 104 to a next horizontal stripe image, such switching is preferably executed in succession from the upper end of the image area in order that the image on the display device 104 is not partially interrupted. Such switching method avoids the flickering phenomenon noticeable by the observer.

The present embodiment enables observation of the satisfactory stereoscopic image even with a display device of a low display speed (frame frequency) because the left and right parallax images L, R composed of stripe pixels constantly enter the respective eyes, in contrast to the conventional time-divided display method of the left and right parallax images in which the frame frequency of the display device has to be elevated. Consequently the stereoscopic image display apparatus can be constructed more easily.

Also in the present embodiment, since the horizontal stripe image is composed of the right and left stripe pixels of horizontal stripe shape, each stripe pixel can be composed of a scanning line of the display device 104, so that the horizontal stripe image can be combined in extremely easy manner.

Also in the present embodiment, since the left and right stripe pixels are alternately displayed in every scanning lines, there may be employed the 2:1 interlaced scanning of the conventional television to display all the right stripe pixels Ri or all the left stripe pixels Li of a stripe image in each field. Such method is particularly suitable for the stereoscopic display of a natural image taken for example with television cameras.

Also in the present embodiment, the mask 102 is provided with a fixed pattern of the aperture portions and the opaque portions. Such configuration, in combination with the arrangement that the lenticular lens sheet 103 is positioned between the mask 102 and the display device 104, prevents the glare on the display plane, thereby providing a more agreeable stereoscopic image, in comparison with the stereoscopic image display apparatus of the conventional lenticular system.

In the present embodiment there has been explained a case of forming each stripe pixel with the width of a scanning line and combining the horizontal stripe image by alternately arranging such stripe pixels, but it is also possible to form each stripe pixel with the width of plural scanning lines and to synthesize the horizontal stripe image with such stripe pixels.

Also in combining the horizontal stripe image from the stripe pixels, there may be employed another (second) horizontal stripe image PII obtained by synthesis of the stripe pixels in the order of $L_1$, $R_2$, $L_3$, $R_4$, $L_5$, $R_6$, . . . from the upper end of the image area as shown in FIG. 27B, and, in such case, the mask 102 can be provided, instead of the first aperture pattern for displaying the first horizontal stripe image PI, with a second aperture pattern in which each aperture is positioned at the center of the horizontally adjacent apertures in the first aperture pattern. Stated differently, there can be employed an aperture pattern of which the arrangement of the aperture portions and the opaque portions is complementary to that of the first aperture pattern.

Also the present embodiment employs the lenticular lens sheet 103 as the deflecting means for the light beam, but it is generally preferable to employ a cylindrical lens array composed of cylindrical lenses each having cylindrical faces on both sides, since such array is effective in condensing the light from the rear light source to the areas of the right and left eyes.

In the present embodiment, the apertures of the checkered pattern means an arrangement in which, in vertically adjacent two rows of apertures, each aperture in a row is positioned at the center of two adjacent apertures in the other row.

Figure 28A:
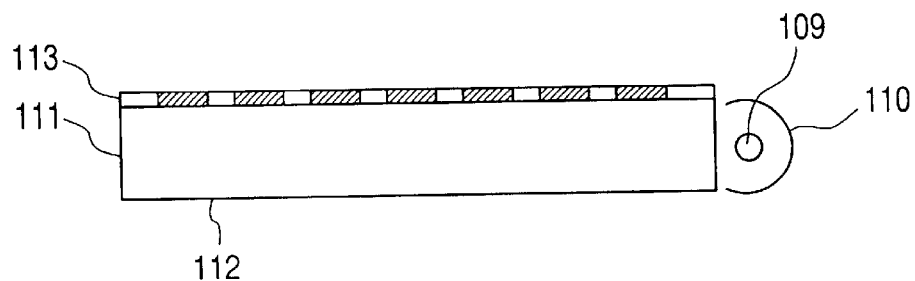
FIGS. 28A and 28B are views showing a variation of the light source of the embodiment 10.
Figure 28B:
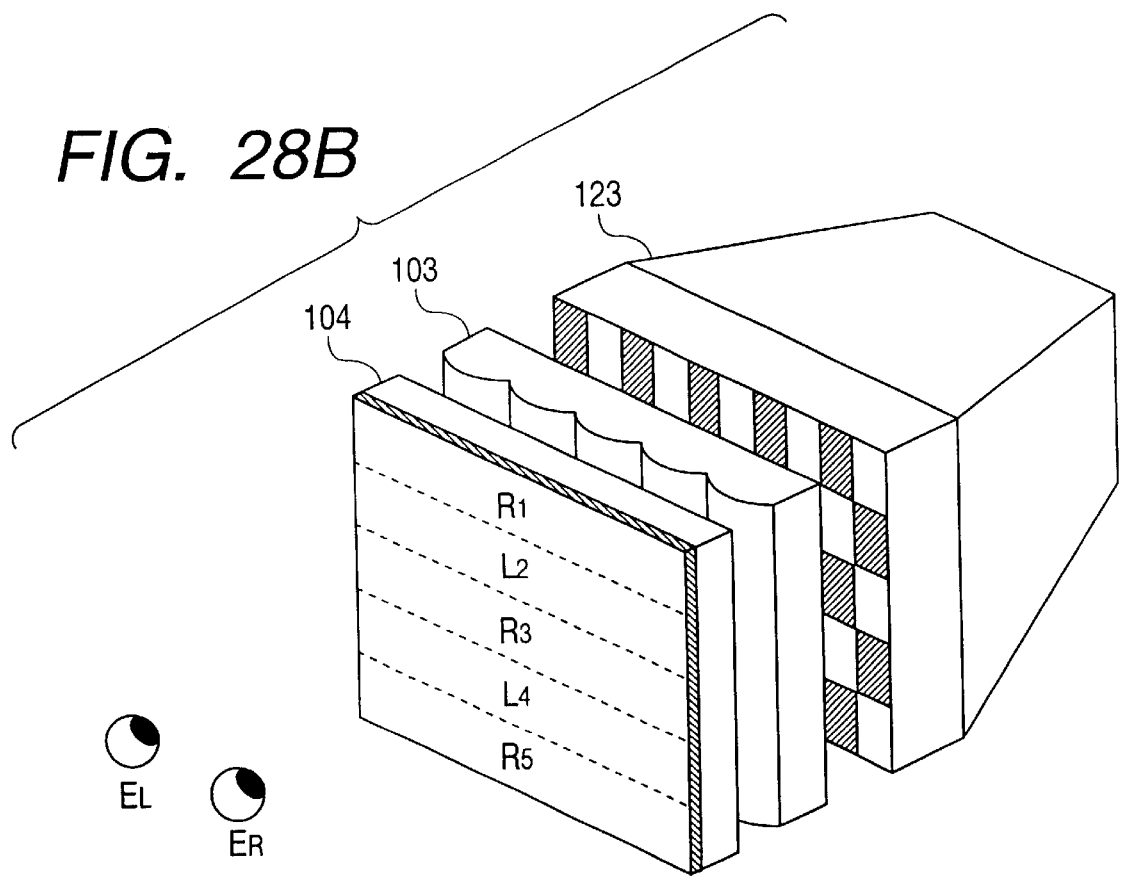

FIGS. 28A and 28B are schematic views of variations of the embodiment 10. The light source means in the embodiment 10 is composed of the rear light source 101 and the mask 102 having predetermined aperture portions, but, in the variation shown in FIGS. 28A and 28B, these two elements are integrated.

In FIG. 28A there are shown a light source 109 such as a fluorescent lamp, a mirror 110, a light guiding member 111 composed of transparent plastics such as PMMA, and aperture portions 113 prepared by patterning a reflective material formed on the surface of the light guiding member 111. These components constitute the light source means, and the aperture-bearing surface of the light guiding member 111 is regarded as the light emitting face of the light source means.

The present embodiment functions in the following manner. The light from the light source 109 is reflected by the appropriate mirror 110, thus enters the light guiding member 111 from an end face thereof and propagates therein. The light is transmitted by the apertures 113 and illuminates the display device 104 through a lenticular lens sheet 103. Such arrangement provides a stereoscopic image display apparatus of a high efficiency of light utilization.

The light guiding member 111 may also be provided with a reflecting member on the rear face, and such reflecting member may be provided with a certain distribution in consideration of the light propagating characteristics. Also the light guiding member 111 is preferably provided on the surface thereof with a black antireflective coated film or a chromium oxide film, in order to avoid unnecessary reflection.

FIG. 28B shows another variation, employing a light-emitting display device 123 such as a CRT, as the light source means. An effect same as that of the embodiment 10 can be obtained by forming an aperture pattern (light emission pattern) same as the aforementioned mask 102 on the light emitting face of the light-emitting display device 123 and illuminating the display device 104 by deflecting the light from the display device 123 with the lenticular lens sheet 103. In such arrangement, the light-emitting display device 123 and the display device 104 are preferably synchronized for each pixel on the scanning line or for each scanning line.

Figure 29:
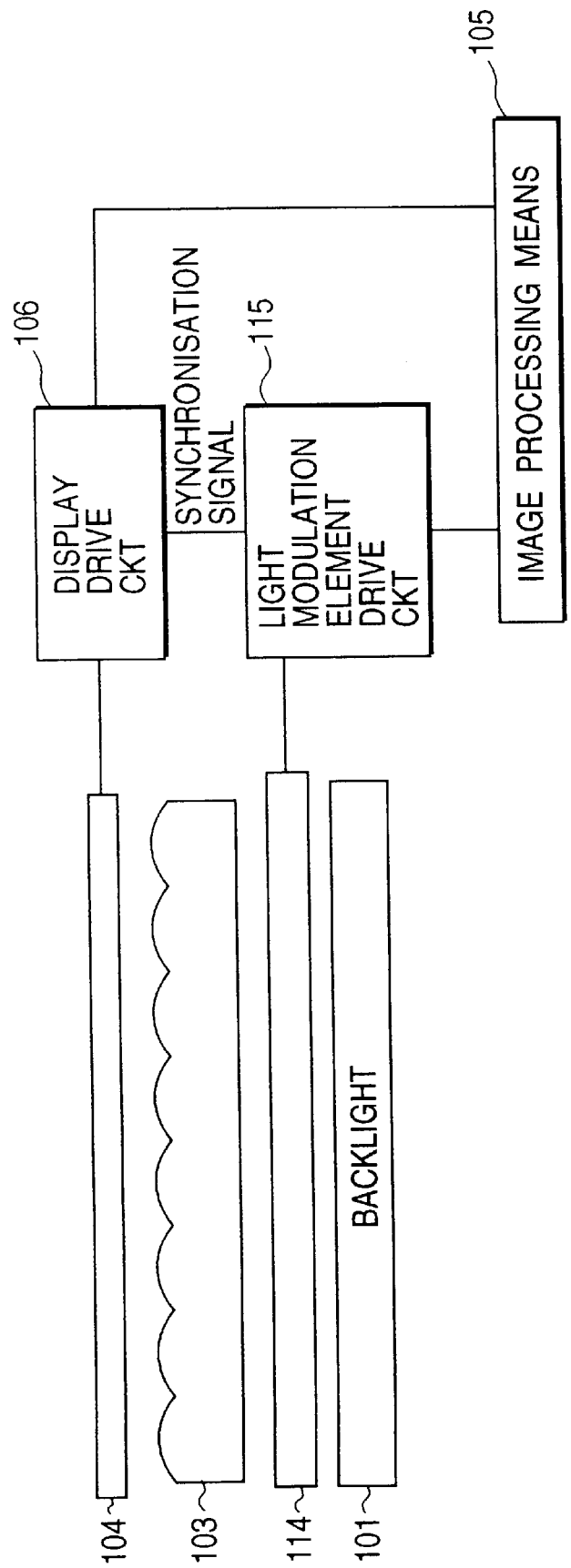
FIG. 29 is a schematic view of the principal parts of an embodiment 11 of the stereoscopic image display apparatus of the present invention.

FIG. 29 is a schematic view of the principal parts of an embodiment 11 of the stereoscopic image display apparatus of the present invention. The embodiment 10 employs the mask 102 with a fixed aperture pattern, so that the resolution of the image display apparatus is reduced to a half. The present embodiment enables display of the stereoscopic image with a higher resolution in comparison with the embodiment 10.

In FIG. 29, a transmissive spatial light modulation element 114 is for example composed of a transmissive liquid crystal device and serves to form an aperture pattern consisting of aperture (light transmitting) portions and opaque portions of a checkered pattern in place for the mask 102 in the embodiment 10, and the aperture pattern is varied in synchronization with the horizontal stripe image displayed on the display device 104. A light modulation element driving circuit 115 drives the spatial light modulation element 114 to form the aperture and opaque portions thereon, in response to an image data signal of the aperture pattern released from image processing means 105.

The rear light source 101 and the spatial light modulation element 114 constitute components of the light source means, and the display plane of the spatial light modulation element 114 is regarded as the light emitting plane of the light source means, since the light emerges from the light transmitting portions formed thereon. The spatial light modulation element 114 functions as a mask having apertures of the checkered pattern.

Figure 30A:
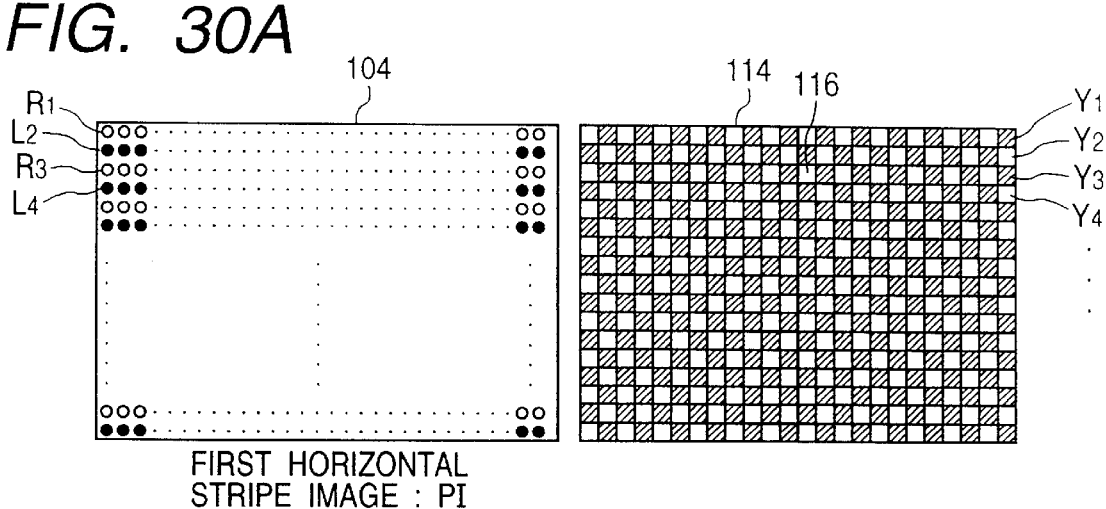
FIGS. 30A, 30B and 30C are schematic views showing the stereoscopic image display method of the embodiment 11.
Figure 30B:
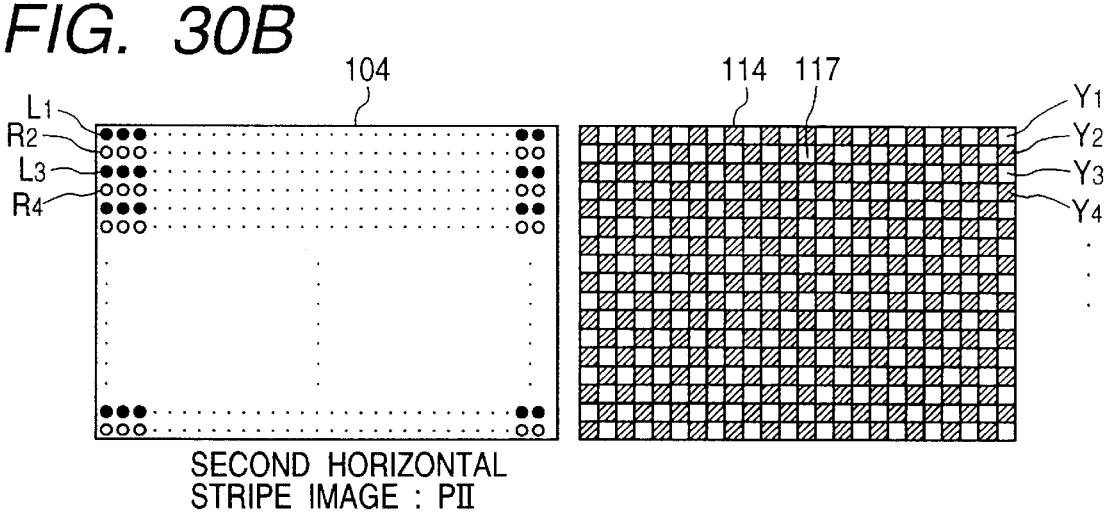
Figure 30C:
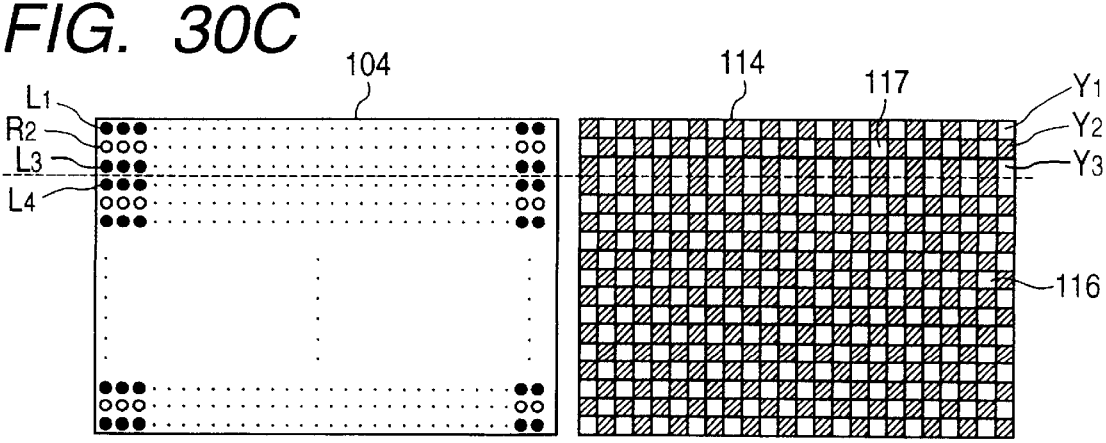

FIGS. 30A, 30B and 30C are schematic views showing the stereoscopic image display method of the present embodiment, wherein left-hand portions indicate horizontal stripe images displayed on the display device 104 and right-hand portions indicate corresponding patterns of the aperture and opaque portions formed on the spatial light modulation element 114.

The horizontal stripe images shown in FIGS. 30A and 30B are respectively the first and second horizontal stripe images PI, PII combined as already explained in relation to FIGS. 27A and 27B. In these states, the spatial light modulation element 114 forms first and second aperture patterns which are mutually complementary in the checkered pattern of the aperture and opaque portions.

The horizontal stripe images and the aperture patterns shown in FIGS. 30A and 30B enable stereoscopic observation in respective cases.

With respect to the first scanning line Y1, in a state shown in FIG. 30A, the first aperture pattern 116 on the spatial light modulation element 114 is in a state of "open-closed-open-closed-..." corresponding to the right stripe pixel R1 in the first horizontal stripe image PI. Then, when the first scanning line Y1 is displayed again after the scanning operation of the entire image area (namely at the start of the display shown in FIG. 30B), there is displayed the left stripe pixel L1 of the second horizontal stripe image PII, and the corresponding second aperture pattern 117 on the spatial light modulation element 114 is in a state of "closed-open-closed-open ...".

Thus, these states correspond to a case of observation of 2:1 interlaced images alternately with the left and right eyes. As the present embodiment displays these two states alternately, the original parallax images R, L can be completely displayed and the stereoscopic image can be improved in resolution.

FIGS. 30A and 30B show the display states after the scanning operation of the entire image area, while FIG. 30C shows a display state in the course of the scanning operation, whereby both display states mentioned above are mixedly present. More specifically, FIG. 30C shows a state in which the re-writing operation has been completed to the third scanning line Y3. In the present embodiment, at the re-writing of the horizontal stripe image on the display device 104 with a next horizontal stripe image, the re-writing operation is executed in succession from the upper end of the image area in such a manner that the displayed image does not become partially lacking, whereby the flickering phenomenon is not noticed by the observer.

Also driving circuit 106, 115 are mutually synchronized so as to re-write in synchronization the stripe pixel displayed on the display device 104 and the corresponding scanning line of the pattern formed on the spatial light modulation element 114. It is also possible to synchronize the displays on the display device 104 and the spatial light modulation element 114 for every pixel on each scanning line. Such configuration enables observation of the left and right stripe pixels without crosstalk respectively by the left and right eyes.

The present embodiment enables observation of the satisfactory stereoscopic image even with a display device of a low display speed (frame frequency) because the left and right parallax images L, R composed of stripe pixels constantly enter the respective eyes and also because the two horizontal stripe images are displayed without interruption at the re-writing, in contrast to the conventional time-divided display method of the left and right parallax images in which the frame frequency of the display device has to be elevated. Consequently the stereoscopic image display apparatus can be constructed more easily.

Also in the present embodiment, since the horizontal stripe image is composed of the right and left stripe pixels of horizontal stripe shape, each stripe pixel can be composed of a scanning line of the display device 114, so that the horizontal stripe image can be combined in extremely easy manner.

The light source means is composed of the rear light source 101 and the spatial light modulation element 114 in the present embodiment, but it may instead be composed of a light-emitting display device 123 such as a CRT as shown in FIG. 28B. In such case, the first and second aperture patterns 116, 117 shown in FIGS. 30A and 30B are displayed on the CRT and the patterned light from the aperture (light emitting) portions thereof is entered into the display device 104 through the lenticular lens sheet 103 to illuminate the horizontal stripe image.

Also in such case, the displays on the light-emitting display device 123 and the display device 104 are preferably synchronized for each scanning line or each pixel on the scanning line.

Figure 31:
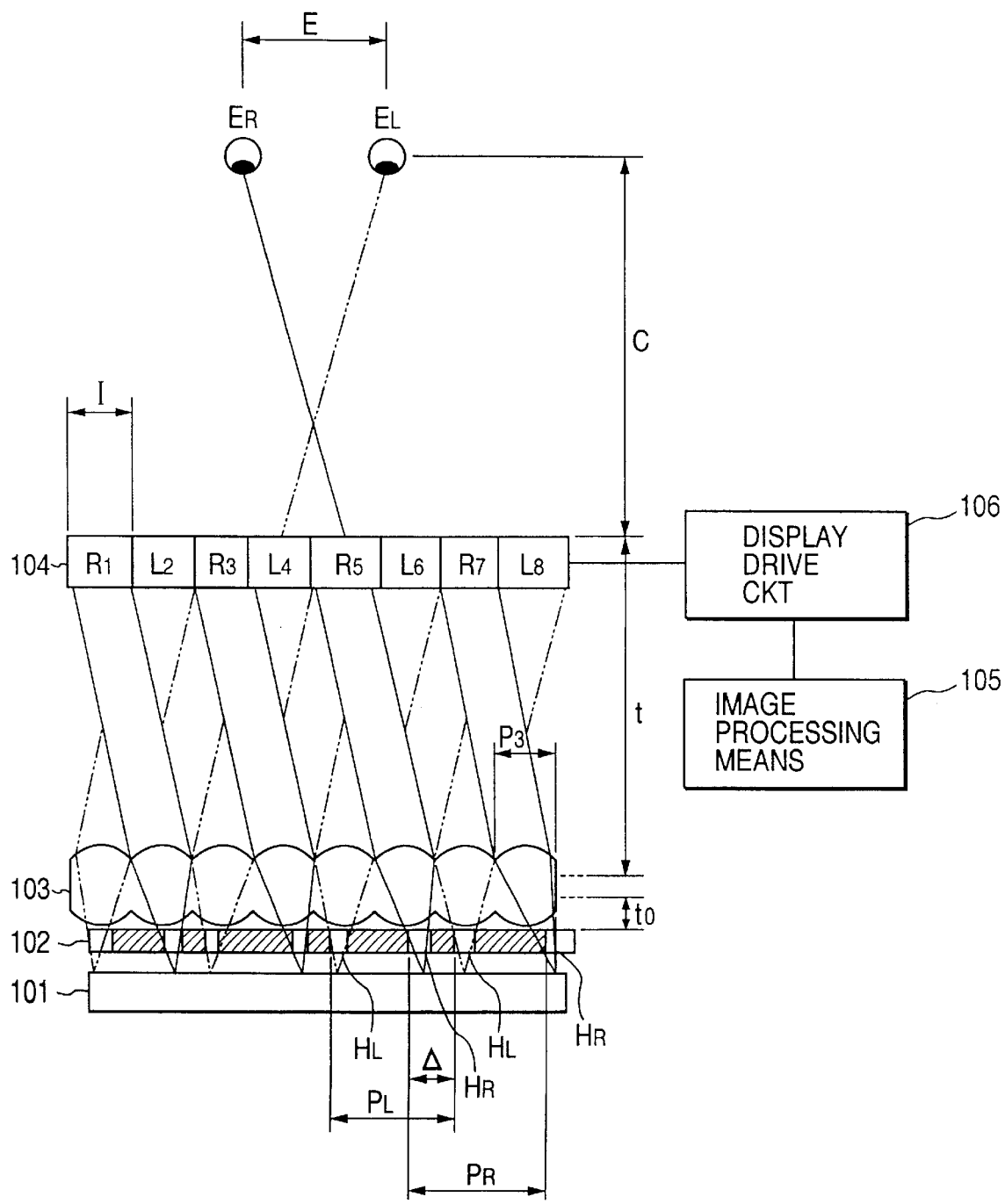
FIG. 31 is a schematic view of the principal parts of an embodiment 12 of the stereoscopic image display apparatus of the present invention.

FIG. 31 is a schematic view of the principal parts of an embodiment 12 of the stereoscopic image display apparatus of the present invention, and FIG. 32 is a perspective view thereof. In contrast to the foregoing embodiments utilizing a horizontal stripe image combined from horizontal stripe pixels, the present embodiment utilizes a vertical stripe image formed by dividing the left and right parallax images L, R in the lateral direction to generate vertical stripe pixels and arranging such left and right vertical stripe pixels alternately from the left-hand end of the display image area.

Components same as those in FIGS. 25A and 25B are represented by same numbers. The present embodiment also employs a lenticular lens sheet 103, which is illustrated in FIG. 31 by a cylindrical lens array composed of cylindrical lenses having convex cylindrical faces on both sides, for satisfying the conditions to be explained later. In FIG. 31, the rays of light from the display device 104 to the left and right eyes $E_R$, $E_L$ are omitted because C>>t.

The mask 102 of the present embodiment is prepared by patterning chromium or a light absorbing material on a substrate such as of glass of plastics as in the embodiment 10, but it has an aperture pattern consisting of plural vertical-striped apertures.

The rear light source 101 and the mask 102 constitute components of the light source means, and the aperture-bearing face of the mask 102 is regarded as the light-emitting face of the light source means, since the light emerges from the aperture-bearing face of the mask 102, which functions as a mask with vertical stripe-shaped apertures.

Now there will be explained the stereoscopic image display method of the present embodiment. The light emitted from the rear light source 101 is transmitted by the mask 102, in which centers of the apertures are displaced in a predetermined manner from the optical axes of the cylindrical lenses constituting the lenticular lens sheet 103, then given directionality by the lenticular lens sheet 103 and is condensed separately in areas corresponding to the left and right eyes $E_R$, $E_L$ of the observer.

The light beams entering the left and right eyes are respectively modulated by the vertical stripe pixels Ri, Li displayed on the display device 104 positioned between the lenticular lens sheet 103 and the observer, thereby enabling the left and right eyes $E_L$, $E_R$ to respectively observe the left and right parallax images L, R each composed of the group of stripe pixels Li or Ri, thereby realizing stereoscopic observation.

In the present embodiment, there are set particular conditions in order that the light for illuminating the left or right stripe pixel does not fall on the adjacent stripe pixel. More specifically, the width I of the left or right stripe pixel, the distance (observation distance) C from the display device 104 to the aforementioned light condensation area (pupil position of the observer), the distance (eye distance) E between the centers of the above-mentioned two light condensation areas, and the distance t from the principal plane of the lenticular lens sheet 103 at the side of the display device 104 to the display device 104 are so selected as to satisfy the following relationship:

$$t = I \cdot C/(E/2 - I)$$

Also the pitch $P_3$ of the lenticular lens sheet 103 and the width I of the stripe pixel satisfy the following relationship:

$$P_3 = E \cdot I/(E - 2I)$$

Also the pitch $P_{AP}$ of the apertures of the mask 102, and the pitches $P_R$, $P_L$ of the apertures $H_R$, $H_L$ for the right and left eyes are mutually equal, namely:

$$P_{AP} = P_R = P_L$$

and $P_{AP}$ and the width I of the vertical stripe pixel satisfy the following relationship:

$$P_{AP} = 2I\{E/(E-2I) + t_0/C\}$$

wherein $t_0$ is the distance from the principal plane of the lenticular lens sheet 103 at the mask side to the mask 102.

Also the apertures $H_R$ and $H_L$ are mutually displaced by $\Delta$, which is defined by:

$$\Delta = (P_{AP}/2) - 2I \cdot t_0/t.$$

Because of the above-explained configuration, the present embodiment can display a satisfactory stereoscopic image without crosstalk between the left and right stripe pixels.

In the present embodiment, in switching the vertical stripe image displayed on the display device 104 to a next vertical stripe image, such switching is preferably executed in succession from the upper end of the image area in order that the displayed image does not become partially lacking. In this manner the flickering phenomenon is not noticed by the observer.

Also the present embodiment, because of the use of the mask 102 with a fixed pattern and the positioning of the lenticular lens sheet 103 between the mask 102 and the display device 104, can prevent the glare on the display plane, thereby providing a more agreeable stereoscopic image, in comparison with the stereoscopic image display apparatus of the conventional lenticular system.

The present embodiment also displays a color image. The display plane of the display device 104 of the present embodiment is provided, in the vertical stripe pixels Li, Ri constituting the vertical stripe image shown in FIG. 32, with a filter F consisting of a vertical array of color filters r, g, b as shown in a partial magnified view 118. Based on such configuration of the display device 104, the present embodiment allows observation of a satisfactory stereoscopic color image without color aberration.

As a modification of the present embodiment, the effect thereof can also be obtained by constituting the light source means with a light-emitting display device 123 such as a CRT as shown in FIG. 28B, forming a fixed aperture pattern (light emitting pattern) same as that of the mask 102 on the light emitting plane of the display device, and giving directionality to the pattern light emerging from the light emitting plane by the lenticular lens sheet 103.

In such case, the displays of the light-emitting display device 123 and the display device 104 are preferably synchronized for each scanning line or each pixel on the scanning line.

Figure 33:
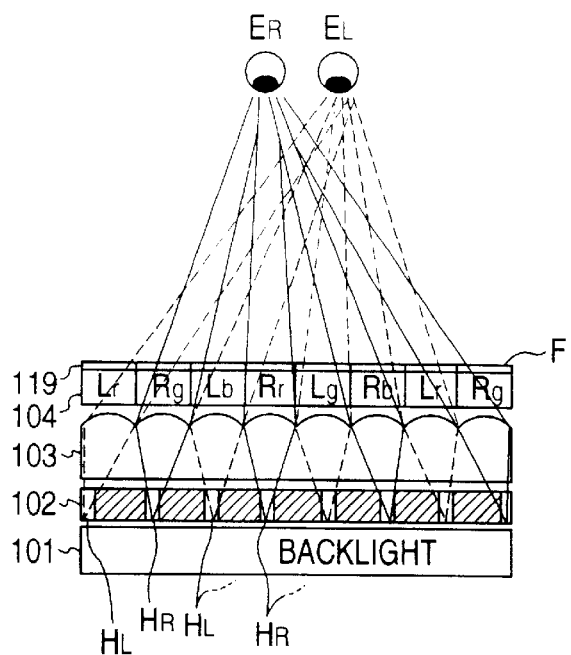
FIG. 33 is a view showing a variation of the embodiment 12.

FIG. 33 shows a variation of the embodiment 12, schematically showing the relationship between the pixel arrangement and other components in case of color image display. The stereoscopic image displaying method is same as in the embodiment 12. A transmissive display device 119 is provided, on the display plane thereof, with a filter F consisting of vertically-striped color filters r, g, b so as to superpose on the vertical stripe pixels, whereby a color pixel on the display device 119 corresponds to a cylindrical lens of the lenticular lens sheet 103 and a vertical stripe image, composed of the vertical stripe pixels $L_r R_g L_b R_r L_g R_b L_r R_g \ldots$, is displayed on the display device 119, wherein suffixes r, g, b indicate the respective color pixels. Such configuration allows the observer to observe a satisfactory stereoscopic color image without color aberration.

Figure 34:
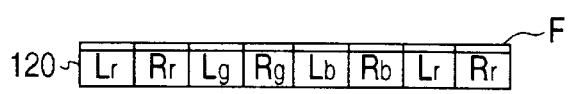
FIG. 34 is a schematic view showing a display device and the arrangement of pixels thereof in another variation of the embodiment 12.

It is also possible to replace the display device 119 with a display device 120 with a modified arrangement of the vertically striped filter F as shown in FIG. 34, in such a manner that a color pixel of the display device 120 corresponds to a cylindrical lens of the lenticular lens sheet 103, thereby displaying a vertical stripe image, composed of the vertical stripe pixels $L_r R_r L_g R_g L_b R_b L_r R_r \ldots$, on the display device 120. Also in this case there can be observed a satisfactory stereoscopic color image without color aberration.

However, if each color pixel is made to correspond to a cylindrical lens of the lenticular lens sheet 103 as shown in FIGS. 33 and 34, the manufacture of the lenticular lens sheet 103 may become difficult because of the reduced pitch thereof and the resulting reduced sheet thickness. In such case, if planar-convex lenticular lenses are employed, such convex face side is preferably provided at the side of the display device 120.

It is also possible to replace the lenticular lens sheet 103 with a lens system consisting of plural micro lens sheets, of which the principal point at the side of the display device 120 is positioned outside the lens system.

Figure 35:
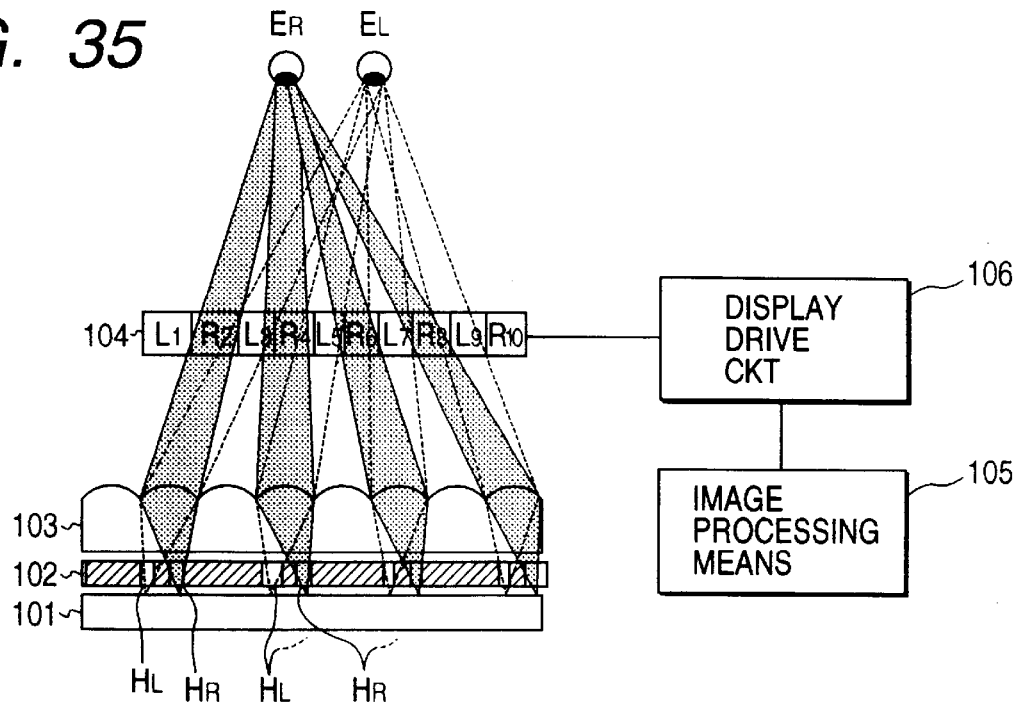
FIG. 35 is a view showing still another variation of the embodiment 12.

FIG. 35 shows another variation of the embodiment 12. In this variation, the centers of the two apertures $H_R$, $H_L$ for right and left eyes are shifted in mutually opposite directions, by a predetermined distance, from the optical axis of each of the cylindrical lenses constituting the lenticular lens sheet 103. Also such apertures $H_R$, $H_L$ are provided corresponding to every other cylindrical lenses on the lenticular lens sheet 103. Such configuration allow to displace the display device 104 closer to the observer, in comparison with the embodiment 12.

Also in such case there can be employed the color pixel arrangement as explained in the foregoing variation, and a satisfactory stereoscopic color image can be observed without color aberration.

Figure 36A:
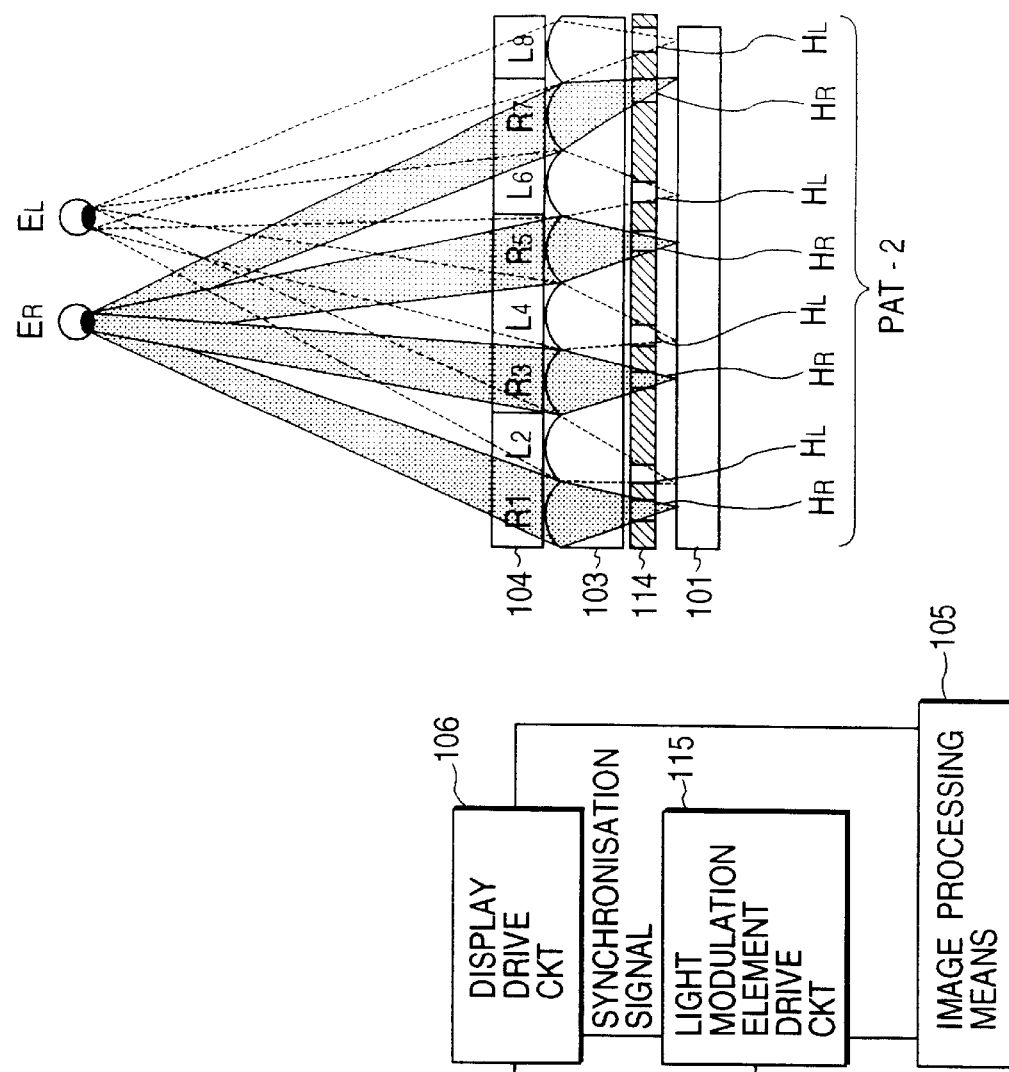
FIGS. 36A and 36B are schematic views showing the stereoscopic image display method of an embodiment 13.
Figure 36B:
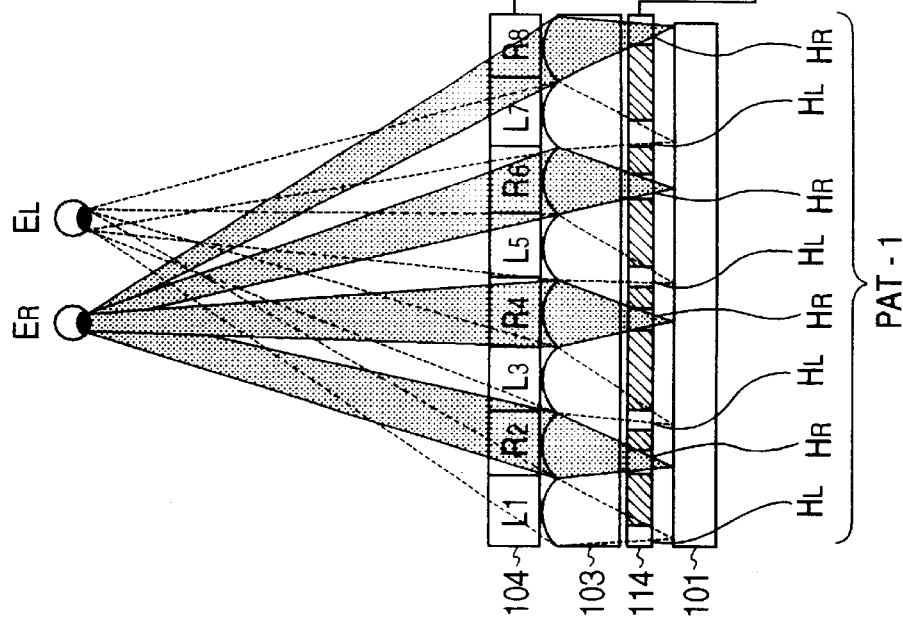

FIGS. 36A and 36B are schematic views of the principal parts of an embodiment 13 of the stereoscopic image display apparatus of the present invention, and FIG. 37 is a view showing the combining method of the stripe image of the embodiment 13. In the embodiment 12, the resolution of the stereoscopic image is reduced to ½ because of the use of the mask 102 with a fixed aperture pattern. In contrast, the present embodiment replaced the mask 102 of the embodiment 12 with a transmissive spatial light modulation element 114 and switches the vertically striped aperture pattern displayed on the spatial light modulation element 114 in synchronization with the switching of the first vertical stripe image PI and the second vertical stripe image PII displayed on the display device 104, thereby improving the resolution of the stereoscopic image.

In these drawings, the spatial light modulation element 114 is composed for example of a transmissive liquid crystal device and serves, in place for the mask 102 of the embodiment 12, to display an aperture pattern which is varied in synchronization with the vertical stripe image displayed on the display device 104. An image data signal representing the aperture pattern consisting of predetermined light transmitting (aperture) and opaque portions, from image processing means 105, is supplied to the light modulation element driving circuit 115, which in response forms a predetermined aperture pattern consisting of the light transmitting portions and the opaque portions on the spatial light modulation element 114.

The rear light source 101 and the spatial light modulation element 114 constitute components of the light source means, and the display plane of the spatial light modulation element 114 is regarded as the light emitting plane of the light source means, since the light emerges from the light transmitting portions formed thereon. The spatial light modulation element 114 functions as a mask having vertically striped apertures.

FIG. 37 shows the method of combining the vertical stripe image of the present embodiment. The right parallax image R is divided into vertical right stripe pixels $R_1, R_2, R_3, \ldots$, and the left parallax image L is divided into vertical left stripe pixels $L_1, L_2, L_3, \ldots$ and there are combined a first vertical stripe image PI by arranging these stripe pixels in the order of $L_1 R_2 L_3 R_4 L_5 R_6 \ldots$ and a second vertical stripe image PII by arranging these stripe pixels in the order of $R_1 L_2 R_3 L_4 R_5 L_6 \ldots$ As shown in FIGS. 36A and 36B, the apertures $H_R$, $H_L$ are respectively displaced, by a predetermined distance, from the optical axis of the respectively corresponding cylindrical lenses. More specifically, the aperture $H_L$ for guiding the light from the rear light source 101 to the left eye $E_L$ and the aperture $H_R$ for guiding the light to the right eye $E_R$ are respectively shifted to left and right by a distance of a half pitch as shown in FIGS. 36A and 36B, thereby forming a first aperture pattern PAT-1 and a second aperture pattern PAT-2.

The stereoscopic image can be observed in each of the state shown in FIG. 36A, utilizing the first vertical stripe image PI and the first aperture pattern PAT-1 and the state shown in FIG. 36A, utilizing the second vertical stripe image PII and the second aperture pattern PAT-2, and the present embodiment increases the resolution of the stereoscopic image by alternately displaying these two states.

Figure 38:
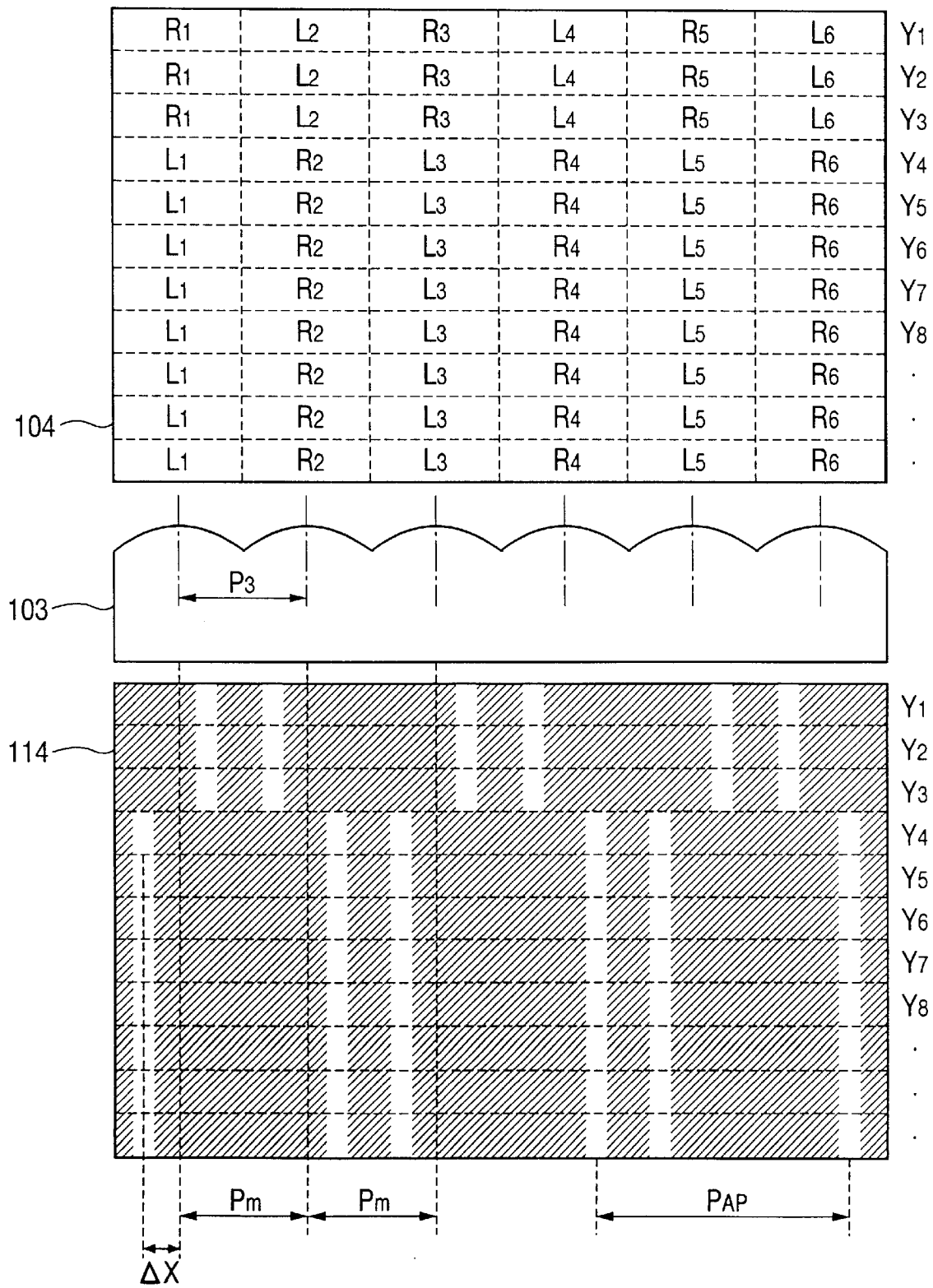
FIG. 38 is a schematic view of a display state in the course of scanning of the embodiment 13.

FIGS. 36A and 36B show the display states in a cross section along a certain scanning line, while FIG. 38 shows the display state in the course of the scanning operation of the image area in the embodiment 13, wherein the vertical stripe image is being re-written on the display device, so that the two display states are mixedly present. More specifically there is illustrated a state where the first vertical stripe image PI is re-written into the second vertical stripe image PII up to the third scanning line Y3.

FIG. 38 also shows the cross section of the lenticular lens sheet 103, in order to show the positional relationship therewith. For the purpose of simplicity, the pitch $P_3$ of the lenticular lens sheet 103 is illustrated same as the half pitch $P_m = P_{AP}/2$ of the apertures, and these parameters satisfy the aforementioned conditions.

In the present embodiment, the driving circuits are so synchronized that vertical stripe image displayed on the display device 104 and the aperture pattern formed on the spatial light modulation element 114 are re-written in synchronization. If necessary, the synchronization may be made for each pixel on the scanning line.

In the present embodiment, in switching the vertical stripe image displayed on the display device 104 to a next vertical stripe image, such switching is executed in succession from the upper end of the image area in order that the displayed image does not become partially lacking. In this manner the flickering phenomenon is not noticed by the observer.

The present embodiment enables observation of the satisfactory stereoscopic image even with a display device of a low display speed (frame frequency) because the left and right parallax images L, R composed of stripe pixels constantly enter the respective eyes and also because the two vertical stripe images are displayed without interruption at the re-writing, in contrast to the conventional time-divided display method of the left and right parallax images in which the frame frequency of the display device has to be elevated. Consequently the stereoscopic image display apparatus can be constructed more easily.

Also the light source means of the present embodiment may be replaced by a light-emitting display device 123 such as a CRT as shown in FIG. 28B. In such case the light is emitted from the portions corresponding to the apertures $H_L$ or $H_R$ shown in FIGS. 36A and 36B and the emerging light is given directionality by the lenticular lens sheet 103.

The foregoing embodiments have shown apparatus and methods for displaying a stereoscopic image on the entire display face of the display device 104. It is however possible, in any of the foregoing embodiments, to display the stereoscopic image only in a specified area and to display an ordinary two-dimensional image in other areas.

Such objective can be attained, in embodiments employing the mask 102 with a fixed pattern, by displaying a stripe image on the display device 104 only in an area for the stereoscopic image display and an ordinary two-dimensional image in other areas. In such case, however, the resolution of the two-dimensional image becomes lower than that of the display device 104 if the aperture and opaque portions are formed on the entire area of the mask 102. In order to avoid such reduction of resolution, the opaque portions are eliminated from the areas of the mask 102 corresponding to the two-dimensional image.

Figure 39:
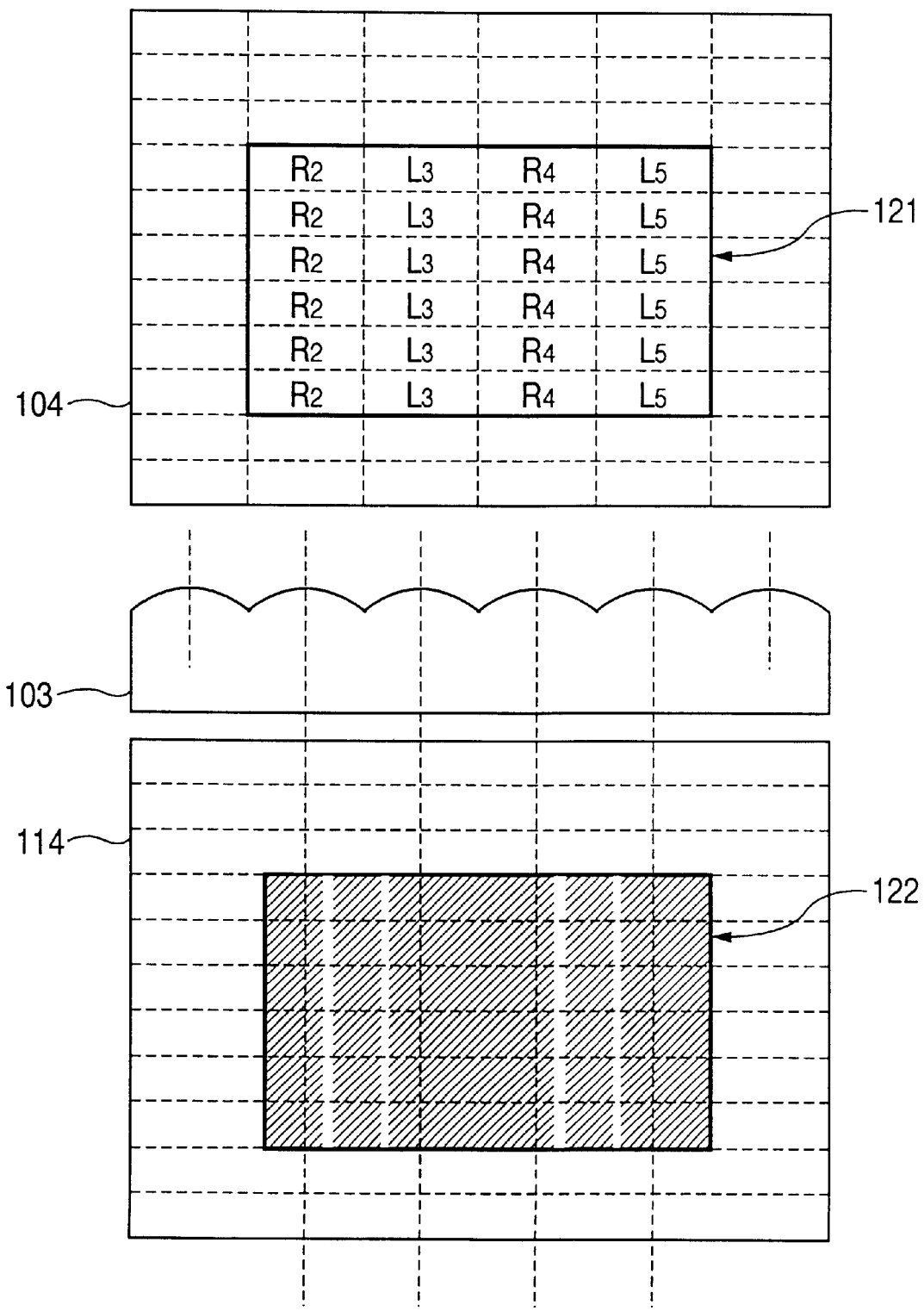
FIG. 39 is a schematic view showing the display method with vertical stripe images in the stereoscopic image display apparatus of the present invention.

In embodiments employing the spatial light modulation element 114 for displaying the aperture pattern in place of the mask 102, the horizontal or vertical stripe image is displayed only in a stereoscopic image displaying area 121 of the display device 104 as shown in FIG. 39 and the spatial light modulation element 114 forms an aperture pattern of the aperture and opaque portions only in a corresponding area 122. The display device 104 displays the ordinary two-dimensional image in other areas, and the spatial light modulation element 114 maintains the corresponding areas in the light transmitting state. In this manner the stereoscopic image can be observed only in the area 121 of the display of the vertical or horizontal stripe image according to the aforementioned principle of stereoscopic observation, and the two-dimensional image can be observed in other areas.

In such case, the resolution of the stereoscopic image can be improved by employing the aforementioned method of alternately displaying a state utilizing the first horizontal or vertical stripe image PI and the first aperture pattern and another state utilizing the second horizontal or vertical stripe image PII and the second aperture pattern, in the stereoscopic image display area.

FIG. 39 illustrates a display method utilizing the vertical stripe image, but the resolution of the stereoscopic image can also be improved by the display method utilizing the horizontal stripe image as shown in the embodiment 11.

Also in such case, there may be employed the light-emitting display device 123 such as a CRT as shown in FIG. 28B for the light source means and the light emission pattern thereof may be suitably controlled to display the stereoscopic image only a predetermined area.

The foregoing embodiments enable observation of the satisfactory stereoscopic image even with a display device of a low display speed (frame frequency) because the left and right parallax images L, R composed of stripe pixels constantly enter the respective eyes, in contrast to the conventional time-divided display method of the left and right parallax images in which the frame frequency of the display device has to be elevated in order to fuse the left and right parallax images. Consequently the stereoscopic image display apparatus can be constructed more easily.

The invention may be embodied in other specific forms without departing from the spirit or essential characteristics thereof. The foregoing embodiments are therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A stereoscopic image display apparatus comprising:
   light source means for emitting light from plural apertures;
   an optical element array composed of an array of optical elements having different optical functions in the horizontal and vertical directions, for giving directivity to the light emerging from said apertures; and
   a transmissive display device for displaying a stripe image, obtained by dividing each of a parallax image for the right eye and a parallax image for the left eye into the horizontal stripes to obtain right stripe pixels and left stripe pixels and arranging said right and left stripe pixels alternately in a predetermined order;
   wherein said plural apertures are provided corresponding to each of the optical elements constituting said optical element array, for each stripe pixel, and are adapted to cause the light, passing through the right or left stripe pixel, to reach a predetermined area;
   wherein said optical element array is adapted to convert the light from the apertures of said light source means, in a horizontal cross section into a substantially parallel light beam and in a vertical cross section into a converging light beam substantially converging on said display device;

wherein said optical element array includes a vertical cylindrical lens array composed of an array in the horizontal direction of a plurality of vertically elongated cylindrical lenses and/or a horizontal cylindrical lens array composed of an array in the vertical direction of a plurality of horizontally elongated cylindrical lenses;

wherein the pitch VL of said horizontal cylindrical lens array in the vertical direction, the vertical pitch Vd of the stripe pixels displayed on said display device, the vertical width Vm of said apertures and opaque areas, the distance L1 between said display device and said horizontal cylindrical lens array, the distance L2 between said horizontal cylindrical lens array and said light source means, and the focal distance fv in the vertical cross section of the horizontal cylindrical lenses constituting said horizontal cylindrical lens array satisfy following relations:

$$Vd:Vm=L1:L2$$

$$VD:VL=(L1+L2)/2:L2$$

and $$1/fv=1/L1+1/L2.$$

2. An apparatus according to claim 1, wherein the distance L from said display device to the predetermined position of the observer and the above-mentioned parameters Vd, Vm, L1 and L2 satisfy following relation:

$$Vd:Vm=L:(L+L1+L2).$$

3. A stereoscopic image display apparatus comprising:

light source means for emitting light from plural apertures;

an optical element array composed of an array of optical elements having different optical functions in the horizontal and vertical directions, for giving directivity to the light emerging from said apertures; and a transmissive display device for displaying a stripe image, obtained by dividing each of a parallax image for the right eye and parallax image for the left eye into the horizontal stripes to obtain right stripe pixels and left stripe pixels and arranging said right and left stripe pixels alternately in a predetermined order;

wherein said plural apertures are provided corresponding to each of the optical elements constituting said optical element array, for each stripe pixel, and are adapted to cause the light, passing through the right or left stripe pixel, to reach a predetermined area;

wherein said optical element array is adapted to convert the light from the apertures of said light source means, in a horizontal cross section into a substantially parallel light beam and in a vertical cross section into a converging light beam substantially converging on said display device;

wherein said optical element array includes a toric lens array consisting of a two-dimensional array of toric lenses having different focal distances in the vertical and horizontal directions;

wherein the pitch VL of said toric lens array in the vertical direction, the vertical pitch Vd of the stripe pixels displayed on said display device, the vertical width Vm of said apertures and opaque areas, the distance L between said display device and said horizontal cylindrical lens array, the distance L2 between said toric lens array and said light source means, and the focal distance fv in the vertical cross section of the toric lenses constituting said toric lens array satisfy following relations:

$$Vd:Vm=L1:L2$$

$$Vd:VL=(L1+L2)/2:L2$$

and $$1/fv=1/L1+1/L2.$$

4. A stereoscopic image display apparatus comprising:

light source means for emitting light from plural apertures;

an optical element array composed of an array of optical elements having different optical functions in the horizontal and vertical directions, for giving directivity to the light emerging from said apertures; and a transmissive display device for displaying a stripe image, obtained by dividing each of a parallax image for the right eye and parallax image for the left eye into the horizontal stripes to obtain right stripe pixels and left stripe pixels and arranging said right and left stripe pixels alternately in a predetermined order;

wherein said plural apertures are provided corresponding to each of the optical elements constituting said optical element array, for each stripe pixel, and are adapted to cause the light, passing through the right or left stripe pixel, to reach a predetermined area;

wherein said optical element array is adapted to convert the light from the apertures of said light source means, in a horizontal cross section into a substantially parallel light beam and in a vertical cross section into a converging light beam substantially converging on said display device;

wherein said optical element array includes a toric lens array consisting of a two-dimensional array of toric lenses having different focal distances in the vertical and horizontal directions;

wherein the pitch VL of said toric lens array in the vertical direction, the vertical pitch Vd of the stripe pixels displayed on said display device, the vertical width Vm of said apertures and opaque areas, the distance L1 between said display device and said horizontal cylindrical lens array, the distance L2 between said toric lens array and said light source means, and the focal distance fv in the vertical cross section of the toric lenses constituting said toric lens array satisfy following relations:

$$Vd:Vm=L1:L2$$

$$Vd:VL=(L1+L2)/2:L2$$

and $$1/fv=1/L1+1/L2$$

wherein the distance L from said display device to the predetermined position of an observer and the above-mentioned parameters Vd, Vm, L1 and L2 satisfy following relation:

$$Vd:Vm=L:(L+L1+L2).$$

5. A stereoscopic image display apparatus comprising:

light source means for emitting light from plural apertures;

an optical element array composed of an array of optical elements having different optical functions in the horizontal and vertical directions, for giving directivity to the light emerging from said apertures;

wherein the pitch $P_{3x}$ of said optical element array in the horizontal direction, the pitch $P_{9x}$ of the apertures of the light source means, the distance L0 between said optical element array and the predetermined position of the observer, and the distance d1 between said optical element array and said light source means satisfy following relation:

$$L0:(L0+D1)=P_{3x}:P_{9x}$$

and a transmissive display device for displaying a stripe image, obtained by dividing each of a parallax image for the right eye and a parallax image for the left eye into the horizontal stripes to obtain right stripe pixels and left stripe pixels and arranging said right and left stripe pixels alternately in a predetermined order;

wherein said plural apertures are provided corresponding to each of the optical elements constituting said optical element array, for each stripe pixel, and are adapted to cause the light, passing through the right or left stripe pixel, to reach a predetermined area.

6. A stereoscopic image display apparatus comprising:

light source means for emitting light from plural apertures;

an optical element array composed of an array of optical elements having different optical functions in the horizontal and vertical directions, for giving directionality to the light emerging from said apertures;

wherein said optical element is a cylindrical lens having an optical power in the horizontal direction, and said optical element array is composed of an array in the horizontal direction of said cylindrical lenses; and a transmissive display device for displaying a stripe image, obtained by dividing each of a parallax image for the right eye and a parallax image for the left eye into the vertical stripes to obtain right stripe pixels and left stripe pixels and arranging said right and left stripe pixels alternately in a predetermined order;

wherein said plural apertures are provided corresponding to each of the optical elements constituting said optical element array, for each stripe pixel, and are adapted to cause the light, passing through the right or left stripe pixel, to reach a predetermined area;

wherein the width I of said right or left stripe pixel, the distance C from said display device to said light condensation area, the distance E between the centers of said two light condensation areas, and the distance t from the principal plane of said cylindrical lenses at the side of said display device to said display device satisfy following relation:

$$t=IC/(E/2-I).$$

7. A stereoscopic image display apparatus comprising:

light source means for emitting light from plural light emitting portions;

an optical element array including at least a lens array of lenses each having lens function at least in the horizontal direction arranged along the horizontal direction, for giving directivity to the light emerging from said light emitting portions;

a transmissive display device for displaying a stripe image, obtained by dividing each of a parallax image for the right eye and a parallax image for the left eye into the horizontal stripes to obtain right stripe pixels and left stripe pixels and arranging said right and left stripe pixels alternatively in a predetermined order;

where said plural light emitting portions are provided correspondingly to each of the optical elements consisting said optical element array, for each stripe pixel, and are adapted to cause the light, passing through the right or left stripe pixel, to reach a predetermined area; and wherein said plural light emitting portions are provided correspondingly to respective ones of the horizontal stripes of the stripe image with respect to the vertical direction, and a relative position of said plural light emitting portions and the horizontal stripes of the stripe image is defined such that the light, passing through the horizontal stripes, converges in the vertical direction on the horizontal stripes respectively, regardless of a vertical position of an observer of the stripe image.

8. The apparatus according to the claim 7, wherein said optical element array further includes a lens array of lenses each having lens function at least in the vertical direction arranged along the vertical direction.

9. The apparatus according to the claim 7, wherein said light source means includes one or two mask or masks for directing the light, passing through the horizontal stripes, so as to converge in the vertical direction.

10. The apparatus according to claim 7, wherein said light source means includes a light source and a light modulation element for forming a mask pattern having the plural light transmitting portions to transmit the light from said light source as said light emitting portions.

11. The apparatus according to the claim 10, wherein changing operation for changing portions of light transmitting portions of said light modulation element and changing-over operation of the right and left stripe pixels on said transmissive display device are synchronized for every pixels on the corresponding scanning line thereof, or for every corresponding scanning line thereof.

12. The apparatus according to the claim 7, wherein said light source means includes a display element for forming a patterned light from the plural light emitting portions.

13. The apparatus according to the claim 12, wherein changing operation for changing positions of light emitting portions of said display element and changing-over operation of the right and left stripe pixels on said transmissive display device are synchronized for every pixels on the corresponding scanning line thereof, or for every corresponding scanning line thereof.

14. The apparatus according to the claim 7, wherein said optical element array including a lens array of lenses each having lens function both in the horizontal direction and in the vertical direction powers of which are different from each other arranged both along the horizontal direction and along the vertical direction.

15. A stereoscopic image display apparatus comprising:

light source means for emitting light from plural light emitting portions;

an optical element array including at least a lens array of lenses each having lens function at least in the horizontal direction arranged along the horizontal direction, for giving directivity to the light emerging from said light emitting portions;

a transmissive display device for displaying a stripe image, obtained by dividing each of a parallax image for the right eye and a parallax image for the left eye into the horizontal stripes to obtain right stripe pixels and left stripe pixels and arranging said right and left stripe pixels alternatively in a predetermined order;

wherein said plural light emitting portions are provided correspondingly to each of the optical elements consisting said optical element array, for each stripe pixel, and are adapted to cause the light, passing through the right or left stripe pixel, to reach a predetermined area; and wherein changing operation for changing positions of light emitting portions and changing-over operation of the right and left stripe pixels on said transmissive display device are synchronized for every pixels on the corresponding scanning line thereof, or for every corresponding scanning line thereof.

16. The apparatus according to the claim 15, wherein said optical element array further includes a lens array of lenses each having lens function at least in the vertical direction arranged along the vertical direction.

17. The apparatus according to the claim 15, wherein said light source means includes one or two mask or masks for directing the light, passing through the horizontal stripes, so as to converge in the vertical direction.

18. A stereoscopic image display apparatus comprising:

light source means for emitting light from plural light emitting portions;

an optical element array including at least a lens array of lenses each having lens function at least in the horizontal direction arranged along the horizontal direction, for giving directivity to the light emerging from said light emitting portions;

a transmissive display device for displaying a stripe image, obtained by dividing each of a parallax image for the right eye and a parallax image for the left eye into the horizontal stripes to obtain right stripe pixels and left stripe pixels and arranging said right and left stripe pixels alternatively in a predetermined order;

wherein said plural light emitting portions are provided correspondingly to each of the optical elements consisting said optical element array, for each stripe pixel, and are adapted to cause the light, passing through the right or left stripe pixel, to reach a predetermined area;

wherein said plural light emitting portions are provided correspondingly to respective ones of the horizontal stripes of the stripe image with respect to the vertical direction, and a relative position of said plural light emitting portions and the horizontal stripes of the stripe image are defined such that the light, passing through the horizontal stripes, converges in the vertical direction on the horizontal stripes respectively, regardless of a vertical position of an observer of the stripe image; and wherein the right and left stripe pixels are displayed on said transmissive display device with an ordinary two-dimensional image.

19. The apparatus according to the claim 18, wherein said optical element array further includes a lens array of lenses each having lens function at least in the vertical direction arranged along the vertical direction.

20. The apparatus according to the claim 18, wherein said light source means includes one or two mask or masks for directing the light, passing through the horizontal stripes, so as to converge in the vertical direction.

21. The apparatus according to the claim 18, further comprising means for adjusting luminance between a stereoscopic image formed by the left and right stripe pixels and the two-dimensional image.

* * * * *

UNITED STATES PATENT AND TRADEMARK OFFICE
CERTIFICATE OF CORRECTION

PATENT NO. : 6,445,406 B1
DATED : September 3, 2002
INVENTOR(S) : Naosato Taniguchi et al.

It is certified that error appears in the above-identified patent and that said Letters Patent is hereby corrected as shown below:

Title page,
Item [30], Foreign Application Priority Data, "Feb. 2, 1996 (JP) 9-040469" should read -- Feb. 2, 1996 (JP) 8-040469 --

Drawings,
Figures 1A, 1B, and 2A, 2B and 2C, on Sheets 1 and 2, should be designated by the legend -- PRIOR ART --.

Column 7,
Line 34, "FIG. 32 is a perspective view" should read -- FIGS. 32 and 32A are perspective views --

Column 29,
Line 6, "partial magnified view 118." should read -- partial magnified view 118 in FIG. 32A. --

Column 33,
Line 66, "distance L" should read -- distance L1 --

Column 35,
Line 44, "left eve" should read -- left eye --

Signed and Sealed this

Fourteenth Day of October, 2003

JAMES E. ROGAN
*Director of the United States Patent and Trademark Office*